United States Patent [19]

Arima

[11] Patent Number: 5,696,883
[45] Date of Patent: Dec. 9, 1997

[54] NEURAL NETWORK EXPRESSING APPARATUS INCLUDING REFRESH OF STORED SYNAPSE LOAD VALUE INFORMATION

[75] Inventor: Yutaka Arima, Hyogo-ken, Japan

[73] Assignee: Mitsubishi Denki Kabushiki Kaisha, Tokyo, Japan

[21] Appl. No.: 971,038

[22] Filed: Nov. 3, 1992

[30] Foreign Application Priority Data

Jan. 24, 1992 [JP] Japan ................................. 4-011413

[51] Int. Cl.⁶ ........................................................ G06F 7/00
[52] U.S. Cl. ............................... 395/24; 395/27; 395/22
[58] Field of Search ............................... 395/24, 22, 27; 307/201

[56] References Cited

U.S. PATENT DOCUMENTS

| | | | |
|---|---|---|---|
| 4,903,226 | 2/1990 | Tsividis | 395/24 |
| 4,926,064 | 5/1990 | Tapang | 395/24 |
| 4,947,482 | 8/1990 | Brown | 395/24 |
| 5,053,638 | 10/1991 | Furutani et al. | 395/24 |
| 5,148,514 | 9/1992 | Arima et al. | 395/24 |
| 5,155,802 | 10/1992 | Mueller et al. | 395/24 |
| 5,175,798 | 12/1992 | Taylor et al. | 395/20 |
| 5,220,496 | 6/1993 | Tanaka et al. | 395/22 |
| 5,220,641 | 6/1993 | Shima et al. | 395/24 |
| 5,255,347 | 10/1993 | Matsuba et al. | 395/23 |
| 5,259,064 | 11/1993 | Furuta et al. | 395/22 |
| 5,274,746 | 12/1993 | Mashiko | 395/24 |
| 5,280,792 | 1/1994 | Leong et al. | 395/22 |
| 5,293,453 | 3/1994 | Frazier | 395/22 |
| 5,293,457 | 3/1994 | Arima et al. | 395/24 |
| 5,298,796 | 3/1994 | Tawel | 395/24 |
| 5,299,286 | 3/1994 | Imondi et al. | 395/27 |
| 5,303,328 | 4/1994 | Masui et al. | 395/22 |
| 5,308,915 | 5/1994 | Ohya et al. | 395/22 |
| 5,343,555 | 8/1994 | Yayla et al. | 395/27 |
| 5,369,731 | 11/1994 | Masumoto et al. | 395/24 |

FOREIGN PATENT DOCUMENTS 1-121916  5/1989  Japan.
1-237754  9/1989  Japan.

OTHER PUBLICATIONS

Eberhardt et al, "Design of Parallel Hardware Neural Network Systems From Custom VLSI 'Building Block' Chips" IJCNN, Jun. 1989.
Murry et al, "A synchronous VLSI Neural Networks Using Pulsestream arithmetic", IEEE Journal of Solid State Circuits, 1988.
Goser et al, "VLSI Technologies for Artificial Neural Networks", IEEE Micro, 1989.
Teleaven, et al, "VLSI Architectures for Neural Networks", IEEE Micro, 1989.
"A 336-Neuron 28k-Synapse Self-Learning Neural Network Chip with Branch-Neuron-Unit Architecture", by Yutaka Arima et al., 1991 IEEE International Solid-State Circuits Conference, pp. 182–183.
"A BiCMOS Analog Neural Network with Dynamically Updated Weights", by Takayuki Morishita et al., 1990 IEEE International Solid-State Circuits conference, pp. 142–143.

*Primary Examiner*—George B. Davis
*Attorney, Agent, or Firm*—Lowe, Price, LeBlanc & Becker

[57] ABSTRACT

A self-organizable neural network expressing unit includes a plurality of neuron units electronically expressing nerve cell bodies, and a plurality of synapse expressing units electronically expressing synapses for coupling neuron units through programmed coupling strengths represented by synapse load values, and a control circuit for supplying a pattern of random number data as an educator data. When the pattern of random number data is generated, the neural network expressing unit carries out correction of synapse load values as in a learning mode of operation using the pattern of random number data as an educator data. The memorized internal states in the neural network expressing unit is reinforced based on a faded memory thereof, and the synapse load values are precisely maintained for a long time, resulting in a reliable neural network expressing unit.

16 Claims, 34 Drawing Sheets

FIG. 5

STATE & ATTRIBUTE OF NEURON

| ATTRIBUTE OF NEURON | SR(P) | Ise∫S | STATE Si OF NEURON : Si |
|---|---|---|---|
| HIDDEN | H | — | INTERNAL ACTIVE VALUE ($\overline{Comp}$) |
| OUTPUT | L | H/L | INTERNAL ACTIVE VALUE ($\overline{Comp}$)/SR(T) |
| INPUT | L | L (FIXED) | $\overline{SR(T)}$ |

Ise∫S = L IN PLUS LEARNING PHASE

NEURAL NETWORK EXPRESSING APPARATUS INCLUDING REFRESH OF STORED SYNAPSE LOAD VALUE INFORMATION

BACKGROUND OF THE INVENTION

1. Field of the Invention

The present invention relates to a semiconductor neural network apparatus which electronically expresses a neural network, and more particularly, it relates to a structure for stably maintaining synapse load value information of synapse expressing circuits which express synapses for coupling neurons through prescribed connection strengths. More specifically, the present invention relates to a structure for refreshing synapse load value information of synapse expressing circuits which store the synapse load value information in the form of electric charges thereby expressing synapse load values in analog fashion.

2. Description of the Background Art

Among various computing techniques which are modelled on vital cells (neurons), there is a parallel information processing machine called a Boltzmann machine. The Boltzmann machine, proposed by D. H. Ackley et al. in 1985, is a kind of a mathematical model expressing a neural network, which is characterized in stochastic transition of the states of neurons. When connection strength (hereinafter referred to as a synapse load) Wij between neurons $i$ and $j$ is symmetrical (Wij=Wji) with no self coupling (Wii=0), stationary distribution p(z) of the system (neural network) is provided by the following Boltzmann distribution, assuming that a parameter T expressing the temperature of the system has a finite value:

$$p(z)=C \cdot exp(-U(z)/T)$$

where U(z) represents the potential function of the system, $z$ represents the state in the system taken by the neurons, and C represents a normalization coefficient.

With introduction of the aforementioned probability as to determination on the states of the neurons, it is expected that the neural network system is not trapped by the local minima of state energy but converged to the global minima. In other words, it is expected that a most likely solution can be found. The Boltzmann machine, which is suitable for solving a complicated cost problem, non-algorithmic problems such as pattern recognition and associative memory, is in contrast with a Turning machine, which requires algorithms for solving problems.

In relation to an apparatus which can efficiently express such a Boltzmann machine at a high speed, some attempts have already been made to implement a strong parallel processing system which is modelled on the operation of a neural network by a semiconductor integrated circuit. Before discussing the structure and operation of such a conventional integrated semiconductor neural network device, the operation principle of the Boltzmann machine is now briefly described.

FIG. 29 illustrates the structure and the operation principle of a general neuron model. Referring to FIG. 29, a neuron unit $i$ includes an input part A which receives output signals (state signals) Sk, Sj and Sm from other units $k$, $j$, and $m$, a conversion part B which converts signals received from the input part A in accordance with a predetermined rule, and an output part C which outputs a signal received from the conversion part.

The input part A has prescribed synapse loads W (synapse loads are hereafter generically denoted by symbol W) with respect to the neuron units $k$, $j$ and $m$. For example, the output signal Sk from the neuron unit $k$ is converted to Wik·Sk with a synapse load Wik in the input part A, and transmitted to the conversion part B.

The conversion part B fires when the total sum of the signals received from the input part A satisfies a certain condition, and transmits a signal to the output part C. In such a neuron unit which is modelled on a vital cell, the input part A corresponds to a dendrite and the conversion part B corresponds to the body of a nerve cell, while the output part C corresponds to an axon.

In this neuron model, it is assumed that each neuron unit takes two states of Si=0 (non-firing state) and Si=1 (firing state). Each neuron unit updates its state in response to inputs received therein. The total input of the neuron unit $i$ is defined as follows:

$$Ui=\Sigma Wij \cdot Sj+Wii$$

This total sum Z is obtained with respect to $i$. Symmetrical synapse coupling of Wij=Wji is assumed here, while −Wii corresponds to the threshold value of the neuron unit $i$. In FIG. 29, this threshold value is assumed to be zero.

The states of neuron units are stochastically updated asynchronously among the units. When the neuron unit $i$ updates its state, the new state is 1 with the following probability p(Si=1):

$$p(Si=1)=1/(1+exp(-Ui/T))$$

where T represents a parameter, serving similarly to the temperature in a physical system, which takes a positive value. This parameter is generally called "temperature".

FIG. 30 illustrates the relation between the total sum Ui of the inputs and the probability p(Si=1) as to respective temperature levels T. As understood from FIG. 30, the neuron unit $i$ takes either "0" or "1" with a probability of ½ substantially at random when the temperature T is high. When the temperature T approximates zero, on the other hand, the neuron unit $i$ substantially decision-theoretically follows such a threshold logic that the state is "1" when the total sum of the inputs exceeds a predetermined threshold value.

The state of the Boltzmann machine at a certain time is expressed by combination of ONs (firing states: S=1) and OFFs (non-firing states: S=0) of all units, where S generically represents output signals of the neuron units. A system which is in a certain state has an energy E defined as follows:

$$E=-\Sigma Wij \cdot Si \cdot Sj$$

The total sum Σ is obtained as to all subscripts $i$ and $j$ satisfying a relation of $i<j$. In the above equation, it is assumed that the threshold value of each neuron unit is zero. Such a state is implemented by providing a unit which is normally in an ON state (S=1) for each neuron unit and whose connection strength is equal to the threshold value of each associated unit with an inversed sign.

When the respective neuron units continue operations starting from arbitrary initial states, the Boltzmann machine approaches a stochastic equilibrium state which is determined by the synapse loads W of the respective neuron units. As hereinabove described, the Boltzmann machine takes a state α with the following probability P(α):

$$P(\alpha)=C \cdot exp(-E\alpha/T)$$

where Eα represents energy of the neural network system in the state α.

In such a Boltzmann machine, a technique called simulated annealing is employed in order to reach the global energy minima. A relative probability of two global states α and β is expressed as follows:

$$P(\alpha)/P(\beta)=\exp(-(E\alpha-E\beta)/T)$$

The minimum energy state regularly takes place in the highest probability at an arbitrary temperature. In general, it takes a long time to reach a thermal equilibrium state, and hence it is regarded preferable to start annealing from a high temperature level to gradually reduce the temperature. In general, this state transition is similar to such a state that each crystal atom of a crystal lattice is transferred to a position providing the minimum energy state at a given temperature.

In the Boltzmann machine, it is necessary to find out such weight, i.e., synapse loads W that the network itself can implement probability distribution of input/output data as correct as possible with no external provision of such distribution. In general, a basic equation of a learning rule employed for adjusting such synapse loads W is expressed as follows:

$$\Delta Wij=\eta \cdot (p^+ij-p^-ij) \quad (1)$$

where η represents a coefficient indicating the amount of correction of the synapse load W in a single learning cycle, which is at a positive value, $p^+ij$ represents such an expected value that the states of both neuron units $i$ and $j$ are "1" (firing states) when the neural network is driven by externally supplied educator information to reach an equilibrium state, and $p^-ij$ represents such an expected value that the states of both neuron units $i$ and $j$ are "1" when no educator information is externally supplied.

In the above equation (1), the term of $p^+ij$ indicates that connection between the associated neuron units $i$ and $j$ is reinforced when the both are activated. This corresponds to a reinforced learning mechanism of synapse coupling called Hebb's learning rule.

On the other hand, the term of $p^-ij$ indicates that connection (synapse load Wij) between the associated neuron units $i$ and $j$ is weakened (reduced) when the both are activated with no external output supply. This is called anti-learning in general. A learning algorithm in the Boltzmann machine is now briefly described.

The learning algorithm in the Boltzmann machine includes an operation 1 (plus (+) phase), an operation 2 (minus (−) phase), and an operation 3.

(I) Operation 1 (Plus Phase):

States of input units and output units (visible units) are fixed to specific patterns which are represented by input data and output data (educator data) according to pattern appearance probabilities. The operation 1 includes (a) an annealing process, (b) a data collection process and (c) a process of obtaining $p^+ij$. In the annealing process (a), the states of the respective units are changed as to respective temperature levels T along the following equations (2) and (3):

$$\Delta Ei=\Sigma Wij \cdot Sj \quad (2)$$

$$Pi=1/(1+\exp(-\Delta Ei/T)) \quad (3)$$

In the equation (2), the total sum Σ is obtained with respect to the subscript j. This equation (2) provides an energy gap between states Si of "0" and "1" of the unit $i$ in the energy E of the overall neural network.

The equation (3) provides such a probability that the unit $i$ enters a new state Si of "1" when this energy gap takes place. In the aforementioned process (a), the temperature T, which is started from a high level, is successively reduced. When the temperature T is completely reduced to a low level and a prescribed annealing procedure is terminated, the neural network is assumed to be relaxed to a relatively low energy state, to reach a thermal equilibrium state.

The data collection process (b) obtains such a number of times that respective states S of units which are coupled to each other are "1" after the annealing process (a) is repeated a prescribed number of times.

The process (c) of obtaining $p^+ij$ is to obtain an average value of data obtained in the process (b) after the annealing process (a) and the data collection process (b) are repeated a prescribed number of times in correspondence to an educator pattern, to assume that the average value is $p^+ij$.

(II) Operation 2 (Minus Phase):

The operation 2 (minus phase) similarly includes an annealing process (a), a data collection process (b) and a process (c) of obtaining $p^-ij$. The processes (a), (b) and (c) in the operation 2 are similar to those in the operation 1 (plus phase). In the operation 2 (minus phase), however, states of only units (input units) receiving input data are fixed according to appearance probabilities of educator data. In the operation 2, the processes (a), (b) and (c) are so repeated that an average value thereafter obtained in the process (c) is assumed to be $p^-ij$, similarly to the operation 1.

In the operation 3, the synapse load Wij is changed in accordance with the following relational expression, with the obtained average values $p^+ij$ and $p^-ij$:

$$\Delta Wij=\eta \cdot (p^+ij-p^-ij) \quad (4)$$

The amount of single change of the synapse load is determined by a coefficient η which is a positive constant. As clearly understood from the above expression (4), the amount of change of the synapse load Wij is determined only by the states of the two units (associated units) $i$ and $j$ which are coupled to each other. The final object of learning is to converge the amount ΔWij of change which is expressed in the expression (4) to a value as small as possible, ideally to zero.

Various apparatuses have been proposed in relation to a neural network (called Boltzmann machine) having the aforementioned learning function, which is implemented by a semiconductor electronic circuit. The inventor et al. have already proposed a semiconductor neural network integrated circuit device having a structure suitable for integration as well as high-speed operability and high learning efficiency (refer to Japanese Patent Application No. 1-121916 (1989)).

The present invention is mainly intended to further improve the performance of the neural network integrated circuit device proposed by the inventor et al., while a principal object of the present invention is not restricted to this. In order to facilitate understanding of the structure and operations of the inventive neural network expressing apparatus described later in detail, the neural network integrated circuit device which has already been proposed by the inventor et al. is now described somewhat in detail.

FIG. 31 shows an exemplary overall structure of a semiconductor neural network integrated circuit device proposed by the inventor et al. The integrated circuit device shown in FIG. 31 implements a neural network having five neurons, as an example.

Referring to FIG. 31, the neural network integrated circuit device includes a column of five neuron units NU1, NU2, NU3, NU4 and NU5, and synapse expressing circuits SY1 to SY10 which are arranged substantially in the form of a right-angled triangle. Respective input parts of the neuron units NU1 to NU5 are connected with dendrite signal lines DE1, DE2, DE3, DE4 and DE5, respectively.

The respective neuron units NU1 to NU5 compare signals on the associated dendrite signal lines DE1 to DE5 with annealing information (threshold values) contained therein, to generate state signals S1 to S5 of "1" or "0" on the basis of the results of the comparison.

The neural network integrated circuit device further includes axon signal lines AX1, AX2, AX3, AX4 and AX5 which transmit state signals SI1, SI2, SI3, SI4 and SI5, respectively. The state signals SI1 to SI5 may be externally supplied input data, or output signals of neuron units, i.e., state signals transmitted from another layer.

Each of the synapse expressing circuits SY1 to SY10 transmits a signal W·S obtained by weighting the state signal SI (symbol SI generically denotes the state signals SI1 to SI5) received from the associated axon signal line AX (symbol AX generically denotes the axon signal lines AX1 to AX5) with a synapse load W stored therein, to the corresponding dendrite signal line DE (symbol DE generically denotes the dendrite signal lines DE1 to DE5). In the Boltzmann machine which is the model of this semiconductor neural network integrated circuit device, the synapse load W is so symmetrical that Wij=Wji. Thus, each synapse expressing circuit SY (symbol SY generically denotes the synapse expressing circuits SY1 to SY5) provides two synapse loads.

The axon signal line AX1 is connected to first axon signal input terminals of the synapse expressing circuits SY1, SY2, SY3 and SY4. The axon signal line AX2 is connected to a second axon signal input terminal of the synapse expressing circuit SY1 and first axon signal input terminals of the synapse expressing circuits SY5, SY6 and SY7. The axon signal line AX3 is connected to respective second axon signal input terminals of the synapse expressing circuits SY2 and SY5 and respective first axon signal input terminals of the synapse expressing circuits SY8 and SY9. The axon signal line AX4 is connected to respective second axon signal input terminals of the synapse expressing circuits SY3, SY6 and SY8 and a first axon signal input terminal of the synapse expressing circuit SY10. The axon signal line AX5 is connected to respective second axon signal input terminals of the synapse expressing circuits SY4, SY7, SY9 and SY10.

The dendrite signal line DE1 adds up output signals received from respective first dendrite signal output terminals of the synapse expressing circuits SY1, SY2, SY3 and SY4, and transmits the result to the neuron unit NU1. The dendrite signal line DE2 adds up an output signal received from a second dendrite signal output terminal of the synapse expressing circuit SY1 with those received from first dendrite signal output terminals of the synapse expressing circuits SY5, SY6 and SY7, and transmits the result to the neuron unit NU2. The dendrite signal line DE3 adds up output signals received from respective second dendrite signal output terminals of the synapse expressing circuits SY2 and SY5 with those received from respective first dendrite signal output terminals of the synapse expressing circuits SY8 and SY9, and transmits the result to the neuron unit NU3.

The dendrite signal line DE4 adds up output signals received from respective second dendrite signal output terminals of the synapse expressing circuits SY3, SY6 and SY8 with that received from a first dendrite signal output terminal of the synapse expressing circuit SY10, and transmits the result to the neuron unit NU4. The dendrite signal line DE5 adds up respective output signals received from second dendrite signal output terminals of the synapse expressing circuits SY4, SY7, SY9 and SY10, and transmits the result to the neuron unit NU5. The respective neuron units NU1 to NU5 enter firing (S=1) or non-firing states (S=0) in response to the signals transmitted through the corresponding dendrite signal lines DE1 to DE5.

FIG. 32 is a block diagram schematically illustrating the structure of the synapse expressing circuit SY shown in FIG. 31. Referring to FIG. 32, the synapse expressing circuit SY includes a synapse load value storage circuit 101 which stores synapse load value information, a learning control circuit 110 which generates a synapse load correction signal in response to associated two state signals (axon signals) Si and Sj in a learning mode of the neural network, a synapse load correction circuit 103 which corrects the synapse load value information stored in the synapse load value storage circuit 101 in response to the synapse load correction signal, a synapse coupling expressing circuit 105 which weights the state signal Sj received at the second axon signal input terminal with the synapse load value stored in the synapse load storage circuit 101 and transmits the weighted signal Wij·Sj to a dendrite signal line DEj, and another synapse coupling expressing circuit 107 which multiplies the synapse load value being stored in the synapse load value storage circuit 101 with the state signal Si (axon signal) being transmitted to the first axon signal input terminal to generate a signal Wji·Si onto another dendrite signal line DEi.

The synapse load expressed by the synapse expressing circuit SY is so symmetrical that Wji=Wij. This synapse load value information is stored in the synapse load value storage circuit 101. The synapse load value storage circuit 101 includes a capacitor CA which stores the synapse load value information in the form of electric charges. The amount of charges stored in the capacitor CA is continuously changeable so that the synapse load value stored in the synapse load value storage circuit 101 can be changed in an analog fashion.

The learning control circuit 110 includes a terminal P which receives a control signal Acp indicating execution/non-execution of learning, a terminal C which receives a signal C± indicating a learning phase (plus or minus phase), an input terminal S1 which receives the state signal Si, another input terminal S2 which receives the other state signal Sj, a terminal Ip which generates a first correction signal I for increasing the synapse load value stored in the synapse load value storage circuit 101 in response to the state signals Si and Sj in the learning mode, and another terminal Dp which generates a second correction signal D for reducing the synapse load value stored in the synapse load value storage circuit 101 in response to the state signals Si and Sj in the learning mode.

The synapse load correction circuit 103 includes a terminal V which receives the first correction signal I, a terminal L which receives the second correction signal D, and an output terminal M which generates a signal for adjusting the synapse load value stored in the synapse load value storage circuit 101 in response to the correction signals I and D received in the terminals V and L.

The capacitor CA included in the synapse load value storage circuit 101 has an electrode connected to a node N and another electrode coupled to a reference potential V. The amount of charges stored in the capacitor CA is increased or decreased in response to the signal received from the synapse load correction circuit 103.

Each of the synapse coupling expressing circuits 105 and 107, which are identical in structure to each other, includes a state signal input terminal Vs for receiving the state signal S (Si or Sj), a terminal Vc for receiving the synapse load value information stored in the synapse load value storage circuit 101, and a terminal Io for outputting a current (loaded current) indicating the product of the state signal S and the synapse load value.

FIG. 33 illustrates an exemplary structure of the learning control circuit 110 shown in FIG. 32. Referring to FIG. 33, the learning control circuit 110 includes an inverter circuit G2 which receives the learning phase indication signal C±, a two-input NAND circuit G3 which receives the state signals Si and Sj supplied to the input terminals S1 and S2, a two-input NOR circuit G4 which receives the learning control signal Acp supplied to the terminal P and outputs from the inverter circuit G2 and the NAND circuit G3, and another two-input NOR circuit G5 which receives the learning control signal Acp, the learning phase indication signal C± and an output from the NAND circuit G3. The NOR circuit G4 generates the first correction signal I through the terminal Ip, while the NOR circuit G5 generates the second correction signal D through the terminal Dp. The operation of this learning control circuit 110 is now described.

In a non-learning mode, the control signal Acp is fixed at a high potential level. In this case, both outputs of the NOR circuits G4 and G5 are fixed at low potential levels regardless of the logical states of the state signals Si and Sj received at the terminals S1 and S2 respectively, and no correction signals I and D are generated. The synapse load value stored in the synapse load value storage circuit 101 is not corrected in this case.

In learning, a pulse signal having a constant period and a constant pulse width is supplied to the terminal P as the learning control signal Acp. In this case, the correction signals generated from the terminals Dp and Ip are switched in response to the learning phase indication signal C± received at the learning control input C.

In the plus phase, the learning phase indication signal C± is set at a high level, so that the output D of the NOR circuit G5 is fixed at a low level. The first correction signal I which is transmitted from the NOR circuit G4 to the terminal Ip is an inverted signal of the pulse signal Acp, since the output of the NAND circuit G3 goes low only when both state signals Si and Sj are at a high level (firing state: S=1). The synapse load correction circuit 103 increases the synapse load value stored in the synapse load value storage circuit 101 according to the pulse number of the first correction signal I ($\Delta W_{ji}>0$).

In the minus phase, the learning phase indication signal C± is set at a low level, so that the output signal I of the NOR circuit G4 is fixed at a low level. The NOR circuit G5 functions as an inverter circuit in this state since the output of the NAND circuit G3 goes low only when both state signals Si and Sj are at the high level, to generate an inverted signal of the pulse signal Acp as the second correction signal D. The synapse load correction circuit 103 reduces the synapse load value stored in the synapse load value storage circuit 101 in response to the pulsing second correction signal D ($\Delta W_{ij}<0$). Namely, the learning control circuit 110 implements the following learning rule:

$$\Delta W^+_{ji} = \eta \cdot S_i \cdot S_j$$

$$\Delta W^-_{ji} = -\eta \cdot S_i \cdot S_j$$

where $\eta$ corresponds to the number of pulses supplied to the terminal P.

The signs provided to the amount $\Delta W$ of correction and the coefficient $\eta$ correspond to the learning phases.

The control signal Acp and the learning phase indication signal C± received at the terminals P and C are supplied by an external control circuit (not shown). This learning control circuit 110 is provided in correspondence to each synapse expressing circuit, to increase or decrease the synapse load value according to the learning phase only when both of the related two state signals Si and Sj are in the firing state.

FIG. 34 illustrates the structures of the synapse coupling expressing circuit 107, which generates the dendrite signal Wji·Si from the first state signal Si in the synapse expressing circuit SY shown in FIG. 32. The other synapse coupling expressing circuit 105 is similar in structure to this synapse coupling expressing circuit 107 shown in FIG. 34.

Referring to FIG. 34, the synapse coupling expressing circuit 107 includes p-channel MOS (insulated gate field effect) transistors PT1 and PT2 forming a first current path circuit, p-channel MOS transistors PT3 and PT4 forming a second current path circuit, and p-channel and n-channel MOS transistors PT5 and NT1 forming a third current path circuit.

The p-channel MOS transistor PT5 and n-channel MOS transistor NT1 are complementarily connected between a reference voltage (e.g., supply potential) node Vdd and a ground potential node VGND, to form an inverter circuit which inverts the state signal Si received at a terminal Vs.

The p-channel MOS transistor PT1 has a source connected to the reference voltage node Vdd, a gate connected to an output node N2 of the synapse load value storage circuit 101, and a drain connected to a source of the p-channel MOS transistor PT2. The p-channel MOS transistor PT2 has a gate connected to an output node N10 of the inverter circuit formed by the transistors PT5 and NT1, and a drain connected to a synapse coupling current output node Io.

The p-channel MOS transistor PT3 has a source connected to the reference voltage node Vdd, a gate connected to a bias voltage supply node Vb for supplying the bias voltage Vb, and a drain connected to a source of the p-channel MOS transistor PT4. The p-channel MOS transistor PT4 has a gate connected to the state signal input node Vs, and a drain connected to the loaded current output node Io. The reference voltage node and the reference voltage transmitted thereto are denoted by the same symbol.

The p-channel MOS transistor PT5 has a source connected to the reference voltage node Vdd, a gate connected to the state signal input node Vs, and a drain connected to a source of the n-channel MOS transistor NT1.

The p-channel MOS transistors included in the same current path circuit have the same gate widths, i.e., the same conductances. However, the gate widths, i.e., the conductances of the p-channel MOS transistors included in different current path circuits are different from each other. Namely, the gate widths of the p-channel MOS transistors PT1 and PT2 are set twice as large as those of the p-channel MOS transistors PT3 and PT4, for example. Thus, the first current path circuit formed by the transistors PT1 and PT2 can feed a larger current flow than the second current path circuit formed by the transistors PT3 and PT4.

FIG. 34 also shows the structure of the synapse load correction circuit 103 and the synapse load value storage circuit 101. In the synapse load value storage circuit 101 shown in FIG. 34, the position of the capacitor is different from that shown in FIG. 32, while its action is identical to that of the circuit shown in FIG. 32.

The synapse load value storage circuit 101 includes a single capacitor C0. This capacitor C0 has an electrode connected to the node N2, and another electrode connected to a node N3 receiving the reference voltage node Vdd.

The synapse load correction circuit 103 includes a capacitor C1 which is provided between the input terminal V for receiving the first correction signal I and a node N5, another capacitor C2 which is provided between the input terminal L for receiving the second correction signal D and a node N6, diodes D2 and D1 which are forward-connected between the node N2 and the reference voltage supply node Vdd (node N3), and diodes D4 and D3 which are forward-connected between the bias voltage supply node Vb (node N1) and the node N2.

The capacitor C1 and the diodes D1 and D2 provide a path for extracting positive charges stored in the node N2 of the capacitor C0 in response to the first correction signal I which is received at the input terminal V. The capacitor C2 and the diodes D3 and D4 provide a path for injecting positive charges into the capacitor C0 in response to the second correction signal D which is received at the second correction signal input terminal L.

In general, the bias voltage Vb and the reference voltage Vdd, which is an operating power source voltage, for example, satisfies the following relation:

$$VGND \leq Vb < Vdd$$

The operation is now described.

When the pulsing correction signal I is supplied to the capacitor C1 through the terminal V, positive electric charges are extracted from the capacitor C0 by a charge pumping operation of the capacitor C1, to lower the potential of the node N2. Every time the pulsing second correction signal D is supplied to the capacitor C2, positive electric charges are injected into the node N2 of the capacitor C0 to increase the potential of the node N2. Due to this structure, the single capacitor C0 expresses both excitatory coupling and inhibitory coupling. An operation for correcting the synapse load value stored in this synapse load value storage circuit 101 is described in later in detail. The operation of the synapse coupling expressing circuit 107 is now described.

(i) When the state signal Si is at a low level:

In this case, the transistors PT4 and PT5 enter ON states and the transistors PT2 and NT1 enter OFF states. The potential of the node N10 goes to the reference voltage level Vdd through the transistor PT5. Thus, a constant current corresponding to the bias voltage Vb, which is supplied to the gate of the transistor PT3, flows out from the output terminal Io.

(ii) When the state signal Si is at a high level:

In this case, the transistor PT4 enters an OFF state and the transistor PT2 enters an ON state (the potential of the node N10 goes to the ground potential VGND level). A current Ids which is corresponding to a gate potential of the transistor PT1 with reference to a source potential (potential of the node N2), i.e., a charge potential Vc of the capacitor C0 (potential of the node N2), flows out from the output terminal Io.

When an amount Q0 of electric charges stored in the node N2 of the capacitor C0 is zero, the potential Vc of the node N2 is equal to the reference voltage Vdd. The source potential of the transistor PT1 is at the reference voltage level Vdd. Thus, a current corresponding to a potential (Vdd−Vc)=0 flows from the reference voltage supply node Vdd to the output terminal Io through the transistors PT1 and PT2. The gate widths of the transistors PT1 and PT2 are larger than those of the transistors PT3 and PT4. When the state signal Si is at a high level and Vc=Vb, the output terminal Io feeds a current which is larger than that flowing when the state signal Si is at a low level.

When the node N2 of the capacitor C0 stores a negative amount −Q0 of electric charges, the potential Vc of the node N2 is (Vdd−Q0·Ca) and the gate potential of the transistor PT1 is −Q0·Ca, whereby the impedance of the p-channel MOS transistor PT1 is reduced and the amount of the flowing current is increased. That current flow becomes greater than a constant current flowing through the transistor PT3 at the time of the state signal Si of "1". Symbol Ca represents the capacitance of the capacitor C0.

Positive charges are extracted from the node N2 of the capacitor C0 every time the first correction signal I is applied, whereby the impedance of the transistor PT1 is reduced and the value of the current Ids flowing to the output terminal Io is increased. On the other hand, positive charges are injected into the node N2 of the capacitor C0 every time the second correction signal D is applied, whereby the value of the current Ids supplied from the transistor PT1 to the node N4 is reduced.

Thus, it is possible to express both of excitatory coupling and inhibitory coupling by the single capacitor C0, by adjusting the amount of charges stored in the capacitor C0 in response to the correction signals I and D in the learning mode. Further, it is also possible to set the synapse load value expressed by the capacitor C0 at an arbitrary value for expressing the synapse load value in an analog fashion since this synapse load value is provided by the amount of charges stored in the capacitor C0. Description is now made on an operation of correcting the synapse load value in the learning mode.

When an electrode of the capacitor C0 connected to the node N2 stores a negative amount −Q0 of charges in the synapse load value storage circuit 101 formed by the capacitor C0, the following voltage is developed at the node N2 which is connected to the gate of the p-channel MOS transistor PT1:

$$Vc=(Vdd-Q0 \cdot Ca)$$

Therefore, the voltage Vc of the node N2 is equal to Vdd when Q0=0. On the other hand, the voltage Vc of the node N2 is reduced as the value of Q0 is increased, i.e., as the amount −Q0 of negative charges is increased. Reduction of the voltage Vc of the node N2 indicates increase of the synapse load value, while increase of the former indicates reduction of the latter.

In the first current path circuit including the p-channel MOS transistor PT1, a gate-to-source voltage (hereinafter simply referred to as "gate voltage") of the p-channel MOS transistor PT1 is −(Vdd−Vc). A constant current defined by this gate voltage −(Vdd−Vc) flows to the node N4 through the transistor PT1. When Q0=0, the current flowing in the transistor PT1 is minimized as Ids=0 (when the p-channel MOS transistor has a negative threshold voltage), while the potential of the node N2 is reduced and the current Ids flowing through the transistor PT1 is increased as the amount −Q0 of negative charges is increased. The operation of the synapse load correction circuit 103, which is formed by two charge pumping circuits, is now described with reference to FIGS. 35A and 35B showing the respective charge pumping circuits.

With reference to FIG. 35A, an operation for injecting positive charges into the node N2 of the capacitor C0 is now described. Referring to FIG. 35A, the pulse signal D is supplied to a circuit which is formed by diodes D13 and D14 and a capacitor C12 implementing a charge pumping operation for injecting positive charges into a capacitor C20. The diode D13 has an anode connected to a node N26, and a cathode connected to one electrode of the capacitor C20 through a node N22. The diode D14 has a cathode connected to the node N26, and an anode connected to a node N21. The bias voltage Vb is supplied to the node N21. The diodes D13 and D14 correspond to the diodes D3 and D4 shown in FIG. 34, and the capacitor C12 corresponds to the capacitor C2 shown in FIG. 34. The capacitor C20 corresponds to the capacitor C0 shown in FIG. 34. The capacitor C12 receives the pulse signal D through a node N28.

The capacitor C12 has an electrode connected to the node N26, and another electrode coupled to receive the pulse signal D through a node N28. The operation of the circuit shown in FIG. 35A is now described.

Consider that the pulse signal D is supplied to the node N28. When the pulse signal D falls from a high level to a low level, the potential of the node N26 falls in a negative direction due to a capacitive coupling operation of the capacitor C12, whereby the diode D14 enters an ON state. Thus, a current i1 flows from the node N21 to the node N26. At this time, the diode D13 is in an OFF state.

When the pulse signal D rises from a low level to a high level, the potential of the node N26 is increased by a charge pumping operation through the capacitor C12, whereby the diode D13 enters an ON state and the diode D14 enters an OFF state. Thus, a current i2 flows from the node N26 to the node N22. The values of the currents i1 and i2 are determined by the capacitance of the capacitor C12, an amount Q20 of charges stored in the capacitor C20, forward I-V (current-voltage) characteristics of the diodes D13 and D14, and the pulse width of the pulse signal D.

Namely, the current flows into the node N22 every cycle of the pulse signal D to charge the capacitor C20, thereby increasing the amount of charges (positive charges) stored in the capacitor C20. The potential of the node N22 (node N2) is increased by the pulse signal D, which corresponds to the second correction signal D.

With reference to FIG. 35B, a charge pumping operation for extracting positive charges from the capacitor C0 is now described. In this case, the charge pumping operation is implemented by diodes D11 and D12 and a capacitor C11. The diode D11 has a cathode connected to a node N13, and an anode connected to a node N15. The reference voltage Vdd is supplied to the node N13. The diode D12 has a cathode connected to the node N15, and an anode connected to one electrode of a capacitor C10 through a node N12. The capacitor C11 has an electrode connected to the node N15, and another electrode connected to a node N17. The pulse signal I (corresponding to the first correction signal I) is supplied to the node N17.

In this structure, the capacitor C10 corresponds to the capacitor C0 shown in FIG. 34 and the diodes D11 and D12 correspond to the diodes D1 and D2 shown in FIG. 34, while the capacitor C11 corresponds to the capacitor C1 shown in FIG. 34. The operation is now described.

The pulse signal I is supplied to the node N17. When the pulse signal I falls from a high level to a low level, the potential of the node N15 falls by capacitive coupling of the capacitor C11, whereby the diode D12 enters an ON state and the diode D11 enters an OFF state. In this state, a current i3 flows from the node N12 to the node N15.

When the pulse signal I rises from a low level to a high level, the potential of the node N15 is increased by a charge pumping operation of the capacitor C11, so that the diode D11 enters an ON state when the potential of the node N15 exceeds the reference voltage Vdd. The diode D12 enters an OFF state, and a current i4 flows from the node N15 to the node N13. This current i4 is supplied from the capacitor C10. Namely, the value of this current i4 is determined by the current i3. Therefore, a current flows from the node N12 to the reference voltage node Vdd through the node N15 every cycle of the pulse signal I, to reduce the amount of positive charges stored in the capacitor C10. The values of the currents i3 and i4 are determined by the capacitances of the capacitors C10 and C11, the amount of charges stored in the capacitor C10, forward I-V characteristics of the diodes D11 and D12, and the pulse width of the pulse signal I. The pulse signal I is used as the first correction signal I, so that the amount of charges stored in the capacitor C10 can be adjusted according to the pulse number thereof.

The synapse load correction circuit shown in FIG. 34 is obtained by combining the charge pumping circuits shown in FIGS. 35A and 35B. In the charge pumping circuits shown in FIGS. 35A and 35B, the capacitors C20 and C10 are made to correspond to the capacitor C0 and the nodes N22 and N12 are made to correspond to the node N2, thereby obtaining the structures of the synapse load correction circuit and the synapse load value storage circuit shown in FIG. 34.

The nodes N28 and N17 shown in FIGS. 35A and 35B correspond to the nodes L and V shown in FIG. 34, respectively. When a pulse signal is supplied to the node V, the amount of charges (negative charges) stored in the node N2 of the capacitor C0 is increased by the diodes D1 and D2 and the capacitor C1, while the amount of charges (negative charges) stored in the node N2 of the capacitor C0 is reduced when the pulse signal is supplied to the node L.

Due to the aforementioned structure, it is possible to control increase and decrease of the amount of charges (negative charges) stored in the capacitor C0 by the numbers and widths of the pulse signals, i.e., the first and second correction signals I and D, which are supplied to the nodes V and L, respectively. In other words, it is possible to control in an analogue fashion the voltage Vc of the node N2 which determines the value of the current flowing out from the loaded current output terminal Io by the pulse signals I and D supplied to the synapse load correction circuit 103.

In the aforementioned synapse expressing circuit, it is possible to easily correct the synapse load value with the pulse signals, while this synapse load value, being determined by the amount of charges stored in the capacitor, is changed in an analog fashion, so that it is possible to implement an arbitrary synapse load value. Since the capacitor occupies a relatively small area, it is possible to obtain a synapse expressing circuit having a learning function with a small number of elements, thereby implementing a highly integrated neural network semiconductor chip having a learning function. However, the following problem is caused since the synapse load value is expressed by the amount of charges stored in the capacitor:

FIG. 36 illustrates the structure of the capacitor C0 forming the synapse load value storage circuit 101. Referring to FIG. 36, the capacitor C0 for expressing a synapse load value comprises a first conductive layer 203 which is formed on a semiconductor substrate 205 with an insulating film 204 underlaid for serving as an electrode, and a second conductive layer 201 which is formed on the first conductive layer 203 with an insulating layer 202 serving as dielectrics underlaid. In such a structure, capacitance of the capacitor C0 is at a constant value which is determined by the thickness of the insulating layer 202 and the facing area of the conductive layers 201 and 203. While the first and second conductive layers 203 and 201 may be connected to either nodes, the second conductive layer 201 is connected to the node N3 and the first conductive layer 203 is connected to the node N2 in FIG. 36, for example.

The synapse load value is provided by the amount of charges stored in the node N2. This synapse load value must be maintained at a constant value during a recall operation (normal operation). Due to the property of the capacitor C0, the stored charges unavoidably leak to change the synapse load value, and hence it is impossible to carry out a correct recall operation at a high speed. The path of such a charge leakage is now described.

FIG. 37 illustrates a connection of diodes included in the synapse load correction circuit. Referring to FIG. 37, diodes D801 and D802 correspond to the diodes D1 and D2 or D3 and D4 shown in FIG. 34. The diode D801 is forward-connected between nodes b and a, while the diodes D802 is forward-connected between nodes c and b. The node b is connected to a charge pumping capacitor, so that charges are injected or extracted through the node b in response to a pulse signal (correction signal).

As shown in FIG. 38, a series body of the diodes D801 and D802 is implemented by a single p-channel MOS transistor PT800 in order to achieve a small occupied area. Referring to FIG. 38, the p-channel MOS transistor PT800 has a substrate region connected to the node a, one conduction terminal and a gate electrode both connected to the node b, and another conduction terminal connected to the node c.

FIG. 39 illustrates the sectional structure of the p-channel MOS transistor PT800 shown in FIG. 38. Referring to FIG. 39, the p-channel MOS transistor PT800 is formed in an N-type well 851 on the surface of a p-type semiconductor substrate 850. The p-channel MOS transistor PT800 includes a high impurity concentration $N^+$ region 852 which is connected to the node a, a high impurity concentration $P^+$ region 853 which is connected to the node b, and a high impurity concentration $P^+$ region 854 which is connected to the node c. A gate electrode 855 is formed on a channel region between the $P^+$ regions 853 and 854 with an underlying insulating film (gate insulating film) 856. This gate electrode 855 is connected to the node a through the $N^+$ region 852.

The diode D801 is formed by the $P^+$ region 853 and the $N^+$ region 852. The diode D802 is formed by the $P^+$ region 853, a channel region, i.e., a surface region of the N-type well 851 under the gate electrode 855, and the $P^+$ region 854.

In the structure shown in FIG. 39, still another diode is formed through the node a, the $N^+$ region 852, the N-type well 851 and the $P^+$ region 854. This diode, which is formed between the nodes a and c, exerts no influence on any charge pumping operation itself. In the element structure shown in FIG. 39, the diode D801 is implemented by a P-N junction diode, whereby it is possible to reduce a reversely flowing discharge current, i.e., a leakage current flowing from the node a to the node c, as well as to reduce parasitic capacitance associated with the node b.

When the element structure shown in FIG. 39 is used to form a series body of diodes, however, depletion layers 861 and 862 are caused in P-N junction portions. Charges are recombined in or diffused through such depletion layers 861 and 862. In the structure shown in FIG. 39, for example, the node c is connected to the electrode providing the synapse load value of the capacitor C0 of the synapse load value storage circuit 101, i.e., the node N2, or the node N1 supplying the bias voltage Vb. The node a is connected to the node N3 providing the reference voltage node Vdd or the node N2 in the structure shown in FIG. 34. Thus, the amount of charges stored in the capacitor C0 is changed by recombination or diffusion of charges in the depletion layers 861 and 862, and hence the synapse load value may not be maintained at a desired value for a long time.

Still another leakage path Ip of charges is formed through a depletion layer or an inversion layer which is formed under an element isolating film 870 for electrically isolating adjacent elements from each other.

When the node a or c is connected to the node supplying the constant voltage Vdd or Vb, this voltage may be changed in operation to generate hole-electron pairs in the N-type well region 851 by impact ionization or the like. The as-generated charges may change the amount of charges stored in the capacitor C0. When the amount of charges stored in the capacitor C0 is changed by such a phenomenon, the synapse load value obtained by learning may not be maintained constant during the recall operation.

FIG. 40 shows a MOS capacitive element, which may be employed as the capacitor C0. In this case, an electrode of the capacitive element is defined by a high impurity concentration $N^+$ region 891 which is formed on the surface of a semiconductor substrate 890, and another electrode 893 is formed on this electrode 891 with an insulating film 892 underlaid. Since the electrode 891 is formed by the diffusion region of high impurity concentration, charges unavoidably leak from this diffusion region to the semiconductor substrate 890, to change the synapse load value with a lapse of time. Further, the amount of charges stored in the impurity region 891 may be changed by potential change of the substrate 890 also in this structure. Also in this case, it is impossible to hold the synapse load value at a value obtained in learning for a sufficiently long time.

Namely, when the synapse load value storage means is formed by a capacitor or a capacitance element, it is impossible to hold a synapse load value which is set by learning or the like for a long time, and hence a stably operating neural network may not be implemented.

SUMMARY OF THE INVENTION

An object of the present invention is to provide a neural network expressing apparatus which can stably hold a synapse load value for a long time.

Another object of the present invention is to provide a neural network expressing apparatus which stably operates over a long time.

A further object of the present invention is to provide a neural network expressing apparatus which can efficiently refresh a synapse load value with a simple structure and a short operating period.

The neural network expressing apparatus of the present invention is characterized in that information stored in each synapse load value storage circuit is refreshed before fading-out of synapse load value information on the basis of remaining storage information, i.e., the amount of charges stored in each synapse load value storage capacitive means itself.

The neural network expressing apparatus in accordance with the present invention refreshes the synapse load value along the output state of each neuron unit, whereby faded storage information is so clearly recovered that it is not necessary to newly apply educator information from the exterior for re-learning or forcibly reset the synapse load value. Thus, the synapse load value information is stably held for a long time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 illustrates correspondence between an attribute of the neuron unit and the states of respective signals shown in FIG. 4 in a list;

DESCRIPTION OF THE PREFERRED EMBODIMENTS (A) First Embodiment

Before explaining a first embodiment of the present invention, the operation principle of this embodiment is now described.

Figure 1:
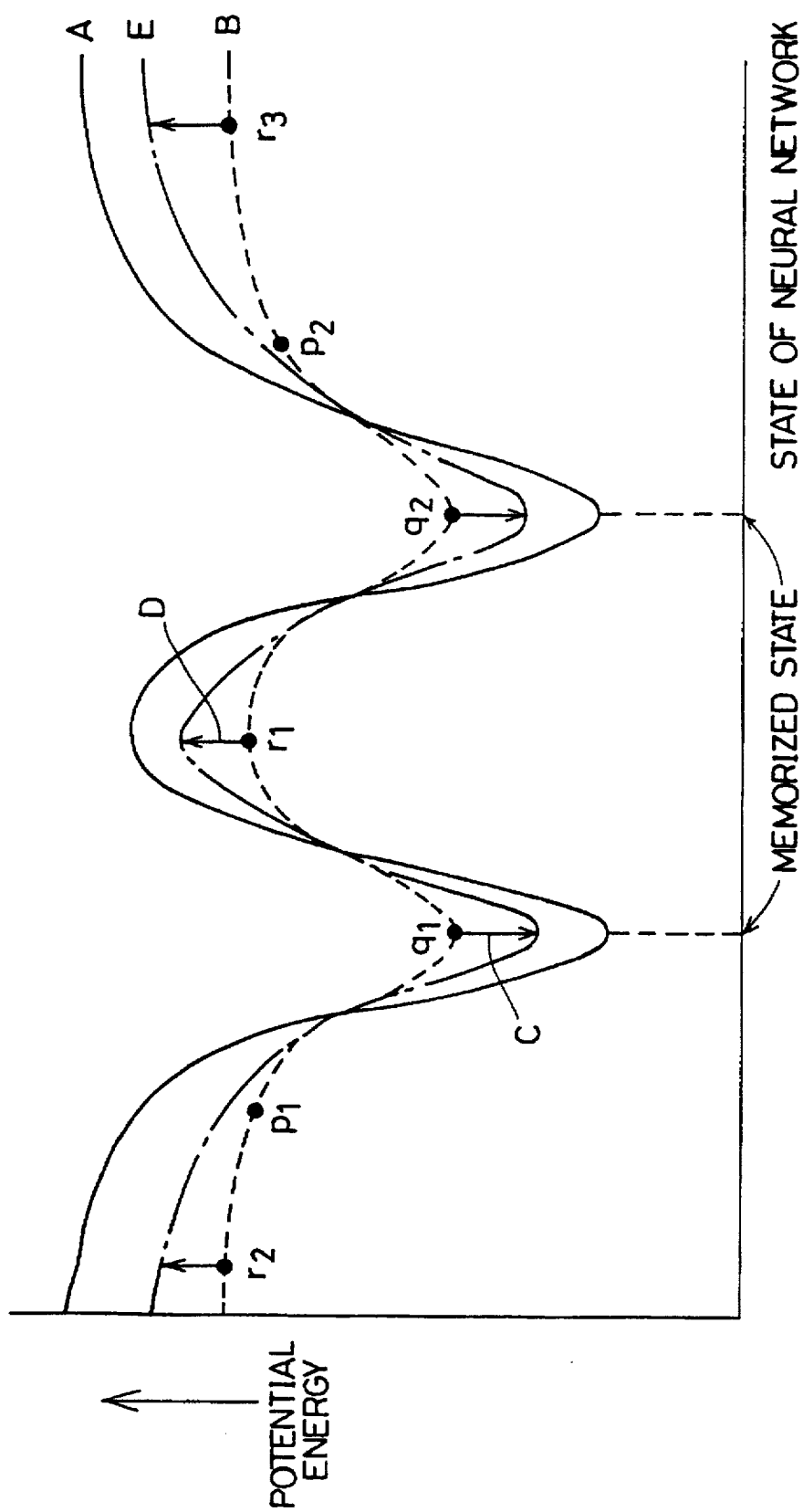
FIG. 1 illustrates a refresh operation according to a first aspect of the present invention.

FIG. 1 illustrates potential energy levels of a neural network with respect to the states thereof. Referring to FIG. 1, the axis of abscissas shows the state of the neural network, and the axis of ordinates shows the potential energy level of the neural network. The neural network includes a plurality of neuron units, so that a state of the neural network are expressed by combinations of respective states of these neuron units. While FIG. 1 one-dimensionally illustrates the states of the neural network for the purpose of convenience, it is assumed that a distance between the states of the neural network correspond to that of the states one-dimensionally represented in FIG. 1.

After learning of the neural network, the learned state provides a minimum value of the potential energy. In a recall operation, the neural network is converged according to an input pattern to a state providing the minimum energy value which is closest to this input pattern. Referring to FIG. 1, a curve A shows the potential energy of the neural network immediately after learning. Symbols q1 and q2 represent states which provide the minimum energy values, i.e., memorized states of the neural network.

If a valley of the potential energy is deep, the memory is also deep, while the memory is shallow if a valley of the potential energy is shallow.

A curve B shows the potential energy of the neural network upon a lapse of a certain time after learning. Charges leak out from a synapse load value information storage capacitor with a lapse of time, to change synapse load value information. This information corresponds to a state of faded memory of learned information, and valleys of the potential energy in the states q1 and q2 are shallow in the curve B. The curve B shows such states that learned information is not yet completely forgotten due to the potential energy having the valleys.

According to the present invention, a refresh operation is performed on the basis of the faded memory having the potential energy profile shown as the curve B to recover or revive the potential energy profile of the curve A, thereby recovering the memories of the learned information. In other words, the following operations are executed in the state of the potential energy shown in the curve B:

(a) A random pattern is employed as an initial state (point p1 or p2 in FIG. 2, for example), to start operating the neural network. The neural network operates in accordance with the given random pattern, so that its internal state makes transition and is converged to a state which provides the closest valley (minimum energy value) shown by the closest point q1 or q2.

(b) It is assumed that this converged state is to be memorized. In the state to be memorized, the load value of such a synapse that both of related neurons are in firing states is increased by a certain amount. This operation would deepen the memory, and the potential energy is changed in a direction for deepening the potential about the converged state (point q1 or q2) as shown by the arrow C in FIG. 1.

(c) Then a new random pattern (point r1, r2 or r3) is set in the neural network. This state has absolutely no correspondence to the valleys of the potential energy, and is assumed not to be memorized. In this state, the load value of such a synapse that both of related neurons are in firing states is reduced by a certain amount. This operation corresponds to the so-called anti-learning, i.e., such a state that the memory of the input pattern is weakened. In this state, the potential energy is changed in a direction to be shallowed about the state (point r1, r2 or r3) as shown by the arrow D.

The series of aforementioned operations (a) to (c) are so repeated that the profile of the potential energy shown by the curve B approaches the potential energy profile shown by the curve A. Referring to FIG. 1, a curve E shows an intermediate state in such a refresh operation.

As to the aforementioned operations (a) to (c), the operation (c) may be repeated after the operations (a) and (b) are repeated. Alternatively, the operation (c) may be executed with a random pattern set in the operation (a). The latter method is employed in this embodiment.

In any operation sequence, a random pattern is employed as an initial state to start operating the neural network for performing an operation similar to "reinforced learning" in a converged state, and then an operation similar to "anti-learning" is executed assuming that a new random pattern is a state not to be memorized. Such operation is so repeated that the valleys of the potential energy are deepened due to the random pattern. In order to further deepen the valleys of the potential for the state to be memorized, a correction coefficient upon reducing the synapse load value by a constant amount may be enlarged so that the amount of change of the synapse load value is different from that in increase thereof.

A structure for implementing the aforementioned refresh method is now described more specifically.

Figure 2:
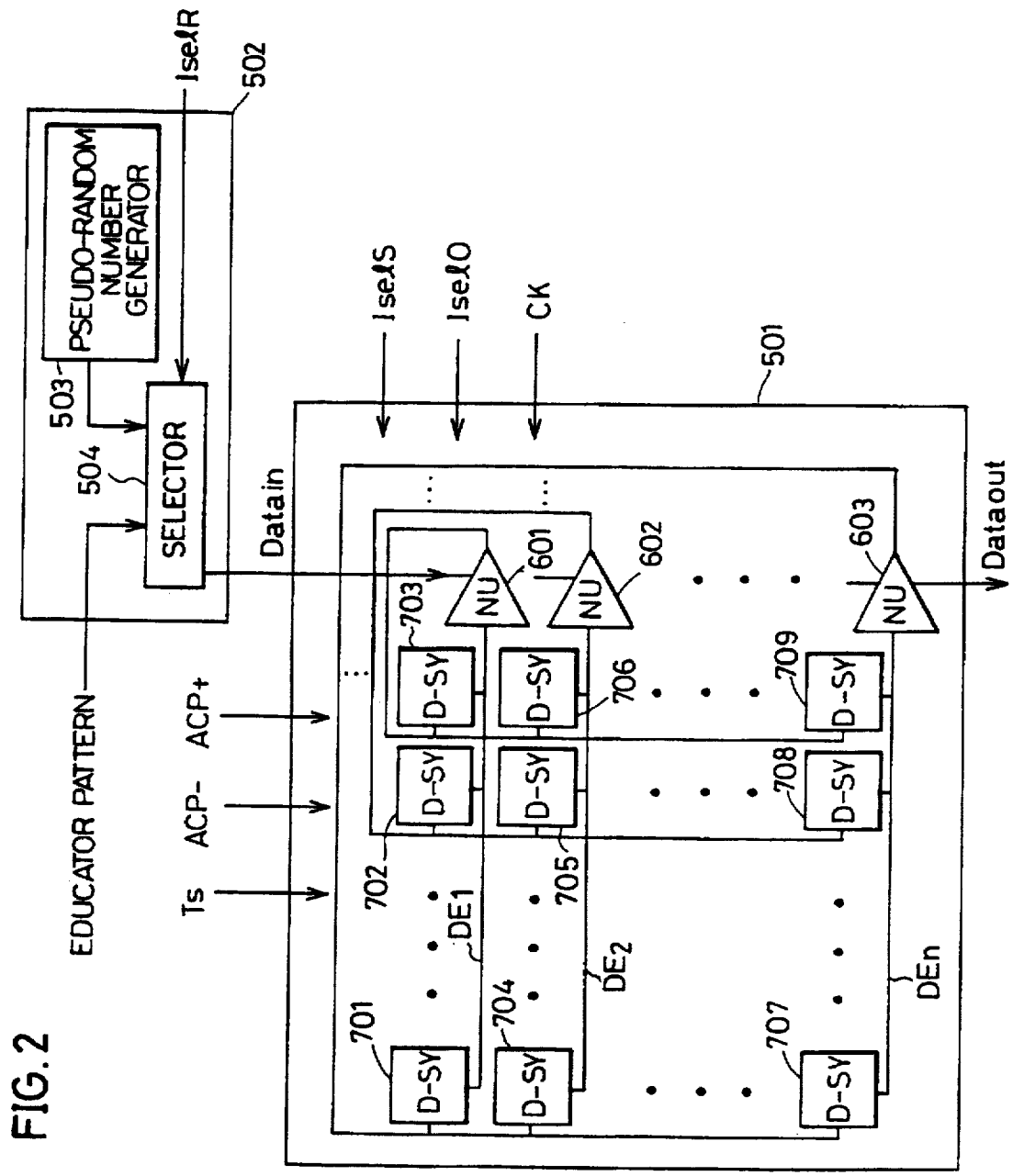
FIG. 2 schematically illustrates the overall structure of a neural network expressing apparatus according to a first embodiment of the present invention.

FIG. 2 illustrates the structure of a neural network expressing apparatus according to the first embodiment of the present invention. This neural network expressing apparatus has a learning function, and includes a neural network expressing unit 501 which is substantially similar in structure to the neural network expressing apparatus shown in FIGS. 31 to 34.

The neural network expressing unit 501 includes synapse expressing units 701 to 709 which are arranged in the form of a matrix, and neuron units 601 to 603 which are arranged in a column.

Figure 32:
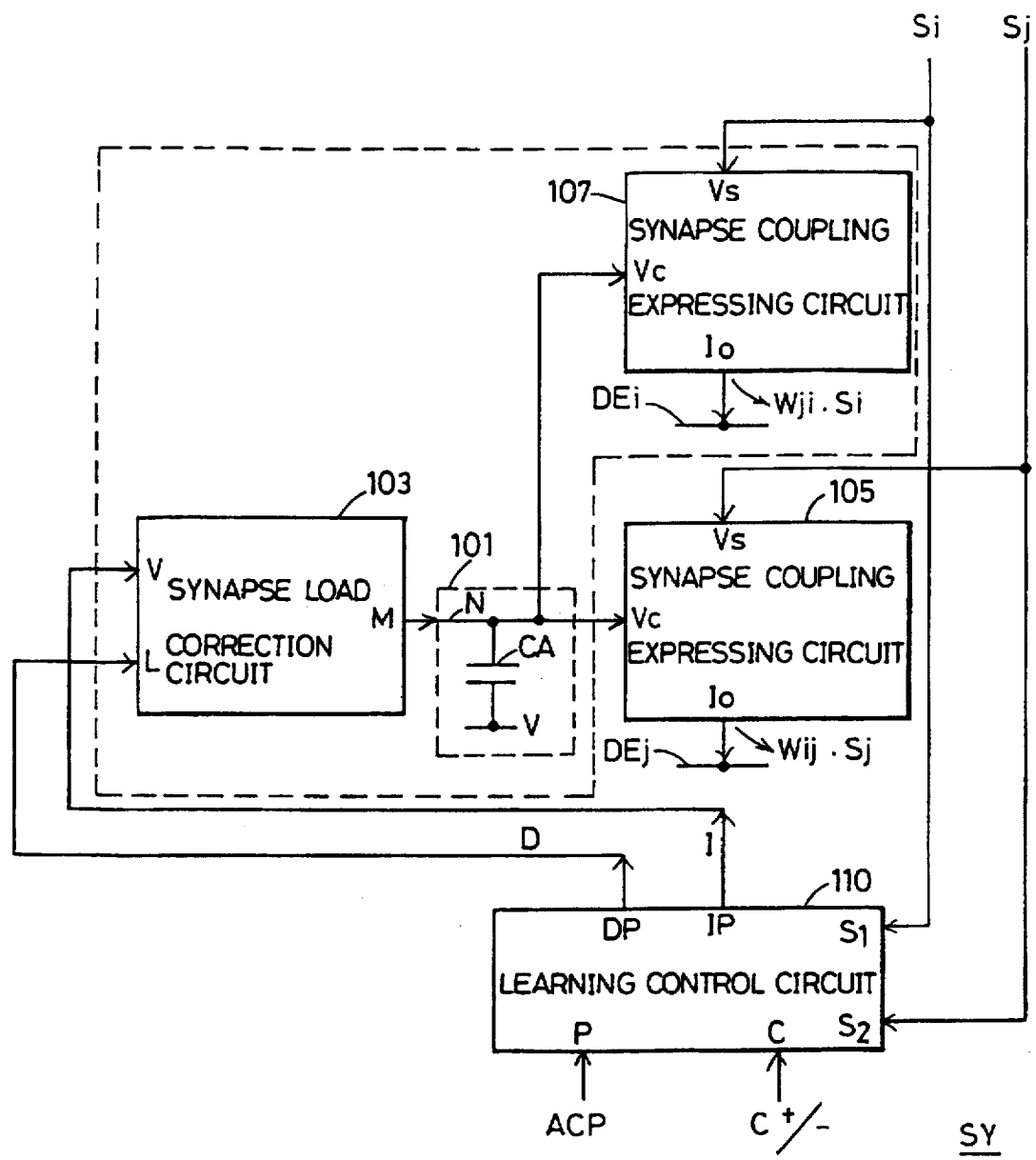
FIG. 32 illustrates the structure of the synapse expressing circuit shown in FIG. 31.
Figure 34:
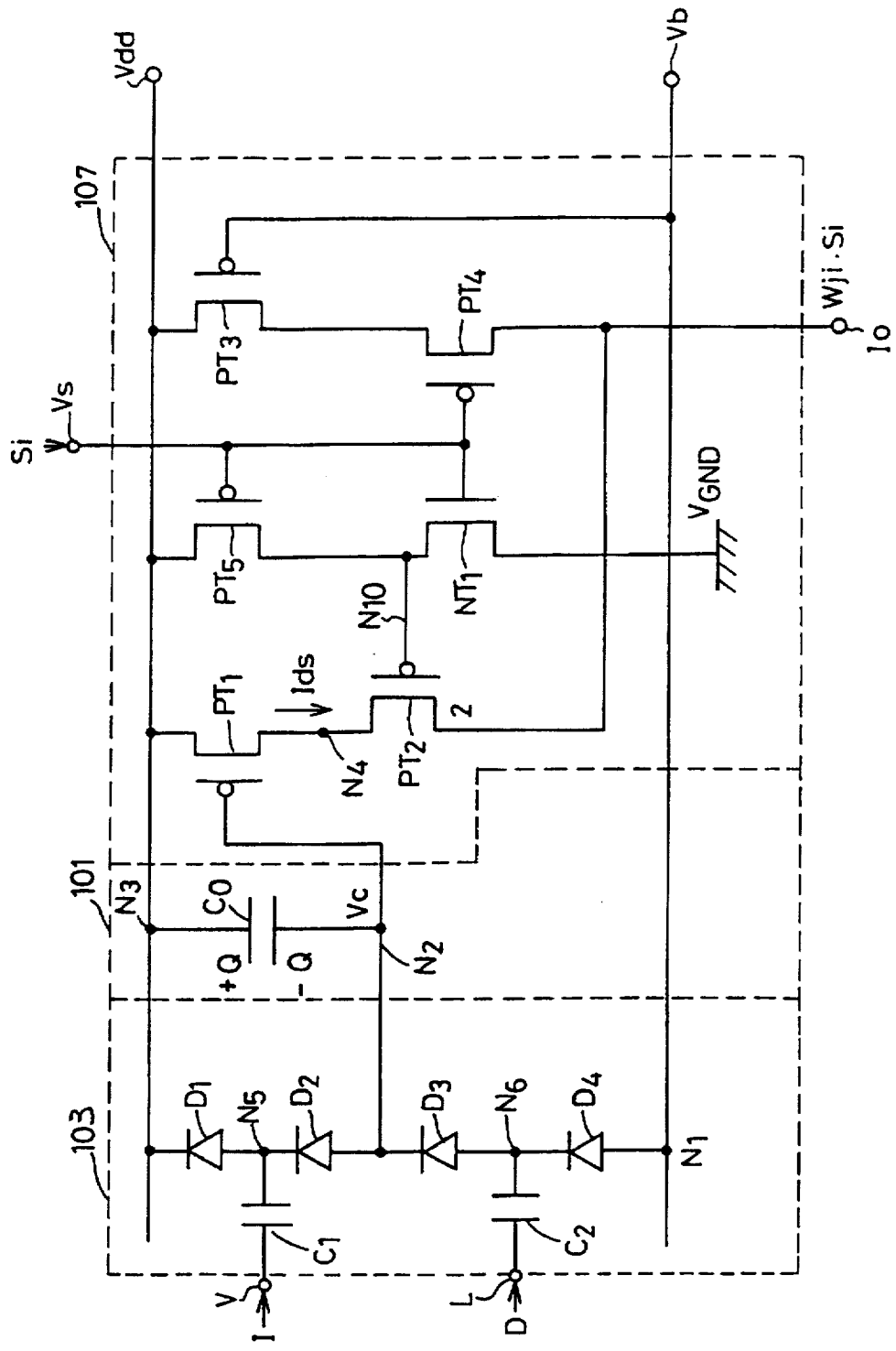
FIG. 34 illustrates the structure of the synapse coupling expressing circuit shown in FIG. 32.
Figure 35A:
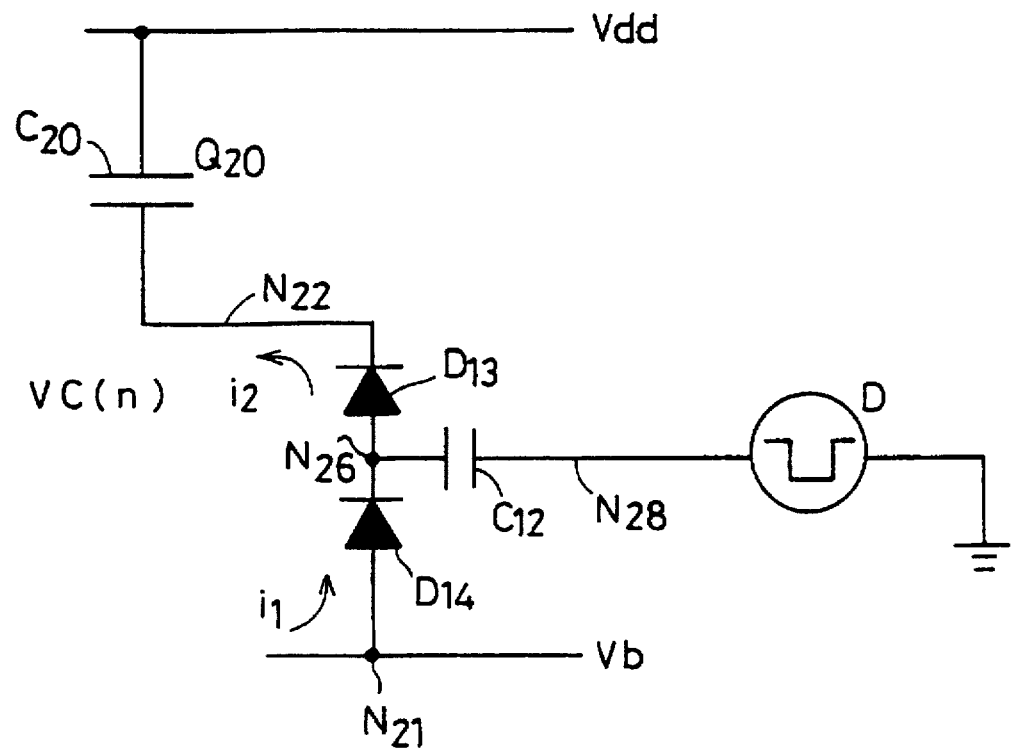
FIGS. 35A and 35B are diagrams for illustrating an operation for correcting a synapse load value in the synapse coupling expressing circuit shown in FIG. 34.
Figure 35B:
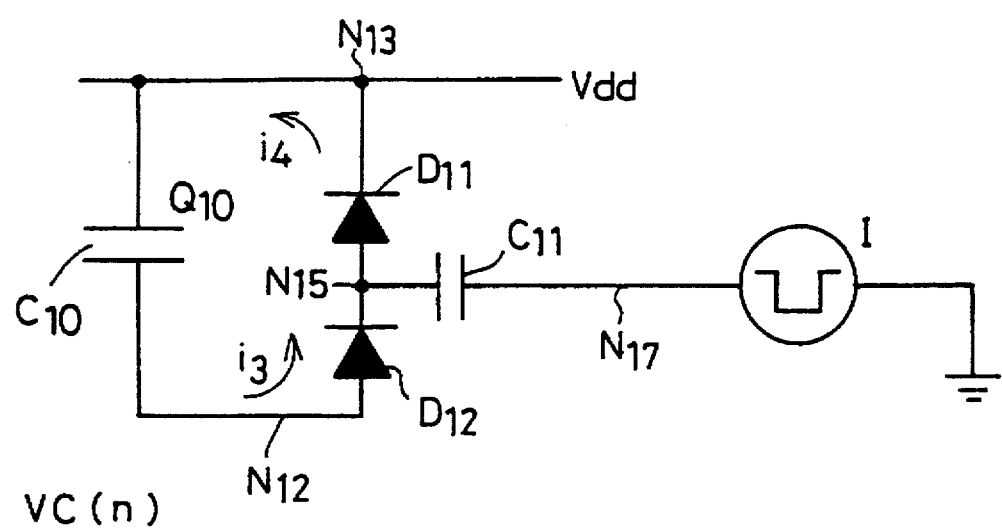
Figure 36:
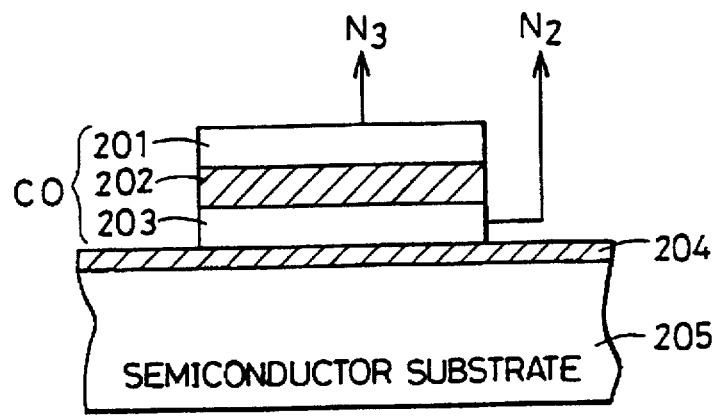
FIG. 36 illustrates the structure of a conventional synapse load value storage capacitor.
Figure 37:
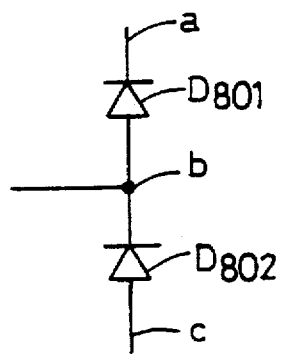
FIG. 37 illustrates the structure of a charge pumping diode in a conventional synapse load value correction circuit.
Figure 38:
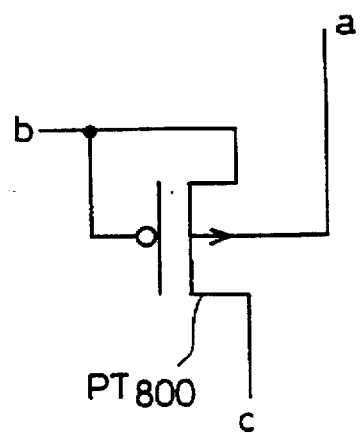
FIG. 38 illustrates a structure for implementing diode connection shown in FIG. 37.
Figure 39:
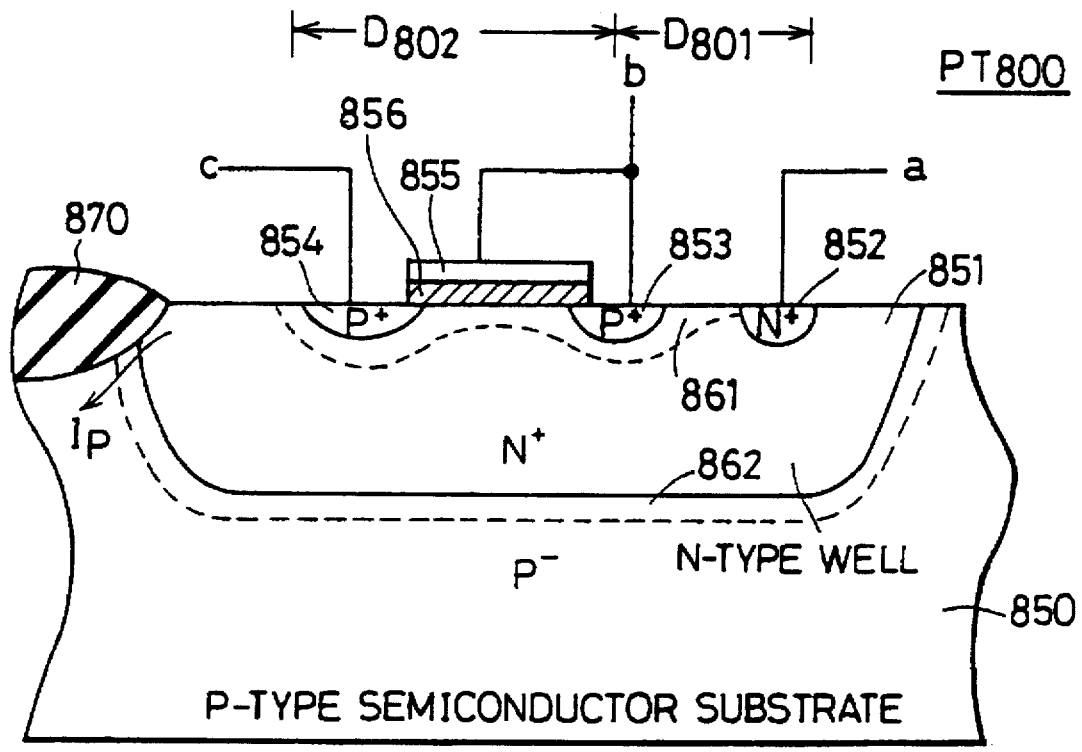
FIG. 39 is a diagram for illustrating a problem of the conventional synapse load value storage circuit.
Figure 40:
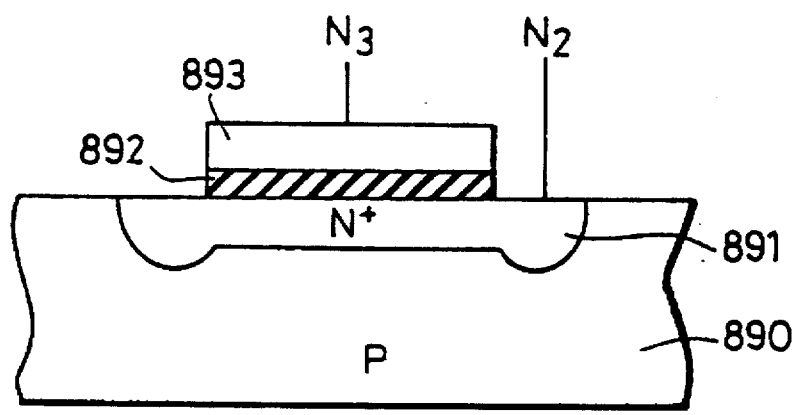
FIG. 40 illustrates another exemplary structure of a conventional synapse load value storage circuit.

Each of the synapse expressing units 701 to 709 stores synapse load value information in its inclusive capacitor as shown in FIG. 32 or 34. The synapse load value information stored in the capacitor is refreshed. The synapse expressing units requiring such refresh operation are hereinafter referred to as dynamic type synapse expressing units, and denoted by symbols D-SY in FIG. 2. On the other hand, synapse expressing units storing synapse load value information in memories such as digital memories with no requirement for refreshing of the synapse load value information are hereinafter referred to as static type synapse expressing units, in contrast.

Referring to FIG. 2, the synapse expressing units which are arranged in the respective rows transmit loaded currents to corresponding neuron units through associated dendrite signal lines DE1 to DEn. More specifically, the synapse expressing units 701, 702 and 703 transmit the loaded currents to the neuron units 601 through the signal line DE1 and the synapse expressing units 704, 705 and 706 transmit the loaded currents to the neuron unit 602 through the signal line DE2, while the synapse expressing units 707, 708 and 709 transmit the loaded currents to the neuron unit 603 through the signal line DE3.

Output signals (state signals) of the neuron units (601 to 603) are transmitted to axon signal input terminals of the synapse expressing units which are arranged in the respective columns. More specifically, the output signal of the neuron unit 603 is supplied to the axon signal input terminals of the synapse expressing units 701, 704 and 707 and the output signal of the neuron unit 602 is supplied to the axon signal input terminals of the synapse expressing units 702, 705 and 708 which are arranged in a column, while the output signal of the neuron unit 601 is supplied to the axon signal input terminals of the synapse expressing units 703, 706 and 709 which are arranged in a column.

In the structure shown in FIG. 2, each synapse expressing unit receives the output signal of a single neuron unit. This arrangement provides the structure of a full connection neural network. When a synapse load value is symmetrical (Wij=Wji), a single synapse expressing unit can express two synapse loads. However, FIG. 2 shows such a structure that a single synapse expressing unit receives the output signal of a single neuron unit and transmits a loaded current to a corresponding neuron unit, in order to clarify connection between each neuron unit and each synapse expressing unit. The present invention may be applied to a general neural network with no assumption of symmetry.

The neuron units 601, 602 and 603 can shift input data Datain to adjacent neuron units, and also can transmit externally supplied educator data and attribute data (data for defining visible and hidden neurons) to the adjacent neuron units. Neuron units 601, 602 and 603 transfer and latch the attribute data inputted and educator information in response to a clock signal CK. Further, the neuron units 601, 602 and 603 can latch output signals thereof and shift the same to the adjacent neuron units in response to a control signal IselO. Such shifting operations are performed in response to a clock signal CK. When the neural network operates to converge to a certain state, the output signals of the neuron units 601, 602 and 603 are internally latched therein and successively outputted as output data Dataout in response to the clock signal CK.

The neural network expressing unit 501 corrects the synapse load values in response to control signals Ts, ACP− and ACP+.

The neural network expressing apparatus further includes an input data control unit 502 for selecting the input data supplied to the neural network expressing unit 501. The input data control unit 502 includes a pseudorandom number generator 503 which generates a pseudorandom number pattern, and a selector 504 which selects one of an externally supplied educator pattern (or recall input pattern) and the random pattern from the pseudorandom number generator 503 in response to a control signal IselR to supply the same to the neural network expressing unit 501.

Figure 3:
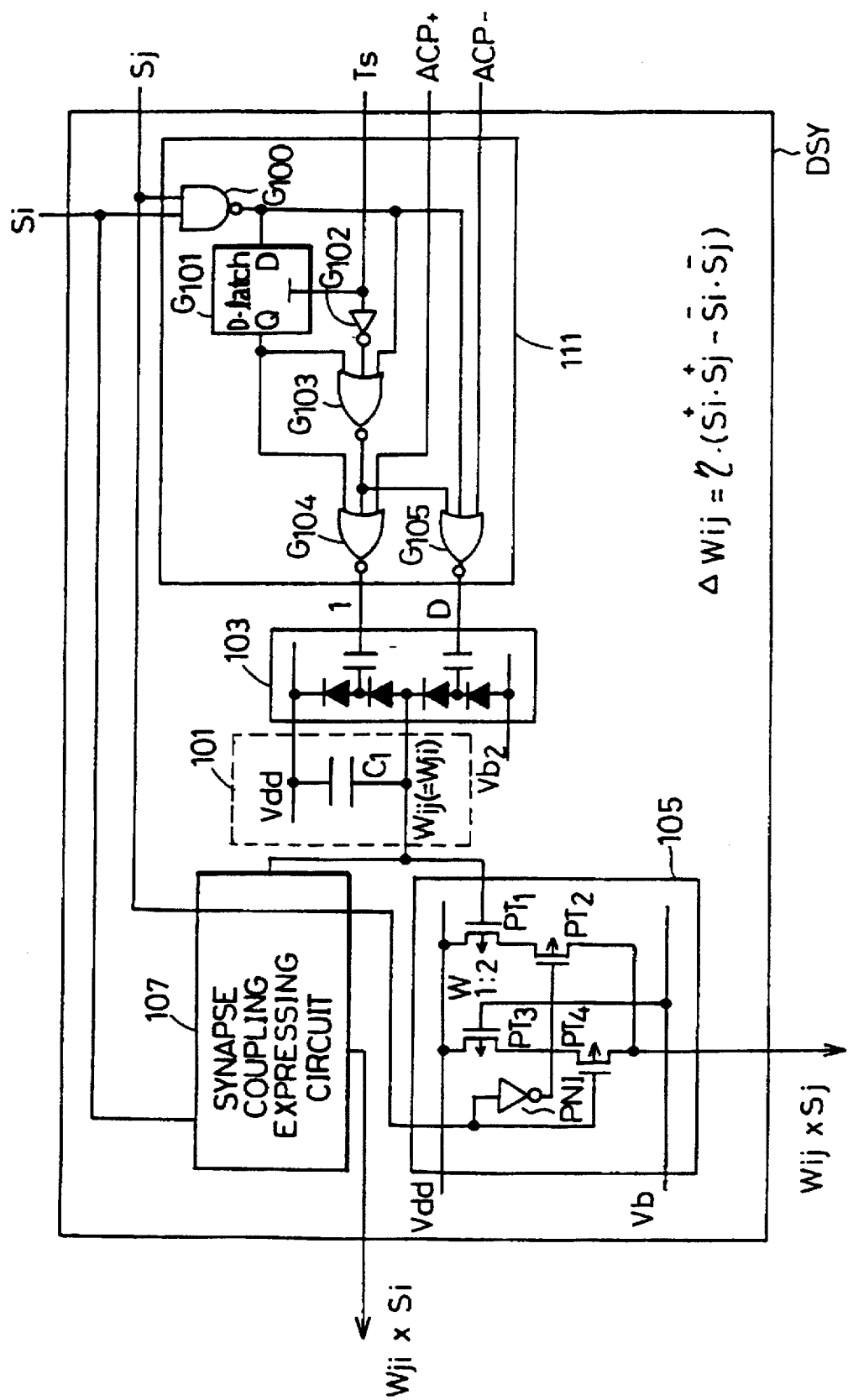
FIG. 3 illustrates the structure of the synapse expressing circuit shown in FIG. 2.

FIG. 3 illustrates the structure for the synapse expressing units 701 to 709 shown in FIG. 2. Referring to FIG. 3, the synapse expressing unit is generically denoted by symbol DSY. The synapse expressing unit DSY receives output signals (state signals) Si and Sj of two neuron units, and supplies loaded currents Wji·Si and Wji·Sj. The synapse expressing unit DSY shown in FIG. 3 expresses symmetrical synapse loads (Wij=Wji), and expresses two synapse expressing units which are on symmetrical positions about a right-upward diagonal line in the arrangement of the synapse expressing units 701 to 709 in the form of the matrix shown in FIG. 2.

Figure 33:
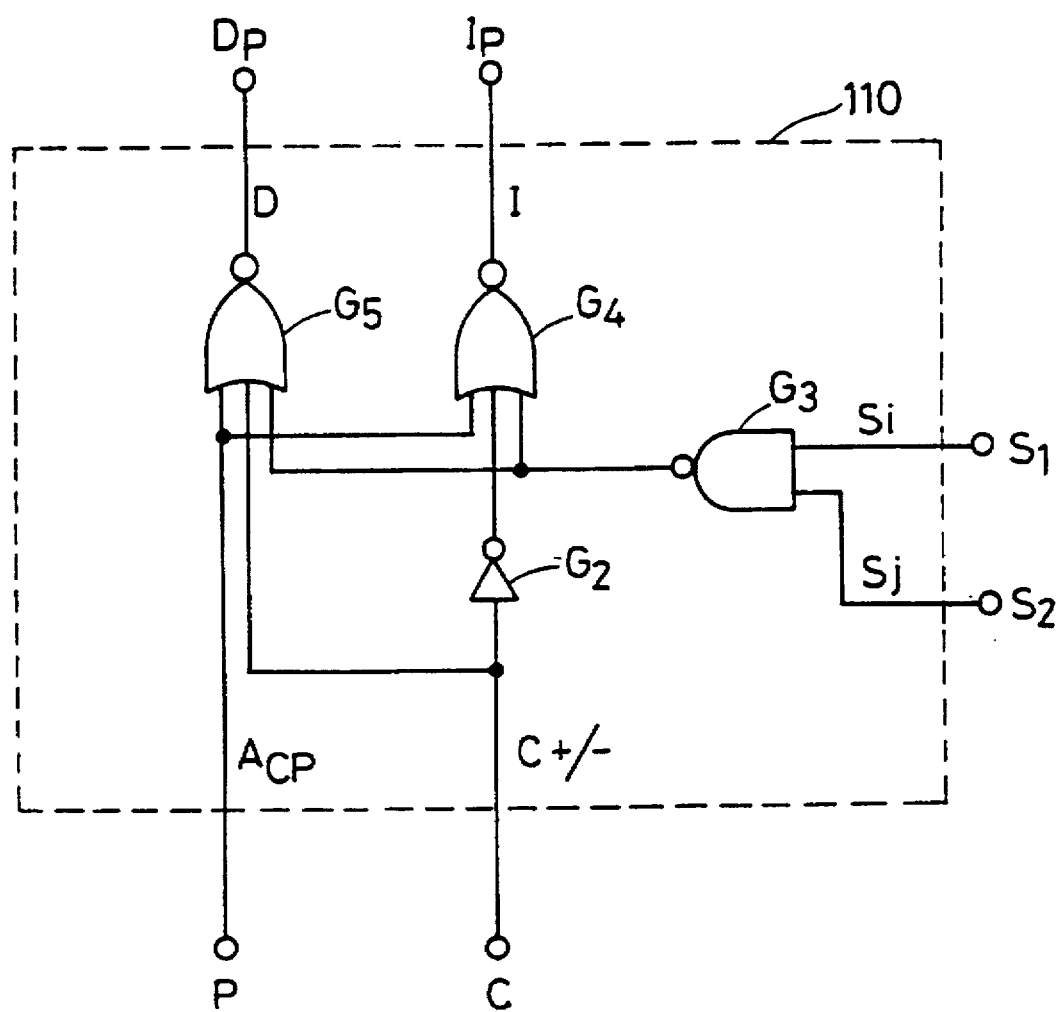
FIG. 33 illustrates the structure of a learning control circuit shown in FIG. 32.

The synapse expressing unit DSY shown in FIG. 3, which is similar in structure to that shown in FIGS. 32 to 34, includes a synapse load value storage circuit 101, a synapse load correction circuit 103, synapse coupling expressing circuits 105 and 107, and a learning control circuit 111. The synapse coupling expressing circuits 105 and 107, which are similar in structure to that shown in FIG. 34, perform loading in accordance with synapse load value information stored in the synapse load storage circuit 101, to output signals Wij·Sj and Wji·Si respectively.

The synapse load value storage circuit 101 is formed by a capacitor C1, to express the synapse load value by the amount of charges stored in the capacitor C1. The synapse load correction circuit 103 includes diodes and charge pumping capacitors, in a structure similar to that shown in FIG. 34. The structures and operations of the circuits 101, 103, 105 and 107 are similar to those described above with reference to FIGS. 32 to 35, and hence the description thereof is omitted. The synapse load value of the synapse load value storage circuit 101 is increased when a correction control signal I is supplied, while the same is reduced when a control signal D is supplied.

The learning control circuit 111 includes a two-input NAND circuit G100 which receives output signals (state signals) Si and Sj from related two neuron units, a D-latch G101 which latches the output of the NAND circuit G100 in response to the control signal Ts, and an inverter circuit G102 which receives the control signal Ts. The control signal Ts is a pulse signal which falls from a high level to a low level only in a plus phase of a learning mode, and is set normally at a high level. The D-latch G101 enters a through state in response to a low level of the signal Ts, while latching the output of the NAND circuit G100 supplied at its input D and outputting the same from its output Q in response to rise of the control signal Ts.

The learning control circuit 111 further includes a three-input NOR circuit G102 which receives the outputs from the D-latch G101, the inverter circuit G102 and the NAND circuit G100, a three-input NOR circuit G104 which receives the outputs of the D-latch G101 and of the NOR circuit G103 and the control signal ACP+, and a three-input NOR circuit G105 which receives the outputs from the NOR circuit G103 and from the NAND circuit G100 and the control signal ACP−. The control signals ACP+ and ACP− indicate a plus phase cycle and a minus phase cycle, respectively. According to this embodiment, the control signals ACP+ and ACP− simultaneously fall from high levels to low levels only when the synapse load value is to be corrected after a plus phase operation and a minus phase operation are completed. The operation of the learning control circuit 111 is now briefly described.

In a plus phase operation, the states of visible neurons are fixed to external educator data for operation of the neural network. When the neural network is converged, the control signal Ts falls from a high level to a low level for a prescribed period. In response to rise of this control signal Ts, the D-latch G101 latches and supplies the output of the NAND circuit G100. When both of the output signals (state signals) Si and Sj are at high levels, the D-latch G101 latches a low-level signal. When at least one of the output signals (state signals) Si and Sj is at a low level, the D-latch G101 latches a high-level signal.

Then, a minus phase operation is executed. When the neural network is converged to a certain state in the minus phase operation, both of the control signals ACP+ and ACP− fall from high levels to low levels with small pulse widths. At this time, the control signal Ts is at a high level. In the minus phase, the output of the NAND circuit G100 goes low if both of the output signals Si and Sj are at high levels. The NOR circuits G103 to G105 output high-level signals only when all inputs supplied thereto are at low levels. The control signal I or D is generated when both of the output signals Si and Sj are at high levels. Both of the signals Si and Sj go high so that the synapse load value is to be corrected, in the following three cases:

(i) When both of the signals Si and Sj are at high levels in both of plus and minus phases, the gate circuit G103 outputs a high-level signal since all of three inputs thereof are at low levels. In this state, both of the gate circuits G104 and G105 output low-level signals. In this state, therefore, no correction signals I and D are generated and the synapse load value is not corrected eventually.

(ii) When both of the signals Si and Sj go high only in a plus phase, the output of the gate circuit G100 is at a high level upon completion of a minus phase, and the outputs of the gate circuits G103 and G105 go low. Therefore, the gate circuit G104 generates the pulsing correction control signal I in response to the control signal ACP+, to increase the synapse load value.

(iii) When both of the signals Si and Sj go high only in a minus phase, the D-latch G101 latches and outputs a high-level signal, whereby the outputs of the gate circuits G103 and G104 go low. In this case, therefore, the gate circuit G105 generates the correction control signal D in response to the control signal ACP−, so that the synapse load value stored in the synapse load value storage circuit 101 is reduced.

The amount of correction of the synapse load value is determined by the pulse widths (and pulse numbers) of the control signals ACP+ and ACP−.

According to the aforementioned operation, a learning rule similar to that of the learning control circuit shown in FIG. 33 is implemented, so that the synapse load value stored in the synapse load value storage circuit 101 is corrected in accordance with the following so-called mean-field approximation of the learning rule of the Boltzman machine:

$$\Delta W_{ij} = \eta \cdot (S_i^+ \cdot S_j^+ - S_i^- \cdot S_j^-)$$

The amount $\Delta W_{ij}$ of correction of the synapse load value is determined by the learning coefficient $\eta$. The value of the learning coefficient η can be varied with the pulse numbers and/or the pulse widths of the control signals ACP+ and ACP−.

Figure 4:
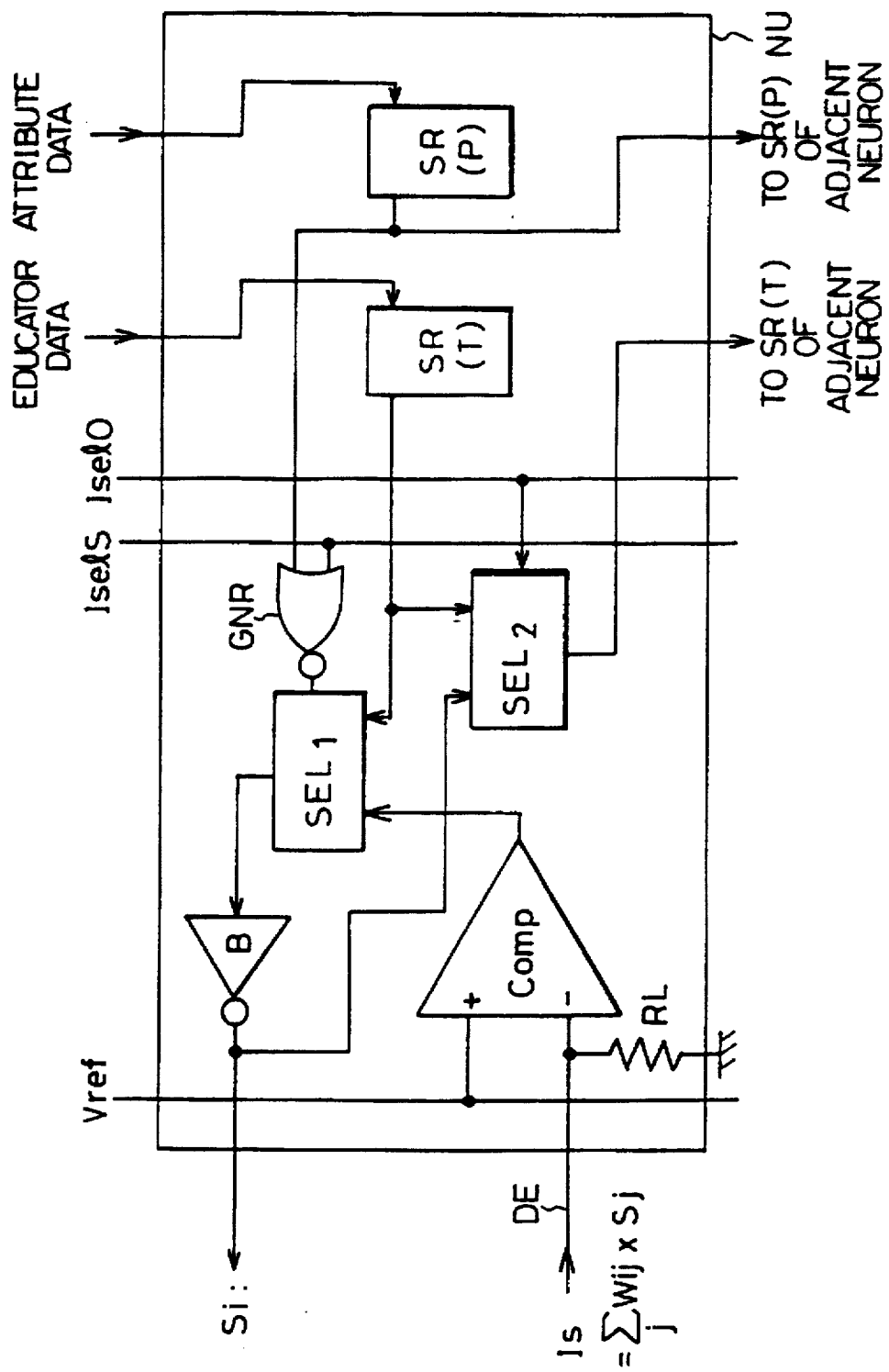
FIG. 4 illustrates the structure of the neuron unit shown in FIG. 2.

FIG. 4 illustrates an exemplary structure of each neuron unit shown in FIG. 2. Referring to FIG. 4, symbol NU generically denotes the neuron units 601 to 603 shown in FIG. 2. The neuron unit NU includes a first shift register SR(T) for latching and shifting the educator data, and a second shift register SR(P) for storing the data indicating the attribute (visible or hidden neuron) of the neuron unit NU. The educator and attribute data may be supplied to the shift registers SR(T) and SR(P) through different paths from each other. Further, the shifting operations of the shift registers SR(T) and SR(P) may be provided by shift clock signals which are independent of each other, and educator data and attribute data may be supplied thereto through the same path.

The neuron unit NU further includes a two-input NOR circuit GNR which receives the attribute data from the shift register SR(P) and the control signal IselS, a selector SEL1 which selects one of the educator data stored in the shift register SR(T) and the output from a comparator Comp in response to the output from the NOR circuit GNR, an inverter buffer B which buffers and outputs the output of the selector SEL1, and another selector SEL2 which selects one of the educator data stored in the shift register SR(T) and the output from the inverter buffer B in response to the control signal IselO.

The attribute data stored in the shift register SR(P) can be transmitted to an adjacent neuron unit by a shift out operation. Further, the output from the selector SEL2 can be transmitted to an educator data storage shift register SR(T) of the adjacent neuron unit. The shift registers SR(T) and SR(P) and the selector SEL2 are so employed that it is possible to successively pass the educator data and the attribute data through the neuron unit NU by a shifting operation in setting of an initial state, thereby setting each neuron unit NU in a desired state. In data reading, the output of the selector SEL2 is shifted out by the shift register SR(T), so that the output data are successively shifted out through each neuron unit NU.

The inverter buffer B outputs a signal indicating the state of the neuron which is determined by an internal active value of the neuron unit NU or educator information. This signal is transmitted onto a corresponding axon signal line as the state signal Si.

Figure 29:
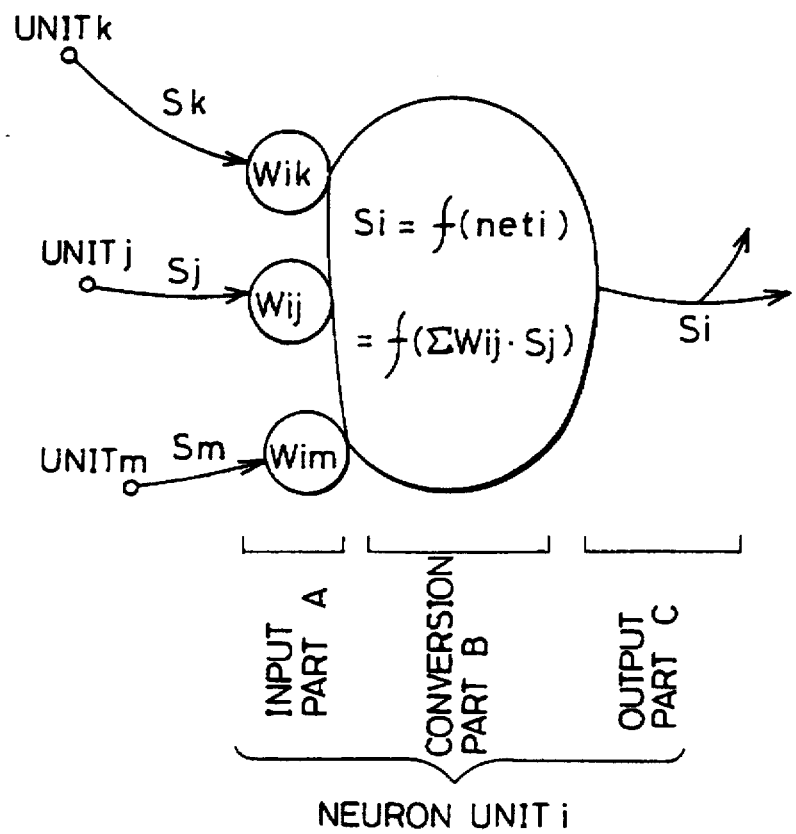
FIG. 29 illustrates the operation principle of a neuron unit.
Figure 30:
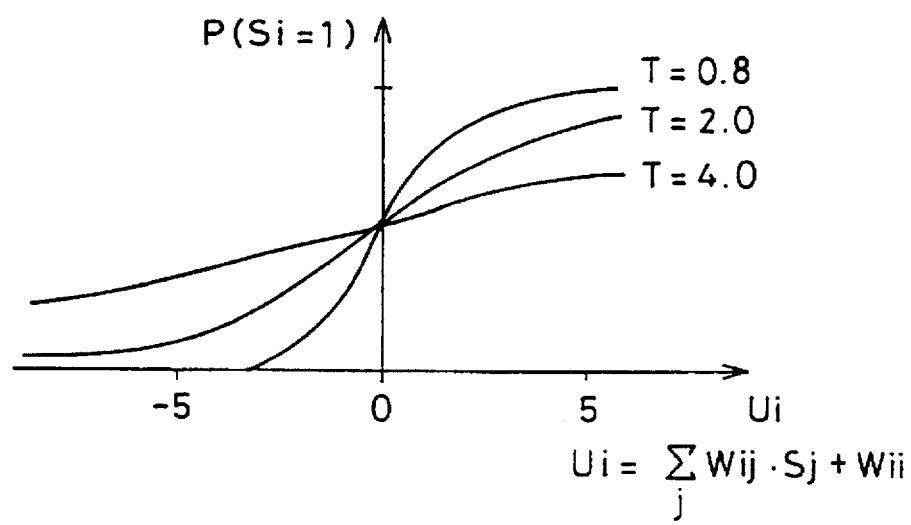
FIG. 30 illustrates input/output conversion characteristics of the neuron unit.
Figure 31:
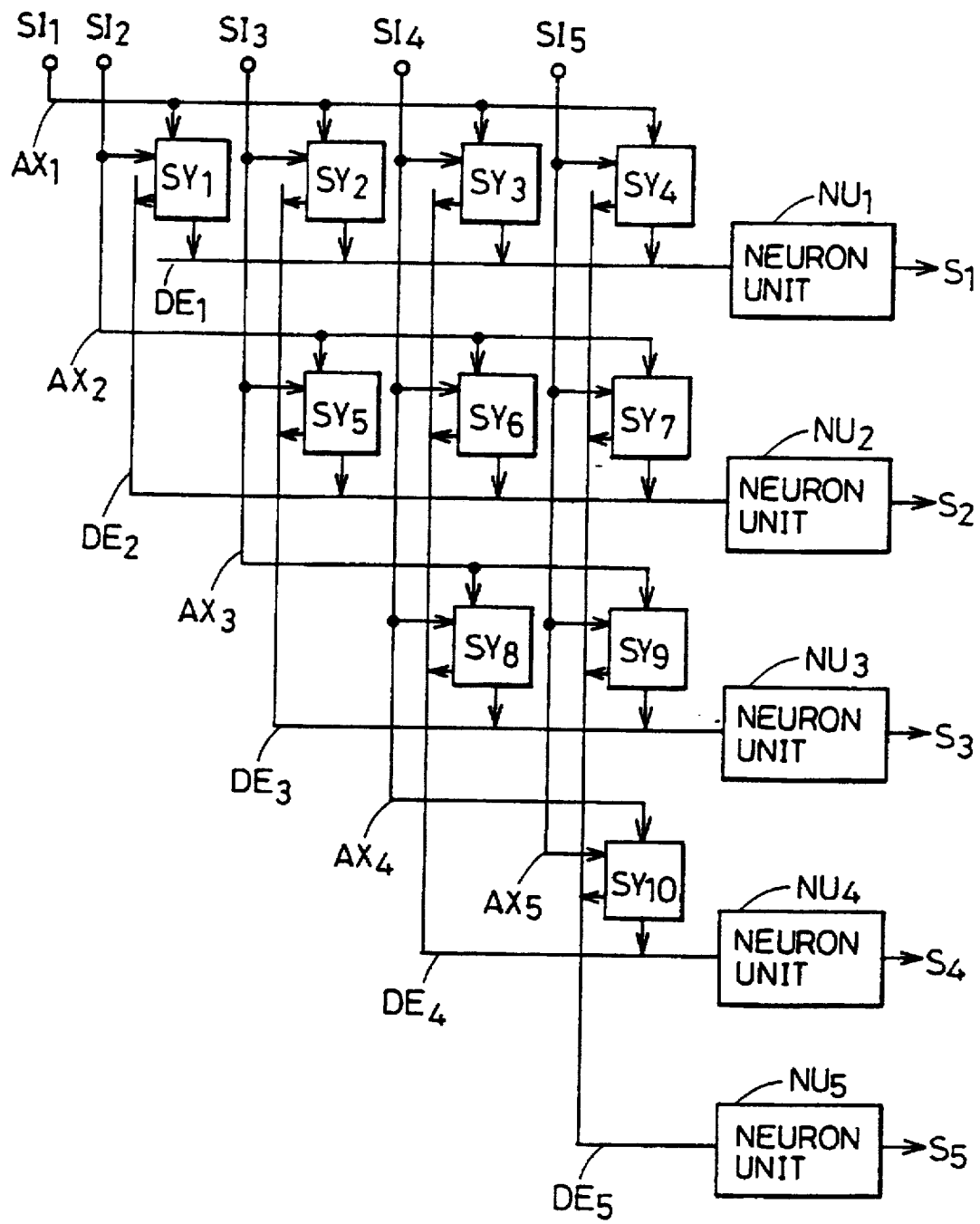
FIG. 31 illustrates an exemplary structure of a conventional neural network expressing apparatus.

The comparator Comp has a positive input which receives a reference voltage Vref, and a negative input which receives a loaded current ΣWij·Sj being transmitted onto a dendrite signal line DE. The negative input of the comparator Comp is provided with a resistor RL for current-to-voltage conversion. The sum Σ is obtained with respect to the subscript j. Namely, loaded currents from related synapse load expressing circuits are added up and transmitted to the negative input of the comparator Comp. The dendrite signal line DE which is connected with the negative input of the comparator Comp has the function of the so-called Kirchhoff adder. The comparator Comp has the function of the neuron unit body, i.e., the function of the conversion part B in the typical diagram shown in FIG. 29. The reference voltage Vref has the function of a threshold value of the neuron unit. The comparator Comp outputs a high-level signal when the product of a sum current Is received at its negative input and the resistance value of the resistor RL is smaller than the reference voltage Vref. The output of the comparator Comp is inverted through the selector SEL1 and the inverter buffer B, and outputted onto the corresponding axon signal line as the state signal Si. If the comparator Comp is comprised of a differential amplifier, its output expresses a state corresponding to the internal active value of the neuron. Simulated annealing of a Boltzman machine can be implemented by dampingly oscillating the reference voltage Vref, as described later in detail.

FIG. 5 shows relations between the attributes of the neuron units and the output states (output signals Si) of the neurons. Referring to FIG. 5, symbols provided with bars denote logically inverted signals.

The attribute of each neuron is determined by data of the shift register SR(P). When a neuron unit is defined as a hidden neuron, a high-level signal is stored in the shift register SR(P). When a neuron unit is defined as a visible neuron of an output neuron or an input neuron, a low-level data is stored in the shift register SR(P).

As to a neuron unit which is defined as a hidden neuron, the state of the control signal IselS is arbitrary. In this case, the output of the NOR circuit GNR goes low in response to a high-level signal from the shift register SR(P). In this state, the selector SEL1 selects the output of the comparator Comp and supplies the same to the input buffer B. Thus, the neuron unit which is defined as a hidden unit outputs an inverted signal /Comp of the output from the comparator Comp as the state signal Si.

In a neuron unit which is defined as an output neuron, it is necessary to output a state signal Si corresponding to the output of the comparator Comp during a recall operation. In a plus phase of the learning mode, it is necessary to output data corresponding to the educator data as the state signal Si. In the neuron unit which is defined as an output neuron, therefore, the control signal IselS is set at a high level in the recall operation or when the learning phase is in a minus phase, while the control signal IselS is set at a low level when the learning mode is in a plus phase. When the control signal IselS is at a high level, the selector SEL1 selects the output of the comparator Comp and transmits the same to the inverter buffer B, similarly to the neuron unit which is defined as a hidden neuron. When the control signal IselS is set at a low level, the selector SEL1 selects the data stored in the shift register SR(T) and supplies the same to the inverter buffer B.

In a neuron unit which is defined as an input neuron, the control signal IselS is fixed at a low level. In this state, the selector SEL1 selects the data stored in the shift register SR(T) and supplies the same to the inverter buffer B. In a recall operation, recalling input data is supplied to the shift register SR(T) in place of the educator data. In the neuron unit which is defined as an input neuron, therefore, the inverter buffer B is normally supplied with data stored in the shift register SR(T).

The control signal IselO is employed for controlling the shifting operation of the shift register SR(T) which is provided in the neuron unit NU. When the control signal IselO goes low, the selector SEL2 selects the output of the inverter buffer B and transmits the same to a shift register SR(T) of an adjacent neuron unit. When the control signal IselO is at a high level, the selector SEL2 selects the data stored in the shift register SR(T), and transmits the same to the shift register SR(T) of the adjacent neuron unit.

The operation is now briefly described. The attribute of the neuron unit is set by a shift-in operation through the shift register SR(P). In the learning mode, the educator data is set in the shift register SR(T) by a shift-in operation through the selector SEL2. Learning is executed in this state. In a plus phase, the control signal IselS is set at a low level in an output and input neuron units. Thus, the state signal Si of the neuron unit NU goes to a value which corresponds to the educator data set in the shift register SR(T). In a hidden neuron, the selector SEL1 selects the output of the comparator Comp, so that a state signal Si corresponding to the internal active value is outputted.

In a minus phase, the control signal IselS is set at a high level for an output neuron unit, while the same is set at a low level for an input neuron unit. In this state, the output state of only the input neuron unit is fixed at the educator data, while the hidden neuron unit and the output neuron unit supplies state signals Si corresponding to internal active values.

In a recall operation, the signal is set in a similar manner to the minus phase. Thus, the hidden neuron unit and the output neuron unit output internal active values corresponding to the recalling input data supplied in place of the educator data, while the input neuron unit outputs a state signal corresponding to the input pattern.

In order to read out the state of each neuron unit after the neural network is converged, the control signal IselO is set at a low level so that the output of the inverter buffer B is selected and transmitted to the adjacent neuron unit. Thus, the state of each neuron unit NU is set in the shift register SR(T) of the adjacent neuron unit. Then the control signal IselO is set at a high level to shift out the content of the shift register SR(T) by the clock signal. Thus, the state signal of each neuron unit NU can be read out to an exterior of the neural network.

Figure 6:
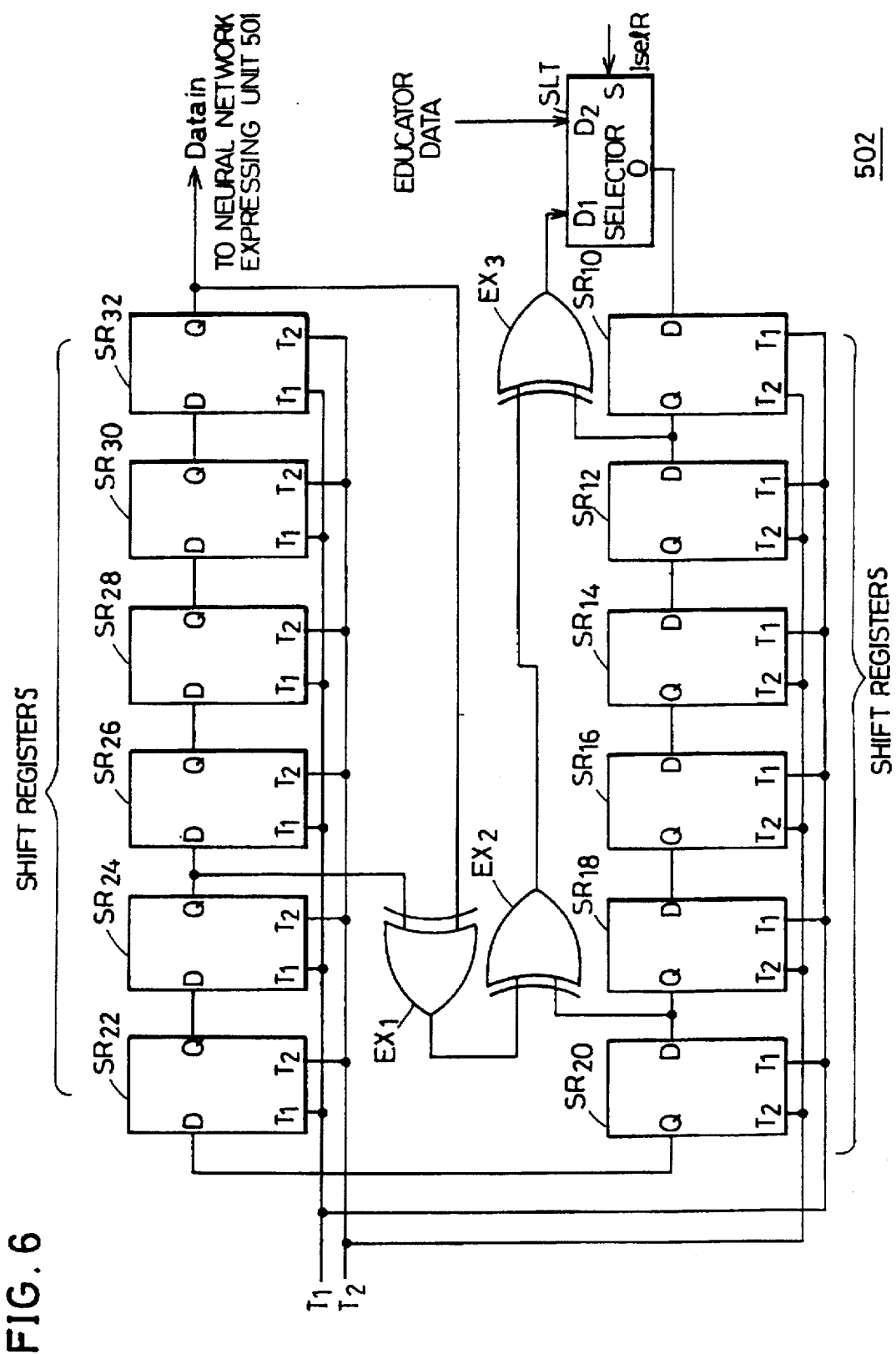
FIG. 6 illustrates a specific structure of an input data control unit shown in FIG. 2.

FIG. 6 illustrates an exemplary structure of the input data control unit 502 shown in FIG. 2. Referring to FIG. 6, the input data control unit 502 includes 12 stages of cascade-connected shift registers SR10, SR12, ..., SR32. Each of the shift registers SR10 to SR32 performs a shift operation in response to two-phase clock signals T1 and T2. Namely, each of the shift registers SR10 to SR32 latches a signal received at its D input when the clock signal T1 is supplied, and outputs the latched data from its Q output in response to the clock signal T2.

The input data control unit 502 further includes a two-input ExOR circuit EX1 which receives the Q outputs of the shift registers SR24 and SR32, a two-input ExOR circuit EX2 which receives the outputs of the ExOR circuit EX1 and the shift register SR18, an ExOR circuit EX3 which receives the output of the ExOR circuit EX2 and the Q output of the shift register SR10, and a selector SLT which selects one of the output from the ExOR circuit EX3 and the educator data (or the recalling input data) in response to the selection control signal IselR. The output of the selector SLT is supplied to the initial-stage shift register SR10. The shift register SR32 outputs the input data Datain to the neural network expressing unit 501. The operation of the input data control unit 502 is now described.

In order to set initial data in the shift registers SR10 to SR32 respectively, the selector SLT is set in an educator data selecting state (D2 input selecting state). The selection state of the selector SLT is determined by the control signal IselR. The educator data or an arbitrary input data train is supplied, and then the clock signals T1 and T2 are generated. Thus, the initial data are set in the shift registers SR10 to SR32 respectively. When the selector SLT is set in the D2 input selecting state and the clock signals T1 and T2 are supplied, the shift register SR32 transmits the educator data to the neural network expressing unit 501 as the input data Datain. This operation is executed when an educator pattern is set in the neuron unit NU in the learning mode.

After the initial data are set in the shift registers SR10 to SR32 the selector SLT is set in the D1 input selecting state. In this state, the selector SLT selects the output of the ExOR circuit EX3 and transmits the same to the shift register SR10.

In general, an ExOR circuit outputs a low-level signal when logical values of both inputs thereof match with each other, while the same outputs a high-level signal when the logical values of the inputs mismatch. Consider that high-level data are set in the shift registers SR10 to SR32. In this case, the output of the ExOR circuit EX1 goes low and that of the ExOR circuit EX2 goes high. Thus, the output of the ExOR circuit EX3 goes low, so that low-level data is written in the shift register SR10.

In a next clock cycle, the output of the shift register SR10 goes low. At this time, the outputs of the shift registers SR24 and SR32 are still at high levels, and the output of the ExOR circuit EX1 goes low while that of the ExOR circuit EX2 goes high. Since the output of the shift register SR10 is at a low level and that of the ExOR circuit EX2 is at a high level, the output of the ExOR circuit EX3 goes high. This operation is thereafter so repeated that the shift register SR32 generates a pseudo-random number sequence in response to the initial data. This random number sequence is called a pseudo-random number sequence since no regularity is provided in the data series, although the data to be generated is predictable by the data set in the initial state. This pseudo-random number sequence is supplied to the neural network expressing unit 501 in a refresh operation as a random pattern.

The structure of the functional block of the input data control unit 502 shown in FIG. 2 is not in one-to-one correspondence to that of the input data control unit 502 shown in FIG. 6. However, these units are functionally equivalent to each other, and this input data control unit 502 supplies the educator pattern or the pseudo-random number sequence to the neural network expressing unit 501.

When the educator pattern is selected and supplied to the neural network expressing unit 501, this neural network expressing unit 501 learns the supplied educator pattern according to the learning control signals Ts, ACP+, ACP− and IselS. The educator pattern is varied and the learning operation is repeated, thereby deepening memorization of the learning patterns of the neural network, i.e., the valleys of the potential energy.

In a refresh operation, a pseudo-random number sequence is supplied from the pseudo-random number generator 503. In this state, the pseudo-random number pattern is regarded as educator data to execute learning, whereby the synapse load values are corrected along the output states of the respective neurons, to recover the memories.

Figure 7:
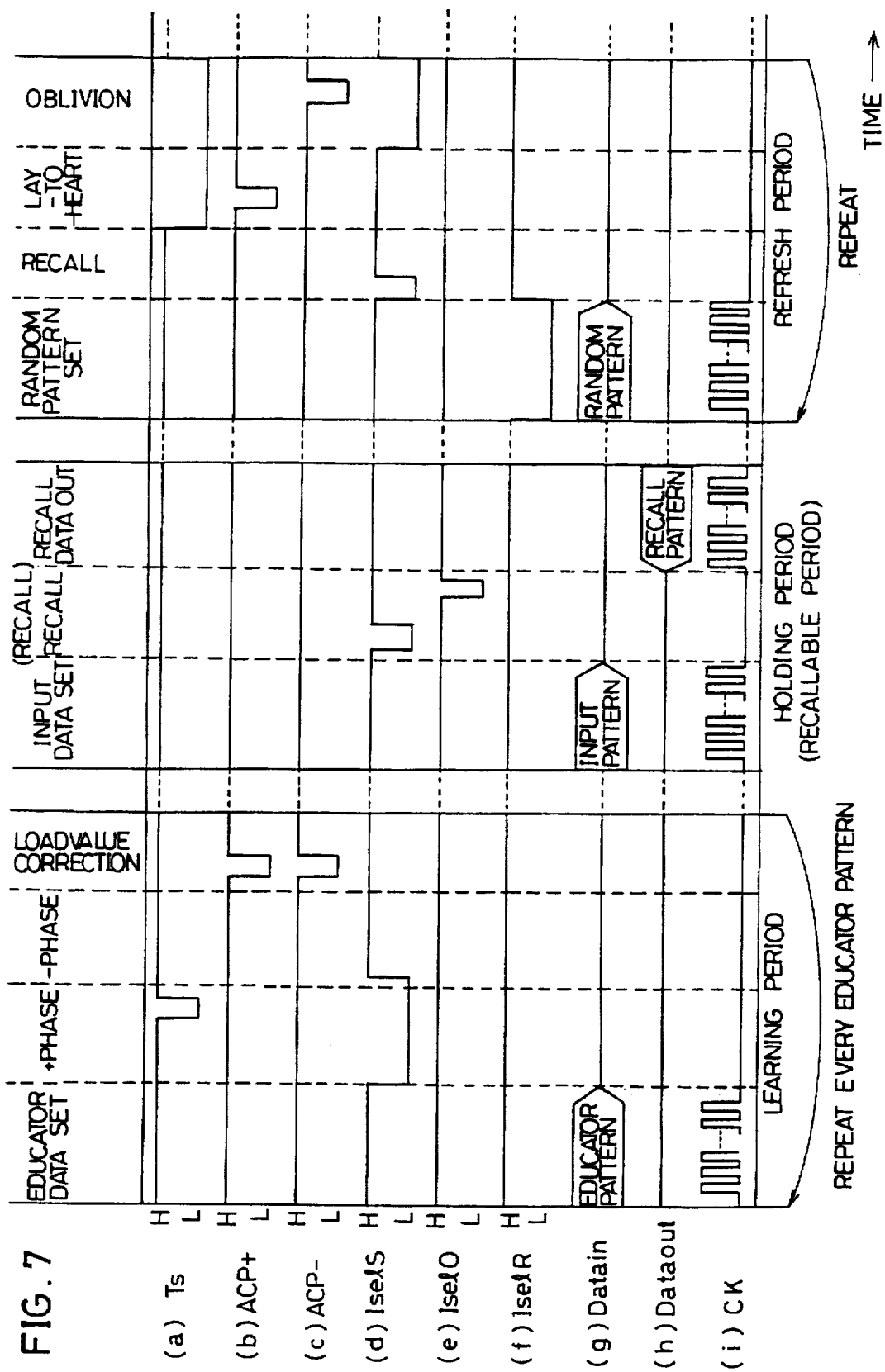
FIG. 7 is a waveform diagram showing an operation of the neural network expressing apparatus according to the first embodiment.

As hereinabove described, the circuit for correcting the synapse load value in a learning mode of operation also serves as a synapse load value correction circuit in a refresh operation, whereby the synapse load value information can be reliably and easily refreshed at a high speed with no addition of a complicated circuit structure. The operations of the neural network expressing apparatus shown in FIGS. 2 to 6 are now described with reference to FIG. 7 showing the operation waveform diagram thereof.

The neural network expressing apparatus according to the first embodiment of the present invention has three operation modes of a learning period, an information holding period (recallable period) and a refresh period. The operation in the learning period is now described.

In the learning period, input of the educator pattern data, the plus and minus phases of the learning mode, and load value correction are executed.

An educator pattern is supplied to the neural network expressing unit 501 as the input data Datain through the input data control unit 502 with supply of a shift register clock signal CK, so that the educator data are set in the shift register SR(T) of each neuron unit NU. When the attribute of the neuron unit NU is not yet defined in this learning period, attribute data may be set in the shift register SR(P) similarly along the clock signal CK. The operations of the learning phases are executed after the educator data and the attribute data are set in the neuron unit NU.

First, the plus phase operation is executed. In this state, the control signal IselS is set at a low level. In the plus phase, therefore, a neuron unit NU which is defined as a visible neuron as shown in FIG. 4 outputs a state signal Si corresponding to the educator data supplied as input and output data. On the other hand, a neuron unit NU which is defined as a hidden neuron outputs a state signal Si corresponding to its internal active value. In this state, convergence of the state of the neural network expressing apparatus is waited. Namely, convergence of the internal state of the neural network expressing unit is waited for. Such a converged state is decided by determining whether or not a predetermined time lapses. When it is decided that the neural network reaches an equilibrium state in the plus phase, the control signal Ts is generated. Namely, a negative pulse signal is generated as the control signal Ts. Thus, an inverted signal of the product (Si·Sj) of the state signals is stored in the D-latch G101 (see FIG. 3) of the synapse expressing circuit. Thus, the plus phase is terminated.

Then, the minus phase operation is executed. The control signal IselS is set at a high level. In this state, only the neuron unit NU which is defined as an input neuron generates a state signal corresponding to the educator data, while those defined as hidden and output neurons supply state signals Si corresponding to internal active values thereof. When the neural network expressing apparatus is decided to reach an equilibrium state after the same operates for a prescribed time, the control signals ACP+ and ACP– are generated in this state. Namely, negative pulses are generated as the control signals ACP+ and ACP–. Thus, the synapse load value stored in the synapse load value storage circuit 101 is corrected in each synapse expressing circuits DSY. At this time, the synapse load value is corrected in accordance with the mean-field approximation of the aforementioned learning rule of the Boltzman machine.

This operation is repeated for every educator pattern, so that the neural network expressing apparatus can deepen the memory as to all educator patterns. When the educator patterns are supplied in accordance with an appearance probability and required learning is completed, the neural network expressing apparatus enters the holding period, which enables a recall operation.

In the holding period (recallable period), all of the learning control signals ACP+, ACP– and Ts are fixed at high levels. The control signals IselS and IselO are generated only in the recall operation.

Recalling input pattern data is set in the shift register SR(T) of the neuron unit which is defined as an input neuron in synchronization with the clock signal CK, similarly to the aforementioned setting of the educator pattern data.

Then, the control signal IselS is set at a low level for a prescribed period. The initial states of the visible neurons are set corresponding to the recalling input data pattern. Then the control signal IselS is raised up to a high level. In this state, the output state (state signal Si) of only the neuron unit which is defined as an input neuron is fixed at the recalling input data pattern. In this state, reaching of the neural network expressing unit to an equilibrium state is waited. When it is decided that the neural network expressing apparatus reaches an equilibrium state, the control signal IselO is lowered to a low level. Thus, the output state (state signal Si) of the neuron unit NU is transmitted to the adjacent neuron unit through the selector SEL2 (see FIG. 4) and stored in the shift register SR(T) thereof. Thereafter the clock signal CK is supplied so that the data latched in the shift registers SR(T) are successively shifted out.

The output state signal of the neuron unit NU is latched by the shift register SR(T) of the adjacent neuron unit. Therefore, a neuron unit which is closest to the output terminal supplies data in accordance with the control signal IselO. When a single-stage shift register is provided to this closest neuron unit, it is possible to shift out the output state signals of the neuron units in accordance with the clock signal CK. Such recall operation can be executed at any arbitrary time during the holding period, and the recall operation is executed on the basis of already learned storage information in correspondence to the input data pattern, to supply the corresponding output data pattern.

The refresh operation according to the present invention is executed after a lapse of a predetermined holding period time. In this refresh period, the pseudo-random number sequence (random pattern) generated from the pseudo-random number generator 503 (see FIG. 2) is selected in the input data control unit 502 in place of the educator pattern, and supplied to the neural network expressing unit 501. In this state, the control signal IselR is set at a low level and the selector SLT shown in FIG. 6 is set in a state of selecting the output of the ExOR circuit EX3. The random data pattern formed by the pseudo-random number sequence is set in the neuron units NU in response to the clock signal CK, similarly to the aforementioned setting of the educator data pattern and the input data pattern.

After such setting of the random data pattern, the control signal IselS is first set at a low level. The neural network expressing unit 501 is driven under this state. In this state, the output state of only the neuron unit NU which is defined as a hidden neuron is changed. Thus, the initial state of the neural network expressing unit 501 is set. When the neural network expressing unit 501 reaches an equilibrium state after a lapse of a prescribed time, the control signal IselS is raised up to a high level. In this state, the output state of only the neuron unit NU which is defined as an input neuron is fixed. The neural network expressing unit 501 is again driven under this state. When the neural network expressing unit 501 reaches an equilibrium state after a lapse of a prescribed time, it is decided that the neural network expressing unit 501 is converged to a state to be memorized, i.e., a state supplying a valley of the potential energy shown in FIG. 1. At this time, a negative pulse signal is supplied as the control signal ACP+. The control signal Ts is lowered to a low level at this time, so that the D-latch G101 (see FIG. 3) is in a state for passing the output of the NAND circuit G100 (see FIG. 3). In this state, the synapse load value is increased in each synapse expressing unit having state signals Si and Sj which are both at high levels. This corresponds to such a state where its memory is deepened, and is called a "lay-to-heart" state.

Then the control signal IselS is changed from a high level to a low level, and the neural network expressing unit 501 is again driven. In this state, the output states of the visible neurons correspond to the supplied random data pattern, while the state of only the hidden neuron is changed in accordance with the random data pattern. When the state of the neural network expressing unit 501 is converged, the converged state is absolutely independent of a state memorized by learning (corresponding to the point r1, r2 or r3 in FIG. 1). This state is not to be memorized. In this state, the control signal ACP– is lowered to a low level. The control signal Ts is set at a low level. In this state, the synapse load value is reduced in each synapse expressing unit having state signals Si and Sj of high levels independently of the "lay-to-hear" cycle.

The aforementioned operations are executed for various random patterns. The series of refresh operations are repeated to deepen the valleys of the potential energy reduced by leakage of charges. Even if the memory obtained by learning is faded, the faded memory is made clear on the basis of the memorized information.

Upon completion of the refresh period, the apparatus again enters a holding period, to enable a recall operation. After a lapse of the holding period by a prescribed time, a refresh period is started. This refresh period is periodically and cyclically inserted.

The refresh period may be set in such a manner that a timer (not shown) contained in the apparatus generates a refresh instruction signal after a lapse of the holding period by a prescribed time, to drive necessary control circuits.

Alternatively, an externally provided processing unit, such as a central processing unit may periodically supply refresh instructions to execute the refresh operation.

As hereinabove described, it is possible to sufficiently deepen the valleys of the potential energy shown in FIG. 1 by supplying a random data pattern as the recalling input pattern for converging the neural network expressing apparatus to a state providing the closest minimum energy value and strengthening the storage state in the lay-to-heart operation and fixing the visible neuron at the random data pattern and performing anti-learning on the assumption that the state is not to be memorized in an oblivious operation in the refresh period.

In this case, the number of pulse application times of the control signal ACP- may be increased or the pulse width thereof may be sufficiently widened in the oblivious operation for increasing the amount of correction of the synapse load value, i.e., the learning coefficient η in oblivion. Thus, it is possible to sufficiently deepen the valleys of the potential energy providing a state to be memorized.

While the initial state is set by the recall input pattern or the random data pattern in the recall operation and the refresh operation respectively, this is executed in order to find the valley of the potential energy which is closest to the state provided by the given input data pattern or the random data pattern at a higher speed.

(B) Second Embodiment

In the aforementioned method, it is assumed that all converged states of the neural network with the initial state of a random pattern of the random number data are to be memorized (states memorized by learning). In general, however, the neural network does not necessarily cause transition from an arbitrary initial state to a learned and memorized state, since there is such a possibility that minimum energy points are present in states other than those to be memorized.

A mechanism for deciding whether or not a converged state of a neural network is to be memorized is provided. Such a decision mechanism is implemented by a second neural network including static type synapse expressing circuits requiring no refresh operations, which can stably hold synapse load values for a long time.

The second neural network decides whether or not a converged state of a first neural network is to be memorized based on the output from the first neural network. In order to establish the criterion of this decision, the second neural network learns given data patterns (state output patterns from neuron units provided in the first neural network) to decide whether or not the patterns correspond to states to be memorized (educator patterns) simultaneously with learning of the first neural network or in an independent manner.

Figure 8:
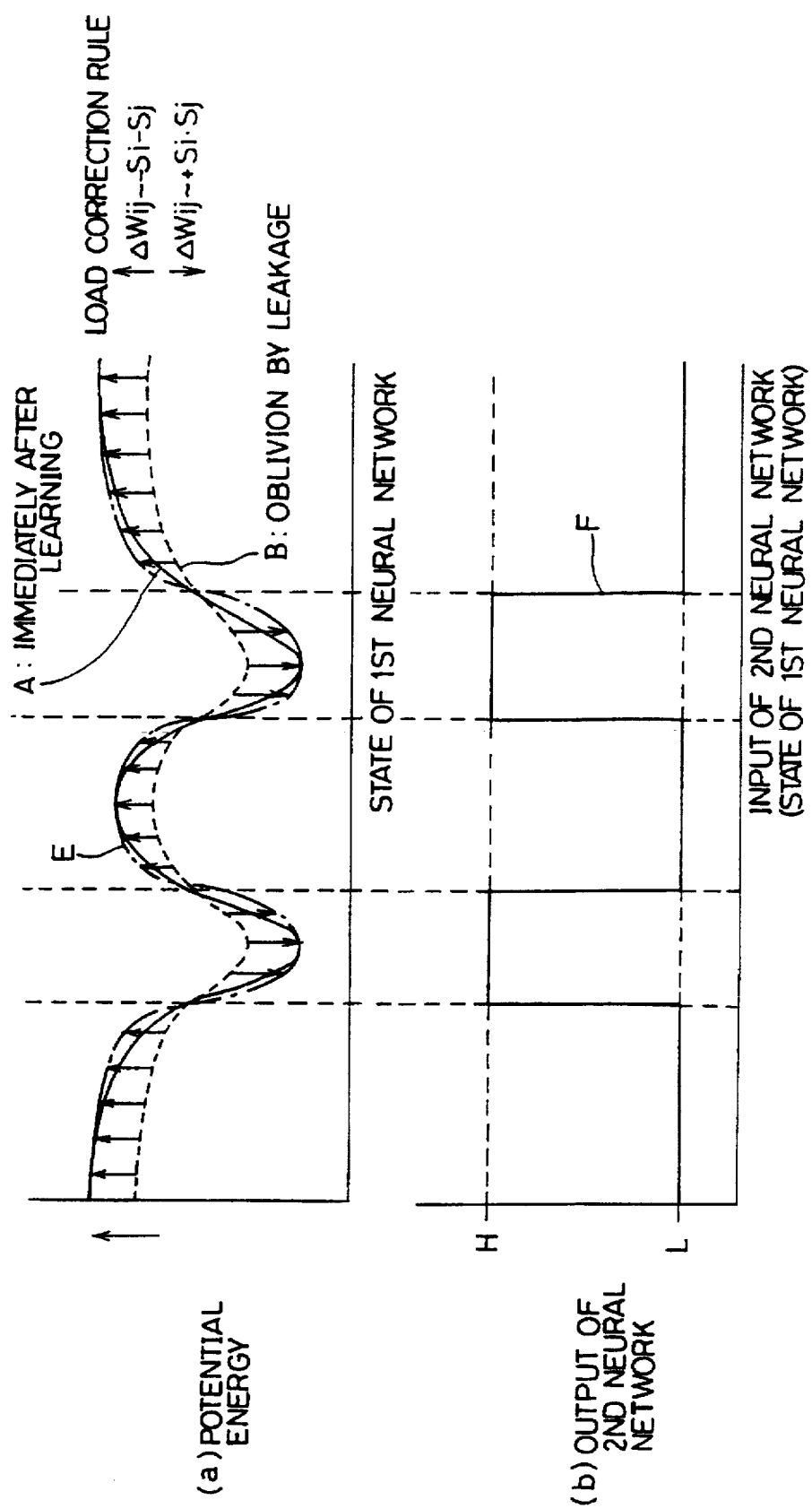
FIG. 8 illustrates a refresh operation according to a second aspect of the present invention.

FIG. 8 shows a refresh operation in relation to the second neural network which is employed as a decision mechanism. FIG. 8(a) shows relations between states of the first neural network performing recall, learning and refresh operations and potential energy levels. Referring to FIG. 8(a), the axis of abscissas shows the states of the first neural network, and the axis of ordinates shows the potential energy levels in the respective states. A curve A represents the potential energy level corresponding to a memory state of the first neural network immediately after learning, and a curve B represents potential energy level corresponding to such a state that synapse load values are changed by leakage of charges, i.e., faded memory states (oblivious states), while a curve E represents potential energy level corresponding to a state recovered by the refresh operation.

FIG. 8(b) shows the input states of the second neural network, i.e., the internal states of the first neural network, with the axis of ordinates representing the output of the second neural network. Referring to FIG. 8(b), a polygonal line F represents input/output characteristics of the second neural network after learning, while symbol H represents a state to be memorized and symbol L represents a state not to be memorized.

FIGS. 8(a) and 8(b) show the states of the first neural network and the input states of the second neural network in alignment. The output of the second neural network goes high in state regions corresponding to valleys of the potential energy level of the first neural network. When the output of the second neural network is at a high level, the memory state of the first neural network is reinforced, while its memory is weakened otherwise. The following operations are executed:

(i) A random data pattern is introduced for an initial state and then the first neural network is started of operation. The first neural network is converged to a state providing a valley of potential energy which is closest to the random pattern.

(ii) The second neural network receives the state output of the first neural network, and decides whether or not the converged state of the first neural network is to be memorized.

(iii) When the second neural network outputs a high-level signal to indicate that the state is to be memorized, synapse load values of synapses in which related neurons are in firing states are increased in the first neural network.

When the second neural network outputs a low-level signal to indicate that the state is not to be memorized, the synapse load values of the synapses in which related neurons are in firing states are reduced in the first neural network.

(iv) The aforementioned operations (i) to (iii) are repeatedly executed for various random patterns.

According to this refresh method, memory is correctly refreshed even if there are minimum points which must not be memorized, and it is possible to rememorize the curve E which is similar in shape to the curve A shown in FIG. 8(a). A structure for implementing the refresh system employing the second neural network is now described.

Figure 9:
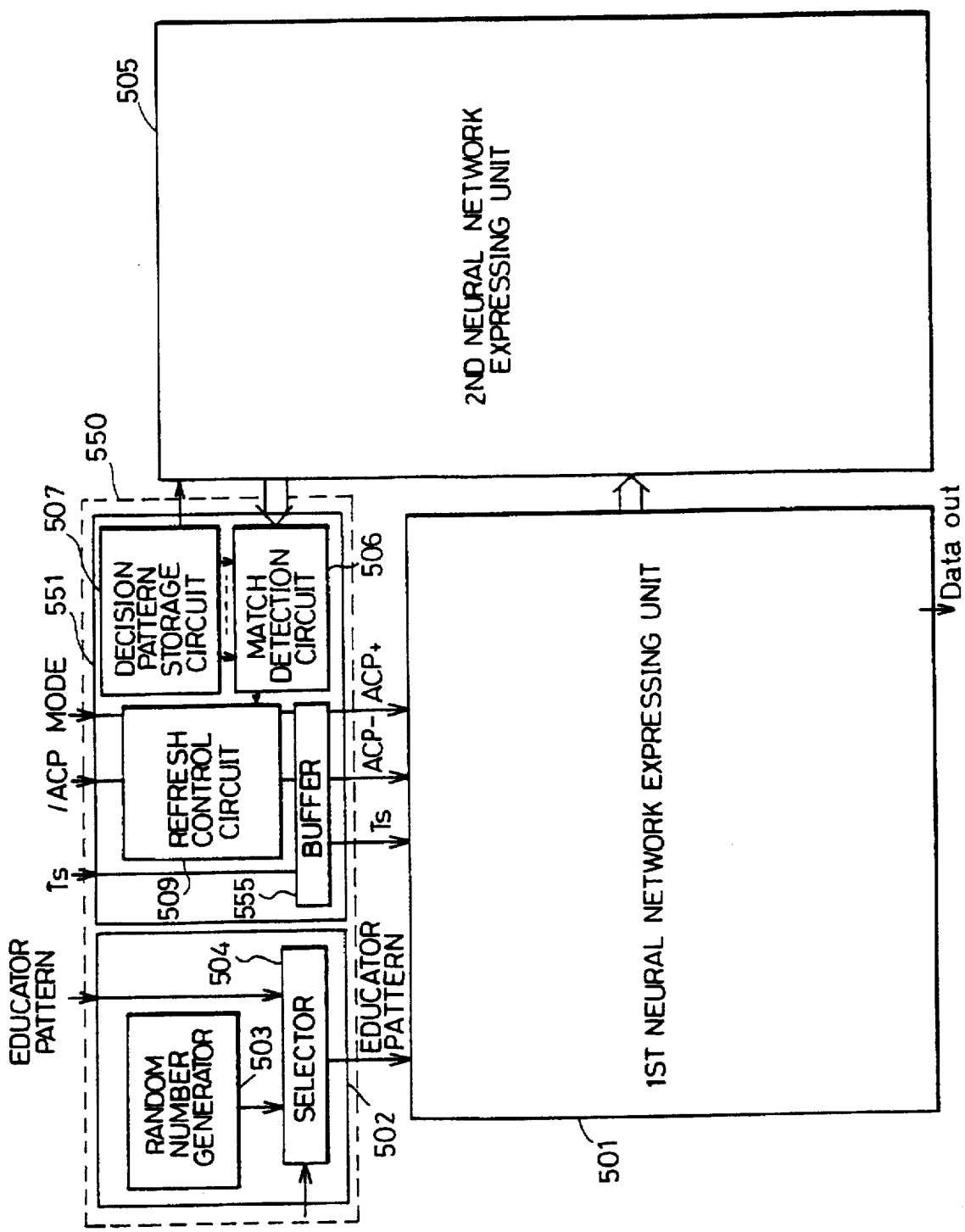
FIG. 9 schematically illustrates the structure of a neural network expressing apparatus according to a second embodiment of the present invention.

FIG. 9 illustrates an overall structure of a neural network expressing apparatus according to the second embodiment of the present invention. Referring to FIG. 9, the neural network expressing apparatus includes a first neural network expressing unit 501, a second neural network expressing unit 505 which receives a part of or all of outputs from the first neural network expressing unit 501, and a control unit 550 which controls a refresh operation of the first neural network expressing unit 501 in accordance with the output of the second neural network expressing unit 505 in a refresh operation. The control unit 550 also controls learning and recall operations of the first neural network expressing unit 501.

The control unit 550 includes an input data control unit 502 for selecting data supplied to the first neural network expressing unit 501. The input data control unit 502 is similar in structure to the unit 502 shown in FIG. 2, and includes a random number generator 503 and a selector 504. The structure and operation of the input data control unit 502 are similar to those described above with reference to FIGS. 2 and 6, and hence the description thereof is omitted.

The control unit 550 further includes a subcontrol unit 551 for controlling the refresh operation of the first neural network expressing unit 501. This subcontrol unit 551 includes a decision pattern storage circuit 507 which stores output patterns of the second neural network expressing unit 505, i.e., educator patterns for the second neural network expressing unit 505, a match detection circuit 506 for detecting matches of the data patterns stored in the decision pattern storage circuit 507 and the output data patterns of the second neural network expressing unit 505, and a refresh control circuit 509 which generates learning control signals ACP+ and ACP− in response to control signals /ACP and MODE and the output signal from the match detection circuit 506.

The control signal MODE, which is a mode switching signal, designates a learning operation mode or a refresh operation mode. The control signal /ACP serves as a reference signal for the learning control signals ACP+ and ACP−, so that the learning control signal ACP+ or ACP− is generated in response to the control signal /ACP along increase or decrease of synapse load values.

The control unit 550 further includes a buffer circuit 555 which receives a control signal Ts and the output signal from the refresh control unit 509 to generate the control signals Ts, ACP− and ACP+.

Figure 10:
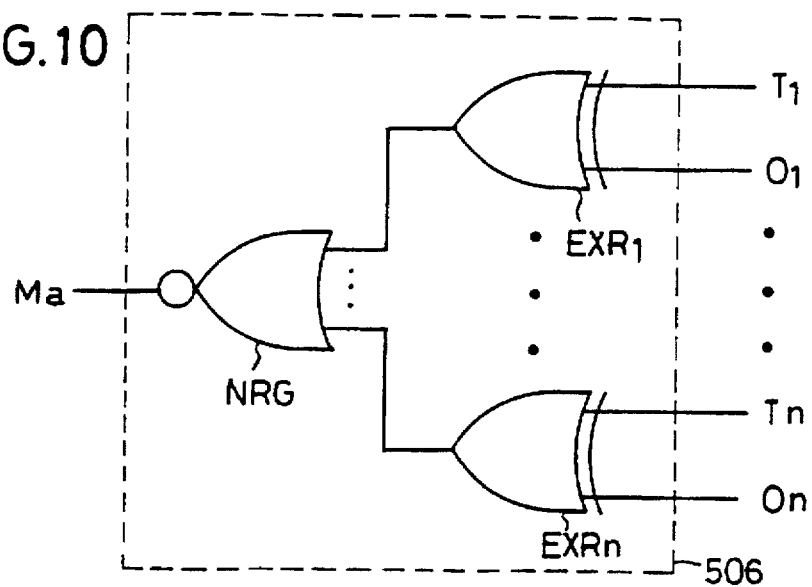
FIG. 10 illustrates a specific structure of a match detection circuit shown in FIG. 9.

FIG. 10 illustrates an exemplary structure of the match detection circuit 506 shown in FIG. 9. Referring to FIG. 10, the second neural network expressing unit 505 has n output neurons. The match detection circuit 506 includes n ExOR circuits EXR1 to EXRn and a NOR circuit NRG which receives the outputs from the ExOR circuits EXR1 to EXRn in parallel. Each of the ExOR circuits EXR1 to EXRn receives a corresponding bit Tm of the decision patterns from the decision pattern storage circuit 507 and a corresponding bit Om of the output patterns from the second neural network expressing unit 505. Symbol n represents integers of 1 to n.

The ExOR circuits EXR1 to EXRn output low-level signals when the logical levels of the received input signals are identical to each other, while the NOR circuit NRG outputs a high-level signal when all of the received input signals are at low levels. In the structure shown in FIG. 10, therefore, a match detection signal Ma goes high when the decision pattern formed by the data bits T1 to Tn match with the output pattern formed by the bits O1 to On.

The decision pattern storage circuit 507 may store a single or a plurality of decision patterns. When the decision pattern storage circuit 507 stores a plurality of decision patterns, these decision patterns are successively supplied to the match detection circuit 506. The outputs Ma of the match detection circuit 506 corresponding to the respective ones of the decision patterns are stored in latches of shift register structures. The logical sum OR of the signals Ma latched in the shift register latches is taken to generate a final match detection signal Ma. The second neural network expressing unit 505 learns the decision patterns stored in the decision pattern storage circuit 507 as educator patterns, as described later.

Figure 11:
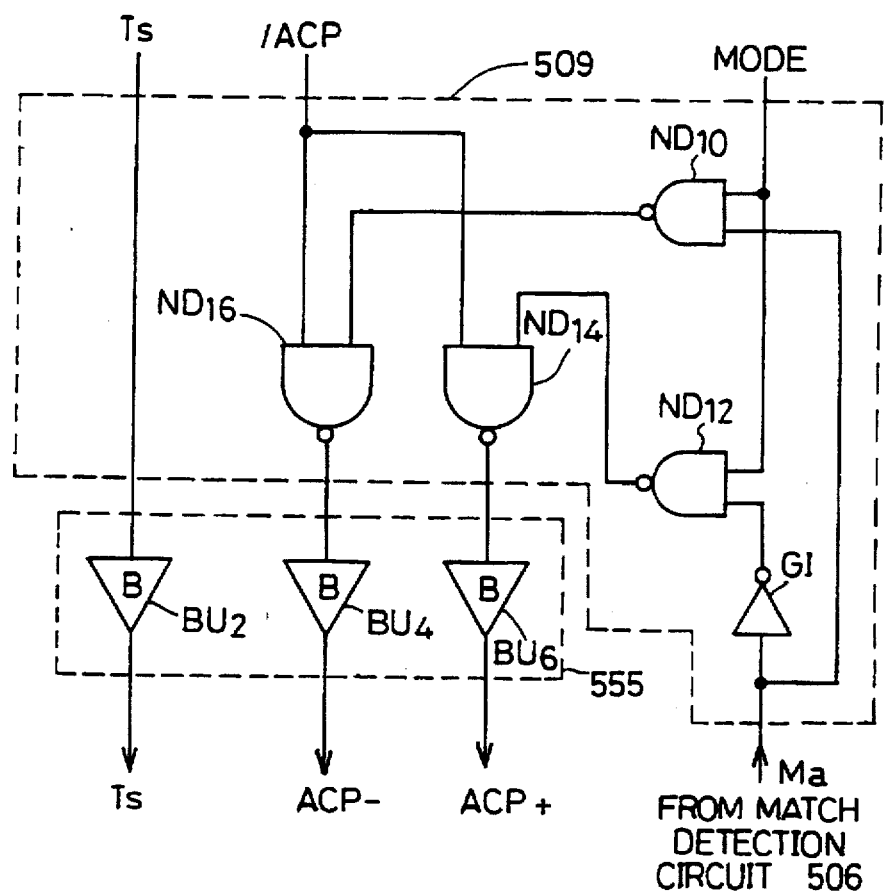
FIG. 11 illustrates the structure of a refresh control circuit shown in FIG. 9.

FIG. 11 illustrates an exemplary structure of the refresh control circuit 509 shown in FIG. 11. Referring to FIG. 11, the refresh control circuit 509 includes a two-input NAND circuit ND10 which receives the mode switching signal MODE and the match detection signal Ma, an inverter circuit GI which inverts the match detection signal Ma, a two-input NAND circuit ND 12 which receives the mode switching signal MODE and the output of the inverter circuit GI, a two-input NAND circuit ND14 which receives the learning control signal /ACP and the output of the NAND circuit ND12, and a two-input NAND circuit ND11 which receives the learning control signal /ACP and the output of the NAND circuit ND10. The NAND circuit ND14 generates the learning control signal ACP+ for increasing synapse load values, while the NAND circuit ND16 generates the learning control signal ACP− for reducing the synapse load values.

The buffer circuit 555 includes a buffer BU2 which receives the control signal Ts, a buffer BU4 which receives the output of the NAND circuit ND16, and a buffer BU6 which receives the output of the NAND circuit ND14. Referring to FIG. 11, the operation of this refresh control circuit 509 is now described.

In learning and recall periods, the mode switching signal MODE is set at a low level. Therefore, the NAND circuits ND10 and ND12 supply high-level signals with no regard to the logic of the match detection signal Ma. Thus, the NAND circuits ND14 and ND16 serve as inverter circuits, so that the learning control signals ACP+ and ACP− are generated in response to the learning control signal /ACP. This learning control signal /ACP is generated only in the learning period. In the learning period, therefore, the synapse load values are corrected in accordance with the control signals ACP+ and ACP−.

In a refresh period, the mode switching signal MODE is set at a high level. The NAND circuits ND10 and ND12 serve as inverter circuits. When the match detection signal is at a high level, the output of the NAND circuit ND10 goes low while that of the NAND circuit ND12 goes high. In this state, the output of the NAND circuit ND16 goes high, while the NAND circuit ND14 serves as an inverter to output an inverted signal of the learning control signal /ACP.

When the second neural network expressing unit 505 decides that a converged state of the first neural network expressing unit 501 is to be memorized, therefore, the learning control signal ACP+ is generated to reinforce the memory of the first neural network expressing unit 505.

When the match detection signal Ma is at a low level, the output of the NAND circuit ND10 goes high and that of the NAND circuit ND12 goes low. In this state, the output of the NAND circuit ND14 goes high while the NAND circuit ND16 serves as an inverter, to generate the control signal ACP− in response to the learning control signal /ACP.

Namely, when the second neural network expressing unit 505 decides that a converged state of the first neural network expressing unit 501 is not to be memorized, only the learning control signal ACP− is generated to weaken the memory of the converged state of the first neural network expressing unit 501.

The structures and operations of the first and second neural network expressing units 501 and 505 are now described.

Figure 12:
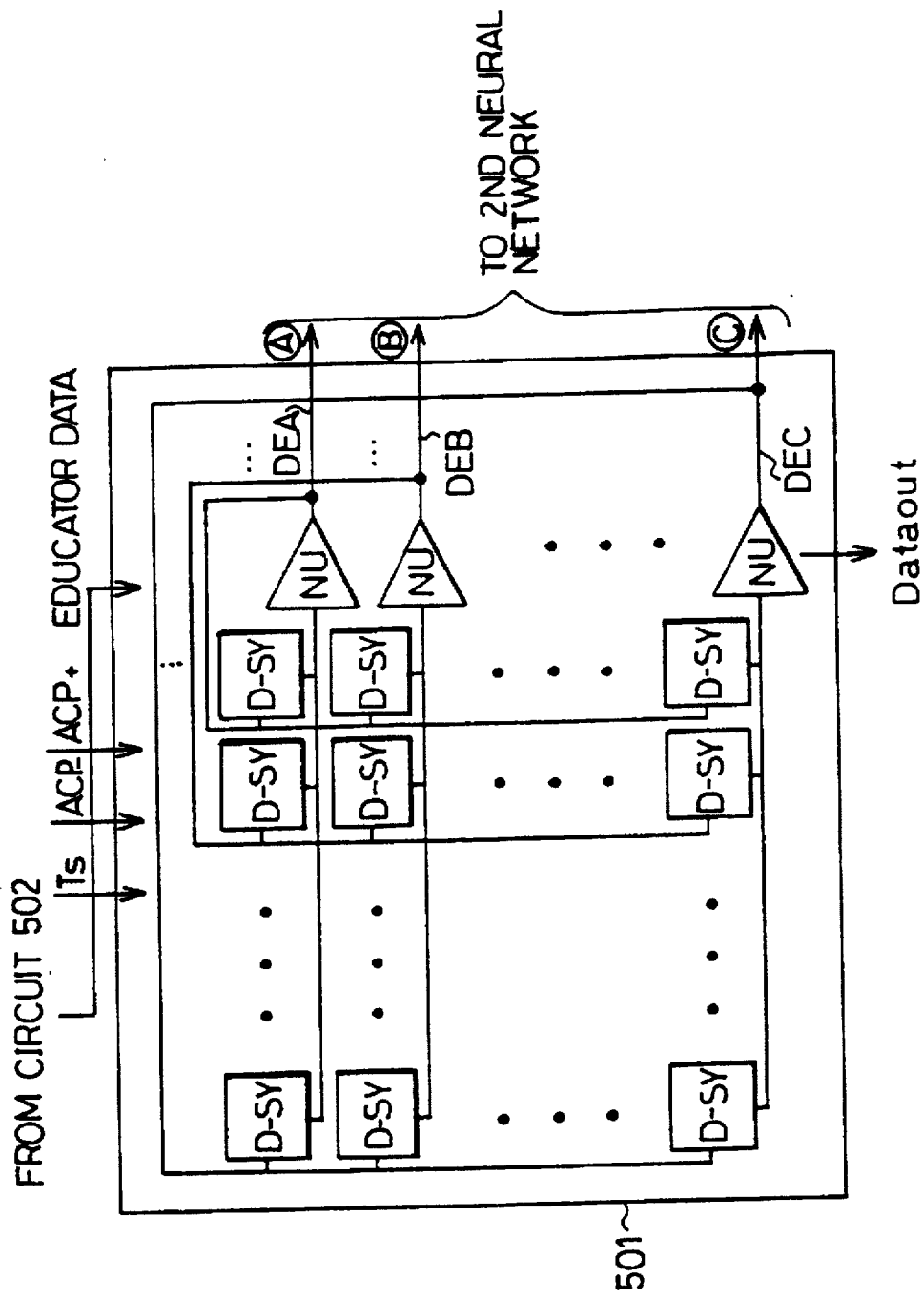
FIG. 12 illustrates the structure of a first neural network expressing unit shown in FIG. 9.

FIG. 12 illustrates the structure of the first neural network expressing unit 501. As shown in FIG. 12, the first neural network expressing unit 501 is similar in structure to the neural network expressing unit shown in FIG. 2, and includes a matrix of analog storage type synapse expressing circuits DSY storing synapse load value information in capacitors, and neuron units NU which are arranged in a column. The structures and operations of the synapse expressing units DSY and the neuron units NU are similar to those described above with reference to FIGS. 2 to 5, and hence the detailed description thereof is omitted.

Figure 13:
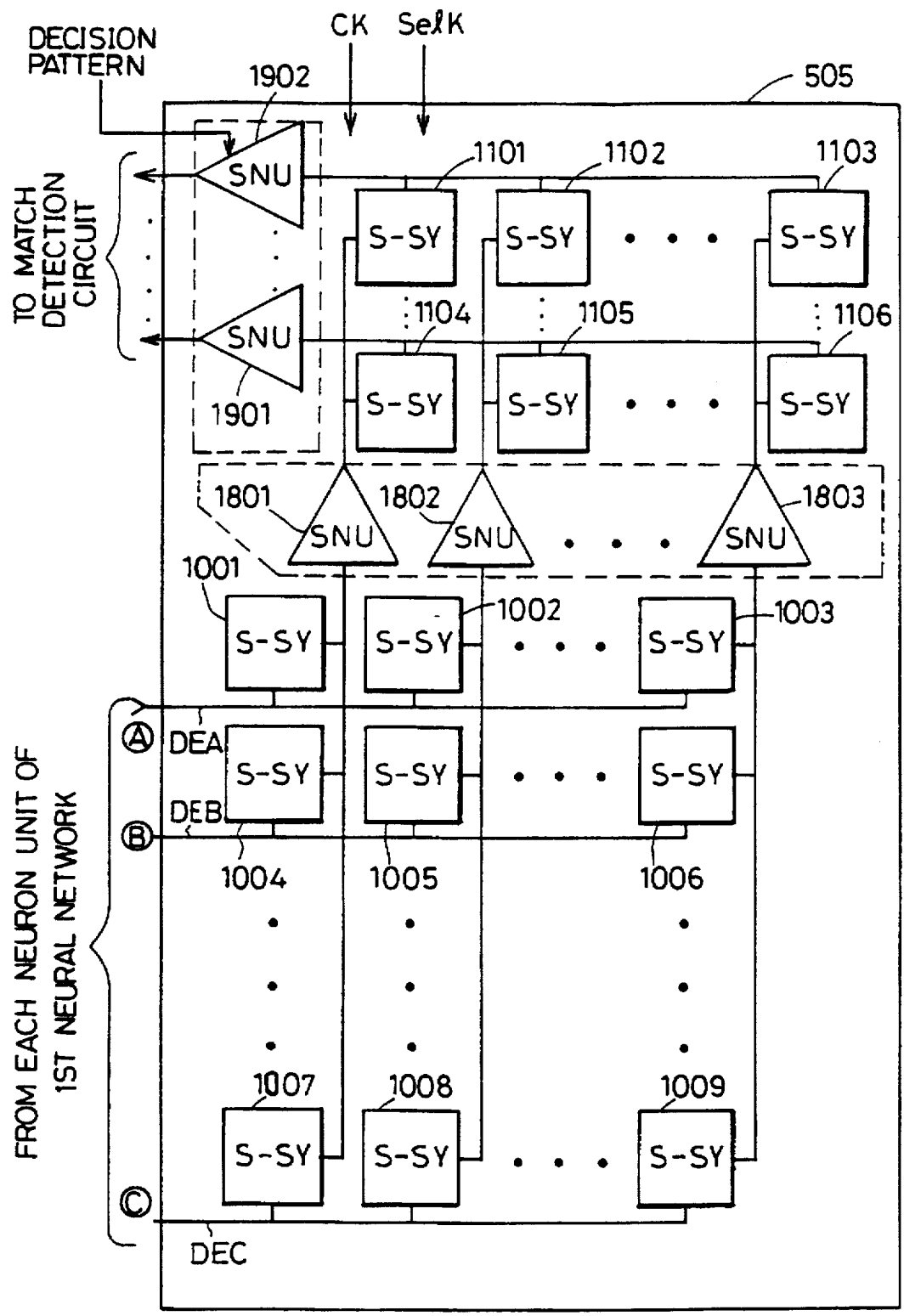
FIG. 13 illustrates the structure of a second neural network expressing unit shown in FIG. 9.

FIG. 13 illustrates an exemplary structure of the second neural network expressing unit 505. The second neural network expressing unit 505 is in a three-layer structure including neuron units 1801, 1802, . . . , 1803 forming an intermediate layer (hidden layer) and neuron units 1901, . . . , 1902 forming an output layer. An input layer of the second neural network expressing unit 505 is formed by the respective neuron units of the first neural network expressing unit 501. It is not particularly necessary to form the input layer of the second neural network expressing unit 505 by all neuron units of the first neural network expressing unit 501.

Synapse expressing circuits 1001, 1002, . . . , 1009 are provided between the input layer and the neuron units 1801 to 1803 forming the intermediate layer. Synapse expressing circuits 1101, 1102, . . . , 1106 are provided between the neuron units 1801 to 1803 forming the intermediate layer and the neuron units 1901, . . . , 1902 forming the output layer.

Referring to FIG. 13, output signals (state signals) of corresponding neuron units of the first neural network expressing unit 501 are transmitted to synapse expressing circuits SSY which are arranged in a row. In the structure shown in FIG. 13, the state signals of all neuron units provided in the first neural network expressing unit 501 are employed as input signals of the second neural network expressing unit 505. Output signals from synapse expressing circuits arranged in a column in the unit 501 are supplied to corresponding neuron units of the intermediate layer. Referring to FIG. 13, the synapse expressing circuits included in the second neural network expressing units 505 store synapse load value information as digital information with no capacitors in order to stably store the same for a long time. Thus, the synapse expressing circuits included in the second neural network expressing unit 505 require no refresh operations, and hence the same are illustrated as static type synapse expressing circuits with symbols SSY.

The second neural network expressing unit 505 carries out learning in accordance with a learning rule called back propagation by the synapse expressing circuits 1001 to 1106. The structures and operations of the components forming the second neural network expressing unit 505 are now described.

The synapse expressing circuits SSY include two types of circuits, i.e., first type synapse expressing circuits 1001 to 1009 for expressing coupling of the input layer and the intermediate layer, and second type synapse expressing circuits 1101 to 1107 for expressing coupling of the intermediate layer and the output layer.

Figure 14:
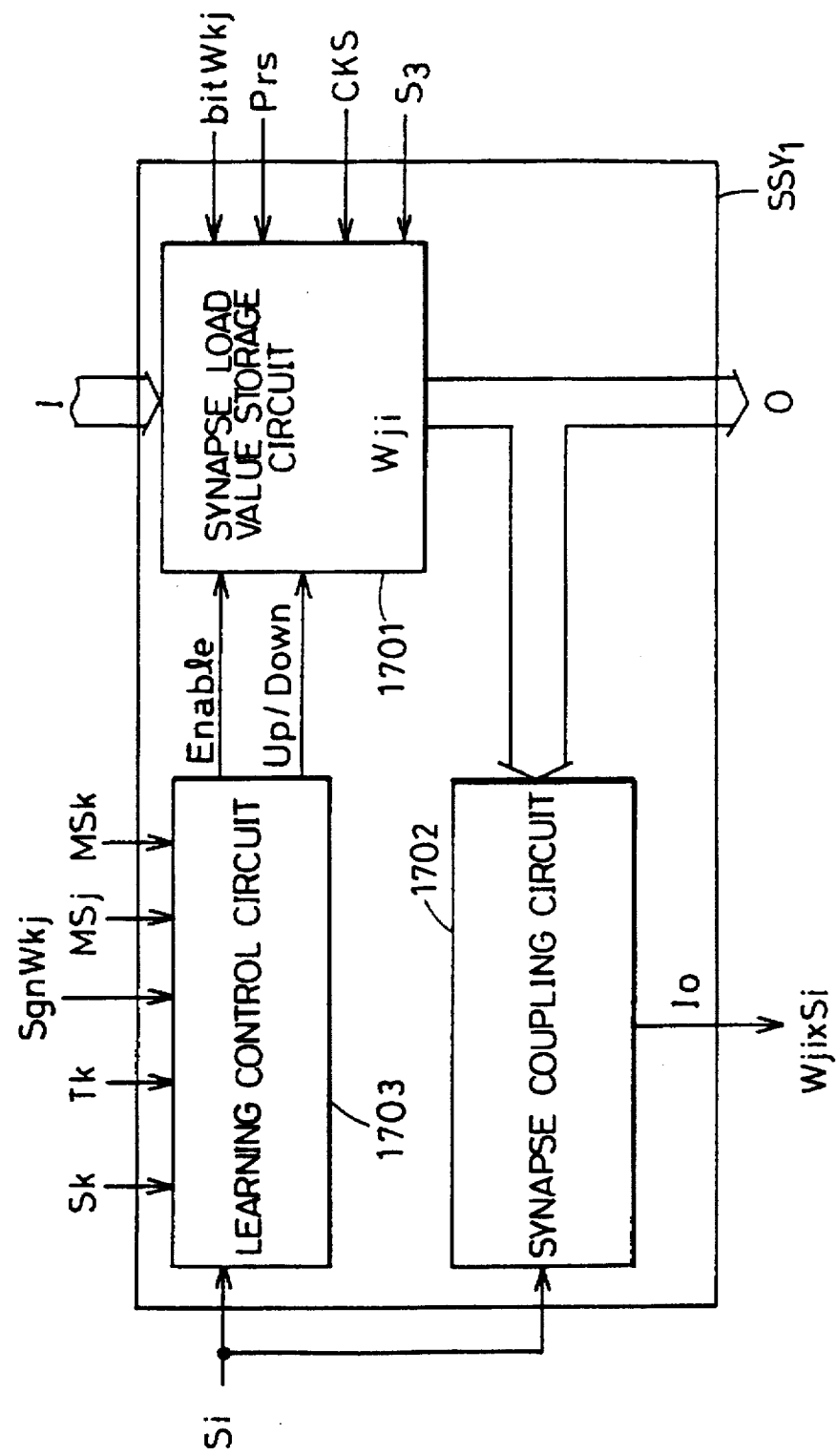
FIG. 14 illustrates the structure of a first type synapse expressing circuit coupling an input layer and a hidden layer shown in FIG. 13.

FIG. 14 illustrates the structure of each of the synapse expressing circuits 1001 to 1009 expressing coupling of the input layer and the intermediate layer. Referring to FIG. 14, symbol SSY1 represents the first type synapse expressing circuit. The first type synapse expressing circuit SSY1 includes a synapse load value storage circuit 1701 which stores synapse load value information, a learning control circuit 1703 for correcting a synapse load value stored in the synapse load value storage circuit 1701, and a synapse coupling circuit 1702 which outputs a loaded current Io indicating the product of a state signal Si and a synapse load Wji stored in the synapse load value storage circuit 1701.

The synapse load value storage circuit 1701, which is capable of shifting its initial data, can receive synapse load value information I from an adjacent synapse expressing circuit and supply the same to another adjacent synapse expressing circuit as synapse load value information O. Thus, it is possible to externally set initial values of the respective synapse expressing circuits.

Figure 15:
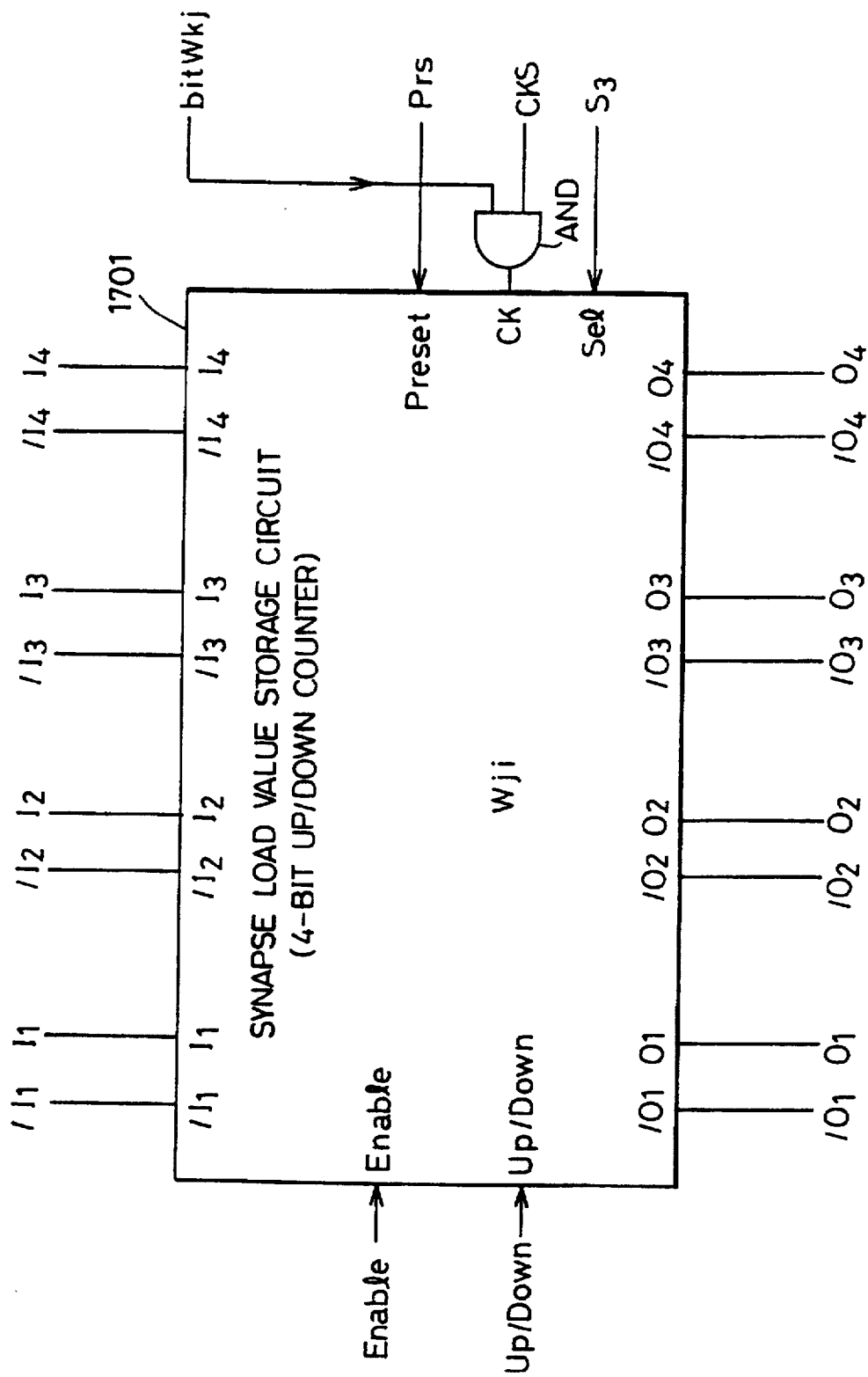
FIG. 15 illustrates roughly an overall structure of a synapse load value storage circuit shown in FIG. 14.

FIG. 15 roughly illustrates an overall structure of the synapse load value storage circuit 1701. Referring to FIG. 15, the synapse load value information is expressed in four bits. The synapse load value storage circuit 1701 can receive synapse load value data I1 and /I1 to I4 and /I4 from an adjacent synapse load value storage circuit in parallel and shift out the synapse load value to another adjacent synapse load value storage circuit in parallel through terminals O1 and /O1 to O4 and /O4. The storage data of the synapse load value storage circuit 1701 are reset in response to a preset signal Prs. Further, a counting operation of the synapse load value storage circuit 1701 is started in response to an enable signal Enable from the learning control circuit 1703, to count up or count down the number of clock signals received at a clock terminal CK in response to a count up/count down instruction signal Up/Down from the learning control circuit 1703.

The synapse load value storage circuit 1701 determines whether signals received at input terminals I1 and /I1 to I4 and /I4 are latched and shifted out or a count operation in response to the control signals Enable and Up/Down from the learning control circuit 1703 and to a selection control signal S3. A signal bitWkj supplied to the synapse load value storage circuit 1701 indicates the digit of the synapse load value, to show what digit of the synapse load value Wji is supplied. A clock signal CKS is supplied to the clock terminal CK in response to the bit signal bitWkj, to adjust increase and decrease of a count value in the synapse load value storage circuit 1701. When the bit signal bitWkj indicates the zero digit, the clock signal CKS is supplied in a ratio of 1, while the clock signal CKS is supplied in a ratio of 2 when the bit signal bitWkj indicates the first digit. The pulse width of the bit signal bitWkj may be varied with the digit number expressed by the same, to adjust the number of the passed clock signals CKS. The bit signal bitWkj is employed since the second neural network expressing unit 505 has a feed-forward type structure as hereinafter described in detail, in order to implement learning of back propagation.

Figure 16:
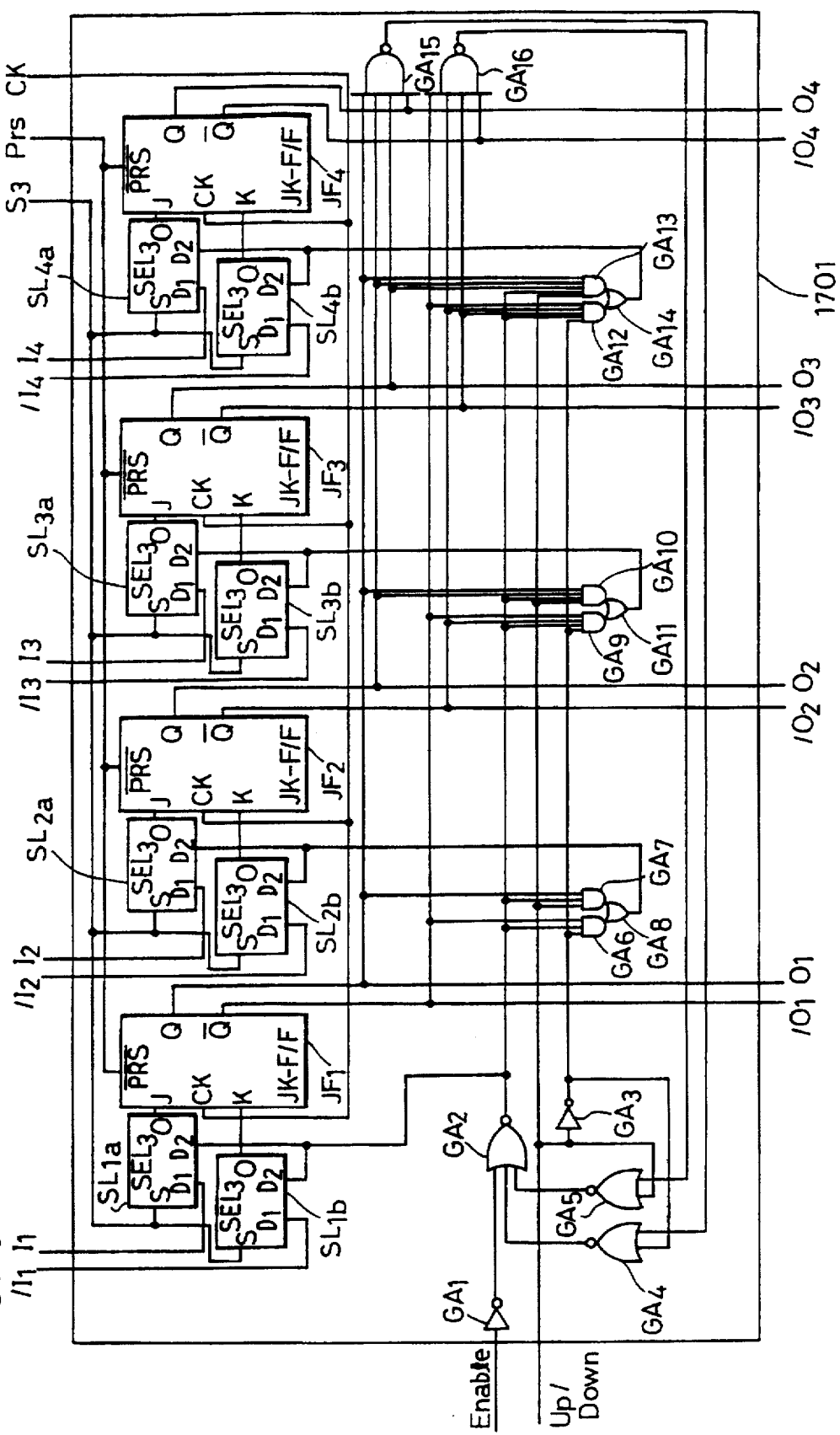
FIG. 16 illustrates a detailed structure of the synapse load storage circuit shown in FIGS. 14 and 15.

FIG. 16 illustrates a specific structure of a four-bit up/down counter which is formed by the synapse load value storage circuit 1701 shown in FIG. 15. Referring to FIG. 16, the synapse load value storage circuit 1701 includes JK flip-flops JF1 to JF4 for storing four-bit synapse load value data, and selectors SL1a and SL1b to SL4a and SL4b for supplying input data to the JK flip-flops JF1 to JF4. The selectors SL1a and SL1b select either external set data I1 and /I1 or a count up/count down signal to supply the same to J and K inputs of the JK flip-flop JF1.

The selectors SL2a and SL2b supply either external data I2 and /I2 or the count up/count down signal to J and K inputs of the JK flip-flop JF2. The selectors SL3a and SL3b supply either initialization data bits I3 and /I3 or the count up/count down signal to J and K inputs of the JK flip-flop JF3, respectively. The selectors SL4a and SL4b supply either initialization data bits I4 and /I4 or the count up/count down signal to J and K inputs of the JK flip-flop JF4. The count up/count down signal is formed by count data bits resulting from a counting operation in operation of the synapse load value storage circuit 1701.

The synapse load value storage circuit 1701 further includes an inverter circuit GA1 which receives the enable signal Enable, a NOR circuit GA2 which receives outputs from gate circuits GA4 and GA5, a NAND circuit GA15 which receives Q outputs of the JK flip-flops JF1 to JF4, a NAND circuit GA16 which receives /Q outputs of the JK flip-flops JF1 to JF4, an inverter circuit GA3 which receives the count up/count down instruction signal Up/Down, a NOR circuit GA4 which receives the outputs from the inverter circuit GA3 and the NAND circuit GA15, and a NOR circuit GA5 which receives the up/down instruction signal Up/Down and the output of the NAND circuit GA16. The output of the NOR circuit GA2 is supplied to the selectors SL1a and SL1b.

With respect to the JK flip-flop JF2, the synapse load value storage circuit 1701 includes an AND circuit GA6 which receives the output of the NOR circuit GA2, the /Q output of the JK flip-flop JF1 and the output of the inverter circuit GA3, an AND circuit GA7 which receives the Q output of the JK flip-flop JF1, the output of the NOR circuit GA and the up/down instruction signal Up/Down, and an OR circuit GA8 which receives the outputs of the AND circuits GA6 and GA7. The output of the OR circuit GA8 is supplied to the selectors SL2a and SL2b.

With respect to the JK flip-flop JF3, the synapse load value storage circuit 1701 includes an AND circuit GA9 which receives the /Q outputs of the JK flip-flops JF1 and JF2 and the outputs of the NOR circuit GA2 and the inverter circuit GA3, an AND circuit GA10 which receives the Q outputs of the JK flip-flops JF1 and JF2, the output of the NOR circuit GA2 and the up/down indication signal Up/Down, and an OR circuit GA11 which receives the outputs of the AND circuits GA9 and GA10. The output of the OR circuit GA11 is supplied to the selectors SL3a and SL3b.

With respect to the JK flip-flop JF4, the synapse load value storage circuit 1701 includes an AND circuit GA12 which receives the /Q outputs of the JK flip-flops JF1, JF2 and JF3 and the outputs of the NOR circuit GA2 and the inverter circuit GA3, an AND circuit GA13 which receives the Q outputs of the JK flip-flops JF1 to JF3, the output of the NOR circuit GA2 and the up/down instruction signal Up/Down, and an OR circuit GA14 which receives the outputs of the AND circuits GA12 and GA13. The output of the OR circuit GA14 is supplied to the selectors SL4a and SL4b. The operation is now described.

In general, a JK flip-flop outputs signals which have been received at its J and K inputs from Q and /Q outputs thereof when a clock signal is supplied. When the selectors SL1a and SL1b to SL4a and SL4b select the external initialization data I1 and /I1 to I4 and /I4, the JK flip-flops JF1 to JF4 output the external set data I1 and /I1 to I4 and /I4 to an adjacent synapse load value storage circuit in parallel as output data O1 and /O1 to O4 and /O4 in response to the clock signal CK.

When both of J and K inputs of such a JK flip-flop are zero (low level), its output state is not inverted even if a clock signal is supplied, and the output state is inverted upon supply of a clock signal when both J and K inputs thereof are "1 (high level)".

The control signal S3 decides whether the synapse load value storage circuit 1701 executes a count operation or shifts in and out the external set data. The reset signal Prs is employed to establish the initial state, and the JK flip-flop JF4 receives this reset signal Prs at its clear input /CLR, while the JK flip-flops JF1 to JF3 receive the same at preset inputs /PLRS thereof. The output of the JK flip-flop JF4 provides the most significant bit, and that of the JK flip-flop JF1 provides the least significant bit.

The enable signal Enable is generated in a count up/count down operation of the synapse load value storage circuit 1701. Before the count value of the synapse load value storage circuit 1701 reaches the maximum or minimum value, both outputs of the NAND circuits GA15 and GA16 are at high levels. In this case, both outputs of the gate circuits GA4 and GA5 are at low levels. When the enable signal Enable is generated, the output of the NOR circuit GA2 goes high. Thus, both J and K inputs of the JK flip-flop JF1 go high, which inverts its output state in response to the clock signal CK. This state is transmitted to the higher order JK flip-flops JF2 to JF4, to execute a count up or count down operation in accordance with an operation mode instructed by the up/down instruction signal Up/Down. When the count up/count down instruction signal Up/Down is at a high level to indicate a count up operation, the output of the AND circuit GA7, for example, goes high if the Q output of the JK flip-flop JF1 is at a high level, whereby the JK flip-flop JF2 inverts its output state in response to the clock signal CK. Thus, the JK flip-flops JF3 and JF4 invert output states thereof in response to the clock signal CK respectively, to execute the count up operation.

When the count up/down instruction signal Up/Down is at a low level, the AND circuit GA6, for example, outputs a high-level signal in response to a high-level output from the /Q output of the JK flip-flop JF1. In this state, the output of the OR circuit GA8 goes high so that the output state of the JK flip-flop JF2 is inverted in response to the clock signal CK. When the /Q outputs of the JK flip-flops JF1 and JF2 go high, the output state of the JK flip-flop JF3 is inverted in response to the clock signal CK. Thus, a count down operation is executed.

When the count value reaches the maximum or minimum value ("1111" or "0000"), the output of the NAND circuit GA15 or GA16 goes low. In this state, the output of the NOR circuit GA4 or GA5 goes high, and the output of the NOR circuit GA2 is fixed at a low level. In this state, the J and K inputs of the JK flip-flops JF1 to JF4 are zero (low levels), and hence the output states thereof are not changed even if the clock signal CK is applied. Thus, the count value is maintained at the maximum or minimum value. Therefore, the synapse load value storage circuit 1701 serves as a counter with a limiter, to hold the maximum or minimum value when its count value reaches the maximum or minimum value.

Figure 17:
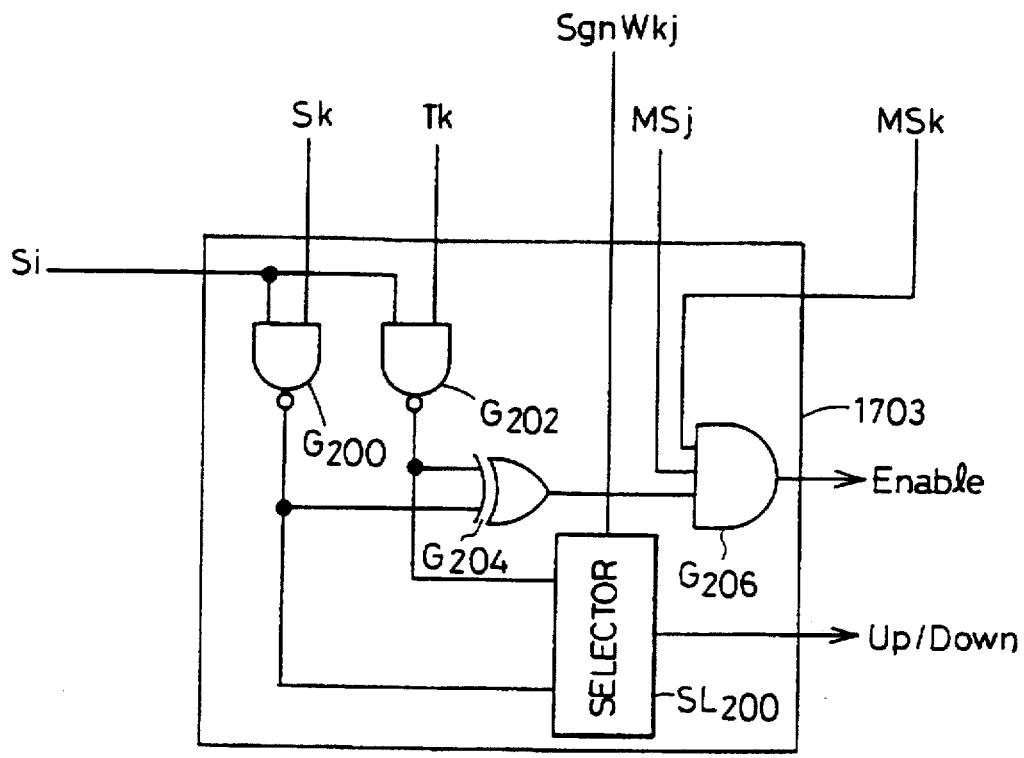
FIG. 17 illustrates the structure of a learning control circuit shown in FIG. 14.

FIG. 17 illustrates the structure of the learning control circuit 1703 shown in FIG. 14. Referring to FIG. 17, the learning control circuit 1703 includes a NAND circuit G200 which receives the state signals Sk and Si, a NAND circuit G202 which receives the state signal Si and educator pattern data Tk with respect to the output neuron unit k, an ExOR circuit G204 which receives the outputs of the NAND circuits G200 and G202, a selector SL200 which selects one of the NAND circuits G200 and G202 in response to a signal SgnWkj indicating the sign of the synapse load value Wkj, and an AND circuit G206 which receives the output of the ExOR circuit G204 and signals MSj and MSk. The signal Tk is an educator pattern data bit which is supplied with respect to a k-th output neuron in the output layer. The signal MSj indicates that the output signal (state signal) Sj of a j-th neuron in the hidden layer is at an intermediate value (Sj=0.5). The signal MSk indicates that the output signal (state signal) Sk of the k-th neuron unit in the output layer is at an intermediate value.

The signal SgnWkj, which indicates the sign of the synapse load value Wkj, i.e., of the connection strength of the hidden neuron j and the output neuron k, goes low when the synapse load value Wkj is negative while the same goes high when the synapse load value Wkj is zero or positive.

In the second neural network expressing unit 505, the neuron units are connected in a feed-forward manner. In other words, the neuron units are unidirectionally connected from the input layer to the hidden layer and from the hidden layer to the output layer. The neuron units are not coupled with each other in the respective layers, and an input pattern progresses from the input layer toward the output layer. In such a back propagation arrangement, the synapse load values are successively changed from the output layer toward the hidden and then to input layers to reduce difference between an actual output data pattern and an educator data pattern.

In the structure of the learning control circuit 1703 shown in FIG. 17, the output of the ExOR circuit G204 goes high when the outputs of the NAND circuits G200 and G202 mismatch. This indicates that the output state signal Sk of the neuron unit k in the output layer does not yet match with the educator pattern data bit Tk. When both of the signals MSj and MSk are at high levels indicating that the signals Sj and Sk at intermediate values, the AND circuit G206 generates the enable signal Enable to correct the synapse load value.

The selector SL200 selects the output of the NAND circuit G200 when the sign signal SgnWkj is at a high level and therefore the synapse load value Wkj is positive, while the same selects the output of the NAND circuit G202 when the sign signal is at a low level. The output of the selector SL200 is employed as the count up/count down instruction signal Up/Down. Thus, the learning control circuit 1703 implements an approximate expression of the following back propagation learning rule:

$$\Delta Wij = \sum_k (Tk \cdot Si - Sk \cdot Si) \cdot MSj \cdot MSk \cdot SgnWkj \cdot bitWkj$$

The state signal Si of the input neuron is supplied from the corresponding neuron unit of the first neural network. The bit signal bitWkj is implemented when the clock signals CK are generated according to the digit by $2^0, 2^1, \ldots$ along its bit position (digit position) in the counter structure shown in FIG. 16. A structure of taking the sum $\Sigma$ in the above back propagation expression is implemented by providing the respective terms in a division multiplexing manner. This structure is now described.

For the purpose of simplification, consider that the input layer has n neurons, the hidden layer has three neurons and the output layer has two neurons. The n neurons of the input layer are denoted by I1 to In and the three neurons of the hidden layer are denoted by H1, H2 and H3, while the two neurons of the output layer are denoted by O1 and O2. Connection strengths between the neuron units are denoted by the symbol W with the characters of the neurons added.

Figure 18:
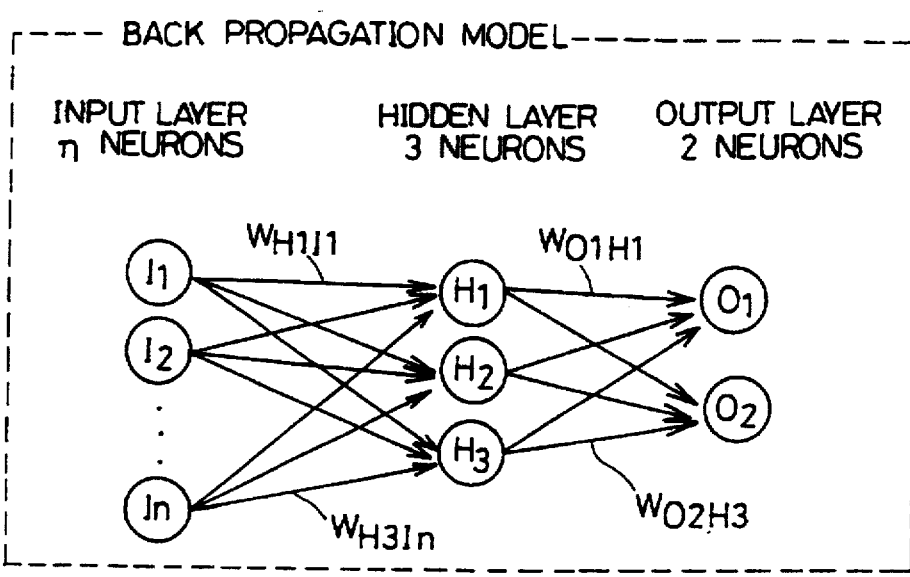
FIG. 18 illustrates a back propagation model implemented by the second neural network.
Figure 19:
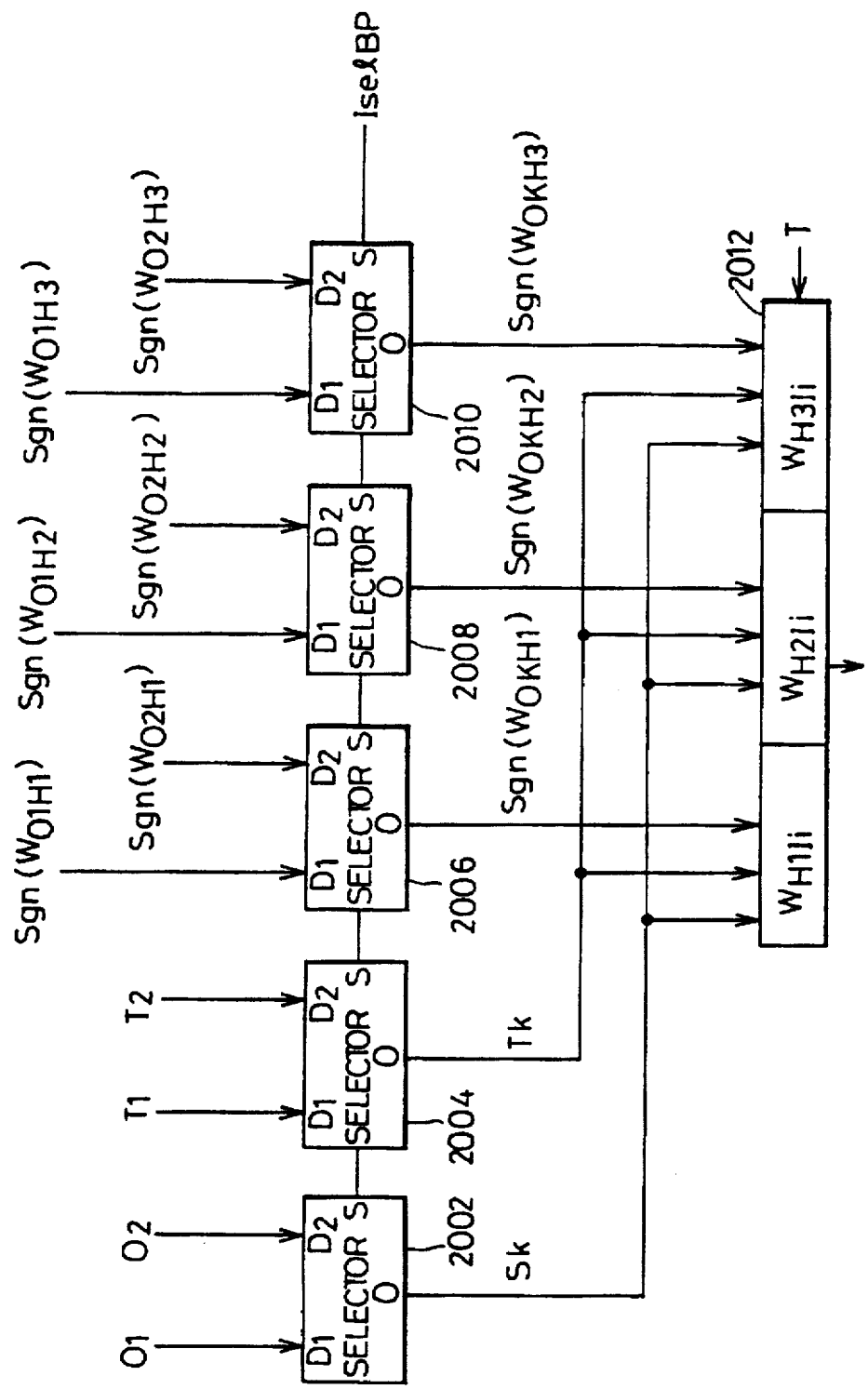
FIG. 19 illustrates a structure for supplying signals to the learning control circuit shown in FIG. 14 for implementing a learning rule in the back propagation model shown in FIG. 18.

FIG. 19 illustrates a structure for implementing the above approximate expression in accordance with the back propagation model shown in FIG. 18.

Referring to FIG. 19, a sum implementation circuit includes a selector 2002 which receives the output signals (state signals) of the output neuron units O1 and O2, a selector 2004 which receives educator data T1 and T2 for the output neuron units O1 and O2, a selector 2006 which receives signs Sgn(WO1H1) and Sgn(WO2H1) of the synapse load values of the neuron unit H1 of the hidden layer and the output neuron units O1 and O2, a selector 2008 which receives signs Sgn(WO1H2) and Sgn(WO2H2) of the synapse load values of the neuron unit H2 of the hidden layer and the output neuron units O1 and O2, and a selector 2010 which receives signs Sgn(WO1H3) and Sgn(WO2H3) of synapse load values of the neuron unit H3 of the hidden layer and the output neuron units O1 and O2.

The respective selectors 2002 to 2010 successively select signals supplied to the inputs thereof in response to a selection control signal IselBP. The selector 2002 outputs the state signal Sk of the output neuron unit k. The selector 2004 outputs the educator pattern data Tk for the output neuron unit k. The selectors 2006, 2008 and 2010 generate sign coefficients Sgn(WOkH1), Sgn(WOkH2) and Sgn (WOkH3), respectively. A latch circuit 2012 receives the outputs of the selectors 2002 to 2010 for successive select and supply to the learning control circuit 1703 in response to a clock signal T, thereby implementing the sum of the above approximate expression of back propagation.

While FIG. 19 illustrates no paths for outputting the signals MSj and MSk indicating the intermediate values, the output signal MSk of the output neuron unit k and the intermediate value indication signal MSj of the neuron unit j of the hidden layer may be latched and simultaneously outputted in response to the clock signal T, similarly to the above.

Figure 20:
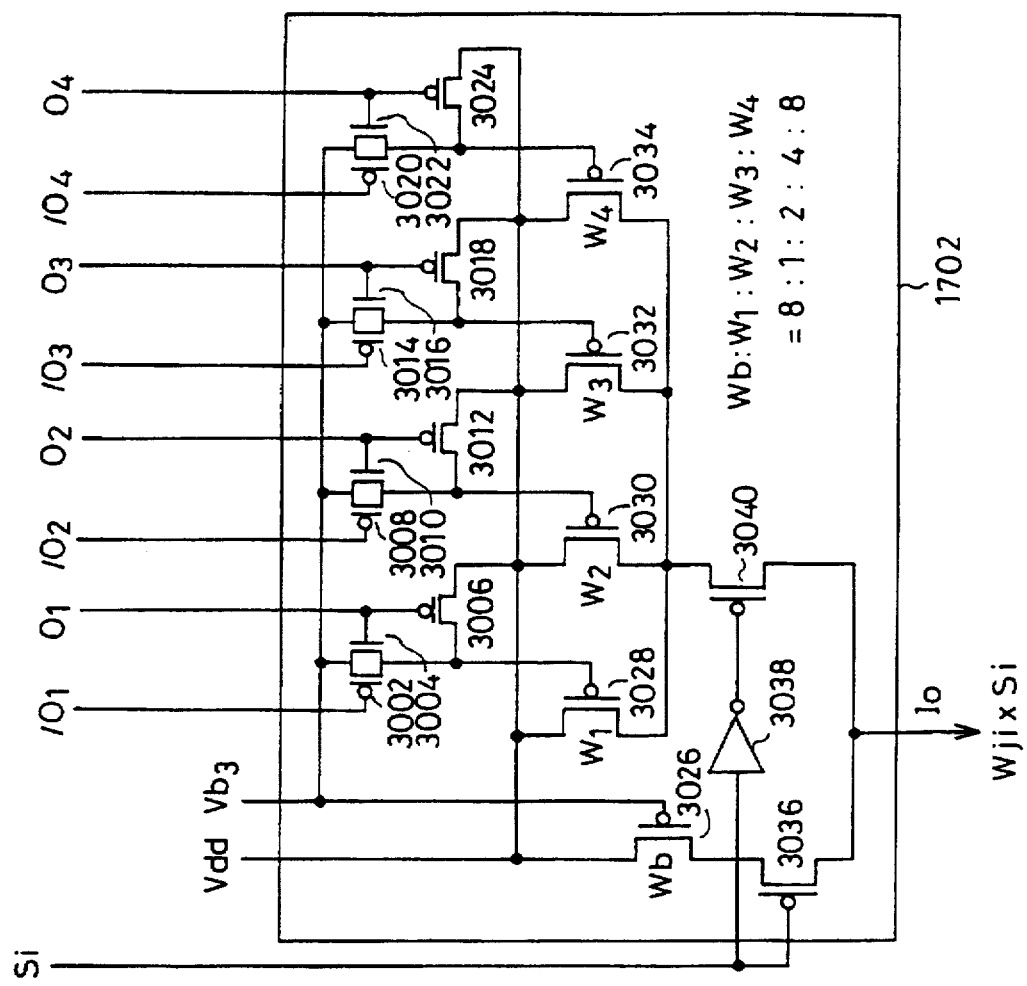
FIG. 20 illustrates the structure of a synapse coupling circuit shown in FIG. 14.

FIG. 20 illustrates the structure of the synapse coupling circuit 1702 shown in FIG. 14. Referring to FIG. 20, the synapse coupling circuit 1702 includes p-channel MOS transistors 3002, 3008, 3014 and 3020 which receive the synapse load values /O1, /O2, /O3 and /O4 from the synapse load value storage circuit 1701 at respective gates, n-channel MOS transistors 3004, 3010, 3016 and 3022 which receive the synapse load values O1, O2, O3 and O4 at respective gates, p-channel MOS transistors 3006, 3012, 3018 and 3024 which receive the synapse load value bits O1, O2, O3 and O4 at respective gates, a p-channel MOS transistor 3028 which receives a bias voltage Vb3 transmitted from the transistors 3002 and 3004 at its gate, a p-channel MOS transistor 3030 which receives the bias voltage Vb3 transmitted through the transistors 3008 and 3010 at its gate, a p-channel MOS transistor 3032 which receives the bias voltage Vb3 through the transistors 3014 and 3016 at its gate, and a p-channel MOS transistor 3034 which receives the bias voltage Vb3 at its gate through the transistors 3020 and 3022.

First conduction terminals of the transistors 3028, 3030, 3032 and 3034 are coupled to a reference voltage Vdd, which is an operating power supply voltage level. The transistors 3006, 3012, 3018 and 3024 enter ON states in response to the corresponding synapse load value bits O1 through O4, respectively.

The synapse coupling circuit 1702 further includes a p-channel MOS transistor 3026 which receives the bias voltage Vb3 at its gate and transmits the reference voltage Vdd, an inverter circuit 3038 which receives the state signal Si, and a p-channel MOS transistor 3036 which receives the state signal Si at its gate. The output of the inverter circuit 3038 is supplied to the gate of a p-channel MOS transistor 3040. The transistor 3036 supplies a current transmitted from the transistor 3026 as a loaded current Io in an ON state. The transistor 3040 adds up currents transmitted through the transistors 3028, 3030, 3032 and 3034 and supplies the loaded current Io in an ON state.

The transistors 3026, 3028, 3030, 3032 and 3034 have voltage-to-current conversion functions, and respective gate widths Wb, W1, W2, W3 and W4 thereof are set in the ratios of 8:1:2:4:8. The operation is now described.

When the state signal Si is at a low level and the neuron unit i (input neuron) is in a non-firing state, the transistor 3036 is in an ON state and the transistor 3040 is in an OFF state. In this state, the transistor 3026 converts the reference voltage Vdd into a current by the conductance which is determined by the bias voltage Vb3, so that the information converted to the current by the transistor 3026 is outputted through the transistor 3036. The current defined by the bias voltage Vb3 is supplied as a bias current.

When the state signal Si is at a high level, the transistor 3036 enters an OFF state and the transistor 3040 enters an ON state. Consider that the synapse load value bit O1 is at a high level. In this case, the transistors 3002 and 3004 enter ON states, and the transistor 3006 enters an OFF state. The bias voltage Vb3 is supplied to the gate of the transistor 3028, which in turn enters an ON state to supply a current flow proportional to its gate width W1. When the synapse load value bit O1 is at a low level, the transistors 3002 and 3004 enter OFF states and the transistor 3006 enters an ON state. In this state, the reference voltage Vdd is supplied through the transistor 3006 to the gate of the transistor 3028, which in turn enters an OFF state. Thus, the transistors 3028, 3030, 3032 and 3034 enter ON states in response to the corresponding synapse load value bits O1, O2, O3 and O4 respectively, to supply currents which are proportional to the gate widths thereof. The currents from the transistors 3028 to 3034 are added up at one node of the transistor 3040, and outputted as the loaded current Io.

The gate width Wb of the transistor 3026 supplying the bias current is set at the ratio of 8 to make the bias current correspond to a zero state of the synapse load value, thereby implementing positive and negative signs of the synapse load value based on the value of the present loaded current.

According to this structure, it is possible to decide the sign signal SgnWkj of the synapse load value according to a high or low level of the bit O4.

Figure 21:
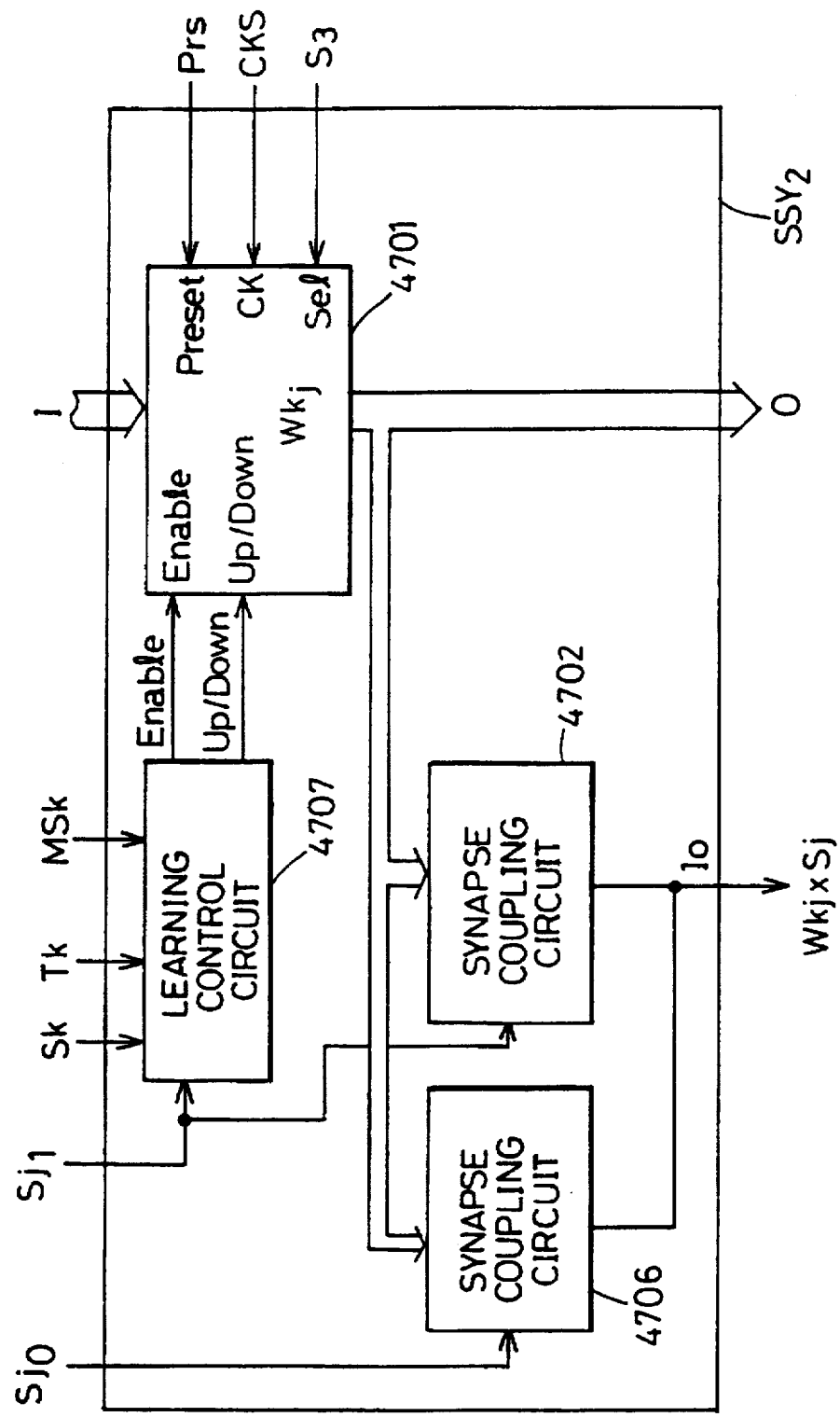
FIG. 21 illustrates the structure of a second type synapse expressing circuit for coupling a hidden layer and an output layer shown in FIG. 13.

FIG. 21 illustrates the structure of a second type synapse expressing circuit SSY2 for coupling the neurons of the hidden layer to the neurons in the output layers. This synapse expressing circuit SSY represents the synapse expressing circuits 1101 to 1106 shown in FIG. 13. Referring to FIG. 21, the synapse expressing circuit SSY2 includes a learning control circuit 4707 which receives the control signals Sj1, Sk, Tk and MSk and generates the synapse load value modifying signals Enable and Up/Down, synapse coupling circuits 4072 and 4706, and a synapse load value storage circuit 4701.

The synapse load value storage circuit 4701, which is similar in structure to that of the first type synapse expressing circuit as described previously with reference to FIGS. 15 and 16, is formed by a four-bit up/down counter with a limiter, for example.

Since each neuron unit of the hidden layer is structured to take three states of non-firing, intermediate and firing states as described later, the synapse coupling circuits 4702 and 4706 are adapted to express the respective states. The output signal from the neuron unit of the hidden layer is expressed in two bits Sj0 and Sj1. The synapse coupling circuits 4702 and 4706 are similar in structure to the synapse coupling circuit 1702 of the first type synapse expressing circuit as described above with reference to FIG. 20.

Figure 22:
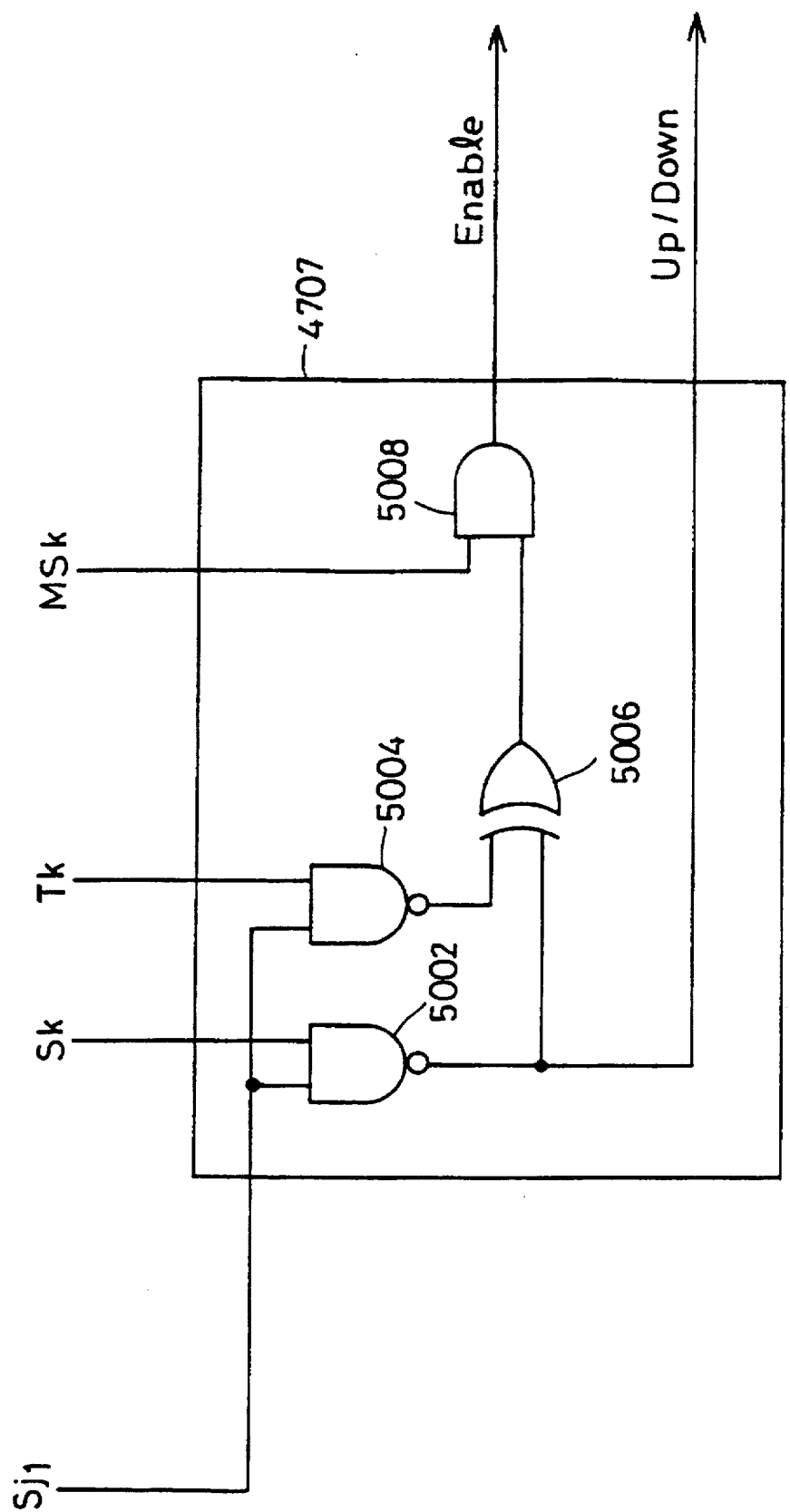
FIG. 22 illustrates the structure of a learning control circuit shown in FIG. 21.

FIG. 22 illustrates the structure of the learning control circuit 4707 shown in FIG. 21. Referring to FIG. 22, the learning control circuit 4707 includes a two-input NAND circuit 5002 which receives the output signal Sj1 from the j-th neuron unit j of the hidden layer and the output signal (state signal) Sk from the k-th neuron unit k of the output layer, a NAND circuit 5004 which receives the state signal bit Sj1 and the educator pattern data Tk for the output layer neuron k, an ExOR circuit 5006 which receives the outputs from the NAND circuits 5002 and 5004, and an AND circuit 5008 which receives the output of the ExOR circuit 5006 and the signal MSk indicating that the output neuron unit k is in an intermediate state.

In the learning control circuit 4707 shown in FIG. 22, the output of the ExOR circuit 5006 goes high when the outputs of the NAND circuits 5002 and 5004 mismatch. If the signal MSk is at a high level (intermediate state) in this case, the enable signal Enable is generated to correct the synapse load value. The output of the NAND circuit 5002 determines whether the synapse load value is to be increased or reduced. When the output of the NAND circuit 5002 is at a high level, the synapse load value is increased. When the signal Sj1 is "1", the neuron unit j is in a firing state. Thus, the learning control circuit 4707 implements approximation of the following back propagation learning rule:

$$\Delta Wkj = (Tk \cdot Sj - Sk \cdot Sj) \cdot MSk$$

Figure 23:
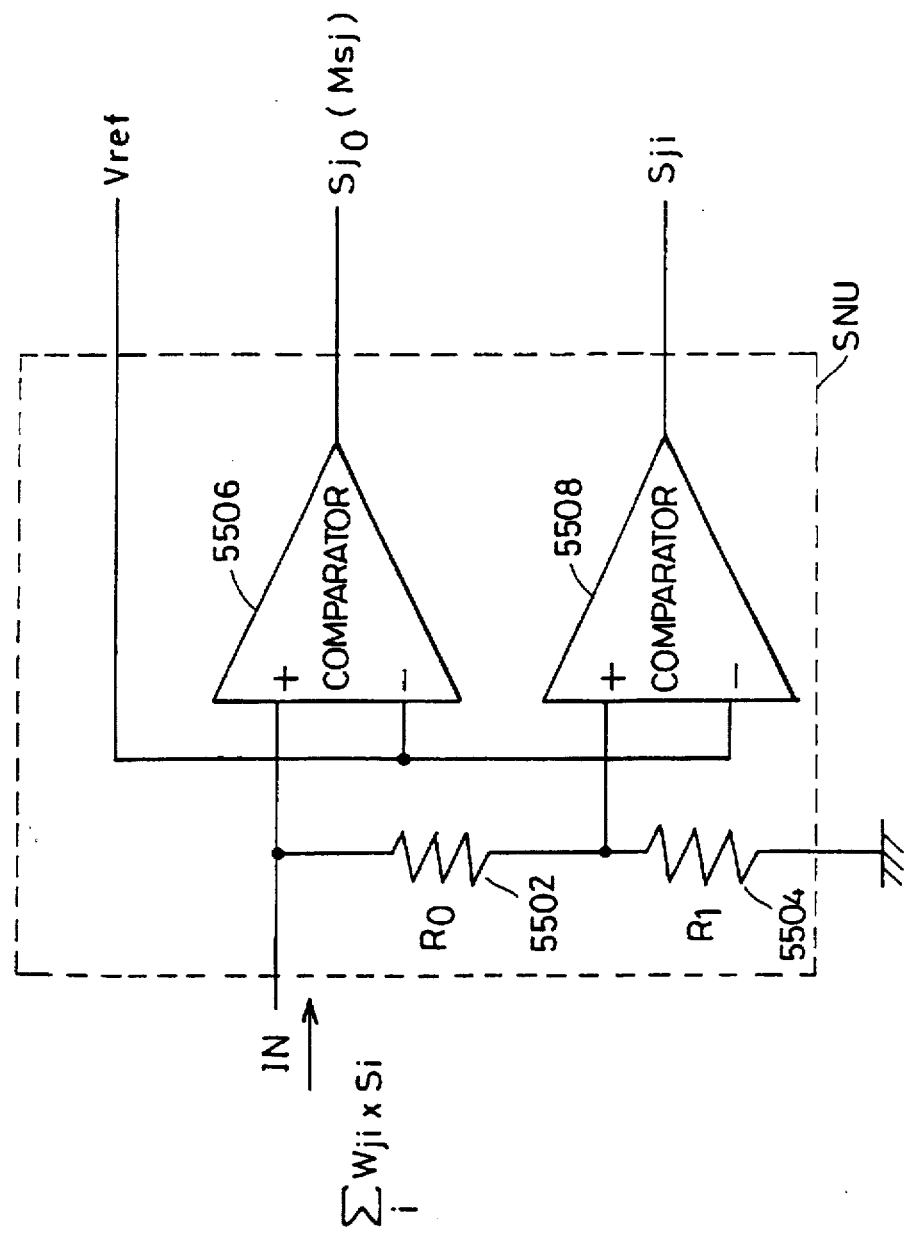
FIG. 23 illustrates the structure of the neuron unit shown in FIG. 13.

FIG. 23 illustrates the structure of each of the neuron units 1801, 1802, ..., 1803 and 1901, ..., 1902 provided in the second neural network expressing unit. Referring to FIG. 23, the neuron unit is generically denoted by symbol SNU. The neuron SNU includes comparators 5506 and 5508 which receive a reference voltage Vref at negative inputs thereof. The comparator 5506 receives the sum IN $(=\Sigma Wji \cdot Si$, the sum is obtained for i) of the loaded current transmitted through a corresponding dendrite signal line at its positive input (the current is converted into a voltage signal by the resistors 5502 and 5504). The comparator 5508 receives a voltage obtained by dividing the sum loaded current In by the resistance values R0 and R1 of resistors 5502 and 5504. The comparator 5506 generates the signal Sj0, and the comparator 5508 generates the signal Sj1.

The neuron unit SNU shown in FIG. 23 expresses the following three states:

Non-firing State: Sj0=Sj1 =0

Intermediate State: Sj0=1, Sj1=0

Firing State: Sj0=Sj1=1

The output signal Sj0 from the comparator 5506 is used as the signal MSj indicating the intermediate value in back propagation learning. The reference voltage Vref provides a threshold value of this neuron unit SNU. It is possible to decide whether or not the neuron unit SNU is in a firing state by observing the signal Sj1. In the structure shown in FIG. 17, therefore, the signal Sk1 is used as the state signal Sk.

In a learning operation of the second neural network, decision patterns from the decision pattern storage circuit 507 shown in FIG. 9 are supplied as output educator patterns. In response to the supplied educator patterns, the second neural network expressing unit 505 changes the internal synapse load values in accordance with the back propagation learning rule. In the learning operation, the state signals (output signals) of all of or a part of neuron units of the first neural network are supplied. At this time, any educator patterns may be supplied so far as it can be decided whether or not a converged state of the first neural network expressing unit is to be memorized. The learning operation of the second neural network expressing unit 505 may be simultaneously executed with the learning operation of the first neural network expressing unit 501, or patterns similar to the educator patterns for the first neural network expressing unit 501 may be independently supplied to the second neural network expressing unit 505 at a different time as input patterns to be subjected to learning.

Due to the aforementioned structure, it is possible to correctly decide whether or not a converged state of the first neural network expressing unit 501 is to be memorized in a refresh operation thereof.

Figure 24:
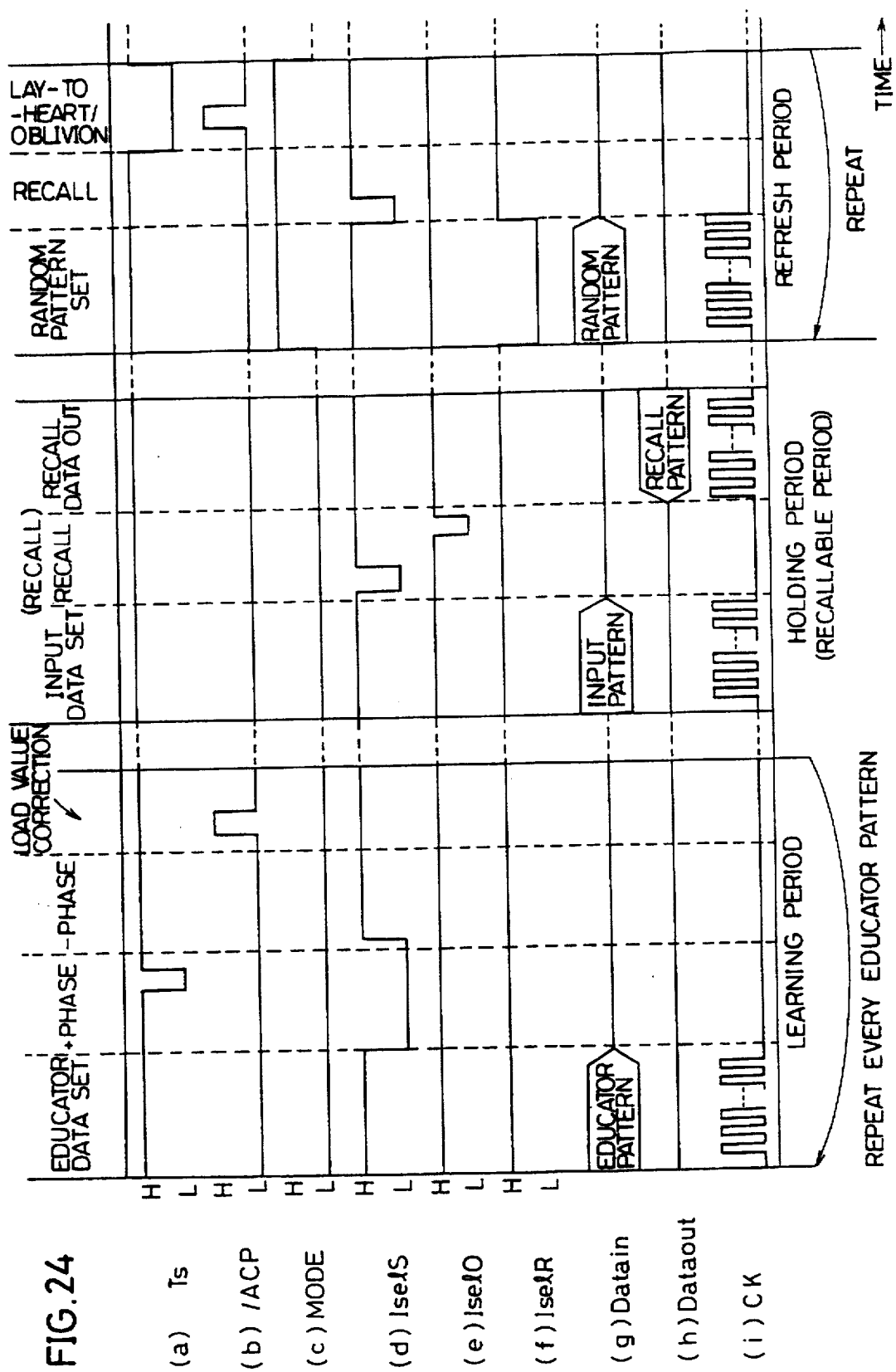
FIG. 24 is a signal waveform diagram showing operations of a second embodiment.

FIG. 24 is an operating waveform diagram of the neural network expressing apparatus according to the second embodiment of the present invention. The operations of the neural network expressing apparatus according to the second embodiment are now described in summary.

The operations of the second embodiment shown in FIG. 24 are substantially similar to those of the first embodiment shown in FIG. 7, except that a mode switching signal MODE is brought into a high level only in a refresh period, and the learning control signals ACP+ and ACP− are replaced by a signal /ACP forming the basis thereof. In the refresh period, operations of lay-to-heart and oblivion are simultaneously executed by the signal /ACP. Operations in learning and holding periods are similar to those of the first embodiment shown in FIG. 7, such that learning and holding (recall) operations responsive to educator data and input data patterns are executed in the first neural network expressing unit 501.

Figure 25:
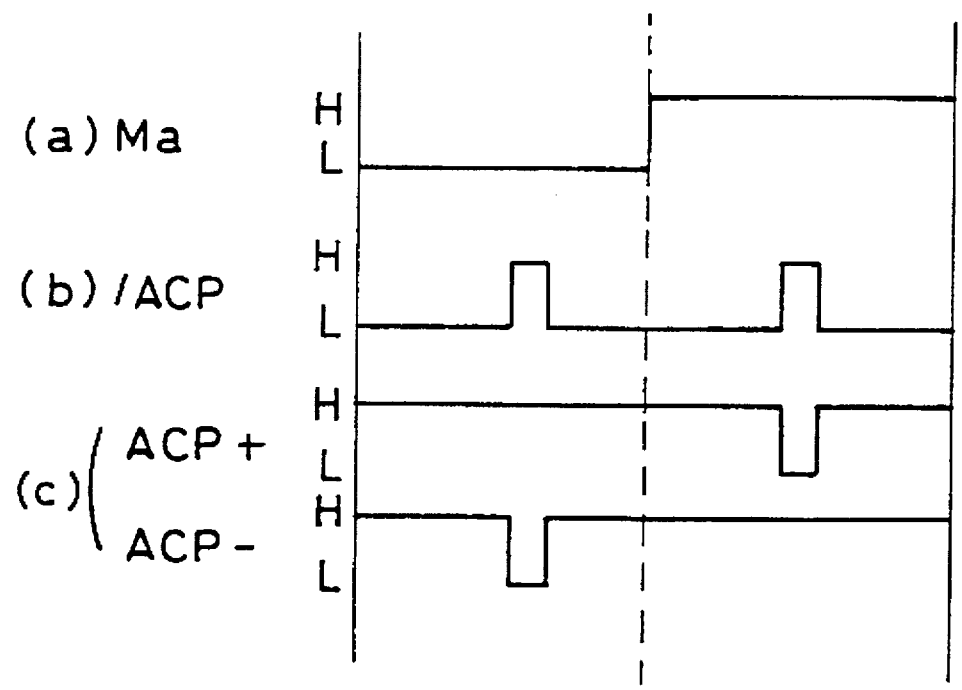
FIG. 25 is a waveform diagram showing relationship between a match detection signal and learning control signals in the second embodiment.

When the mode switching signal MODE goes high in the refresh period, a learning control signal ACP+ or ACP− is alternatively generated in response to the control signal /ACP in accordance with the match detection signal Ma. Thus, the first neural network expressing unit 501 executes only increase or decrease of the synapse load values. When the second neural network expressing unit 505 operates in the refresh period to decide that a converged state of the first neural network expressing unit 501 is to be memorized, the output data pattern of the second neural network expressing unit 505 matches with any one of (a plurality of) decision patterns stored in the decision data storage circuit 507 (see FIG. 9), and the match detection signal Ma is generated. If the match detection signal Ma goes high as shown in FIG. 25, the synapse load value increasing control signal ACP+ is generated in response to the control signal /ACP. When the match detection signal Ma is at a low level indicating a mismatch, the synapse load value reducing control signal ACP− is generated in response to the control signal /ACP. Thus, the first neural network expressing unit 501 will not be erroneously caught by a state not to be memorized, i.e., a local minimum of potential energy or the like, and it is possible to correctly and effectively clarify the memory.

In the second embodiment, the second neural network has a connection configuration in a three-layer feedforward structure to be capable of implementing the learning rule along back propagation. However, the structure of the second neural network expressing unit is not restricted to this but any other structure may be employed so far as the same is provided with static synapse expressing circuits which can stably hold synapse load values thereof and can decide whether or not a converged state of the first neural network expressing unit is to be memorized.

(C) Third Embodiment

In accordance with the refresh method of the second embodiment, it is possible to correctly discriminate the minimum point (the network state supplying the minimum energy value) of potential energy which is not to be memorized, thereby effectively refreshing the memory.

In the second embodiment, however, states within a certain range about the minimum point of the potential energy of the first neural network are decided to be memorized in accordance with the output of the second neural network. Therefore, the potential energy profile (curve A in FIG. 8(a)) acquired by original learning is slightly different in shape from the potential energy profile (curve E shown in FIG. 8(a)) recovered by refreshing. When states to be memorized are not uniquely but stochastically expressed, the detailed shape of the potential energy, i.e., the degrees of depth of the valleys, the inclination of potential energy side walls forming the valleys and the like are important. A refresh operation which can more correctly and precisely reproduce the profile of potential energy which is decided by original learning is now described.

Figure 26:
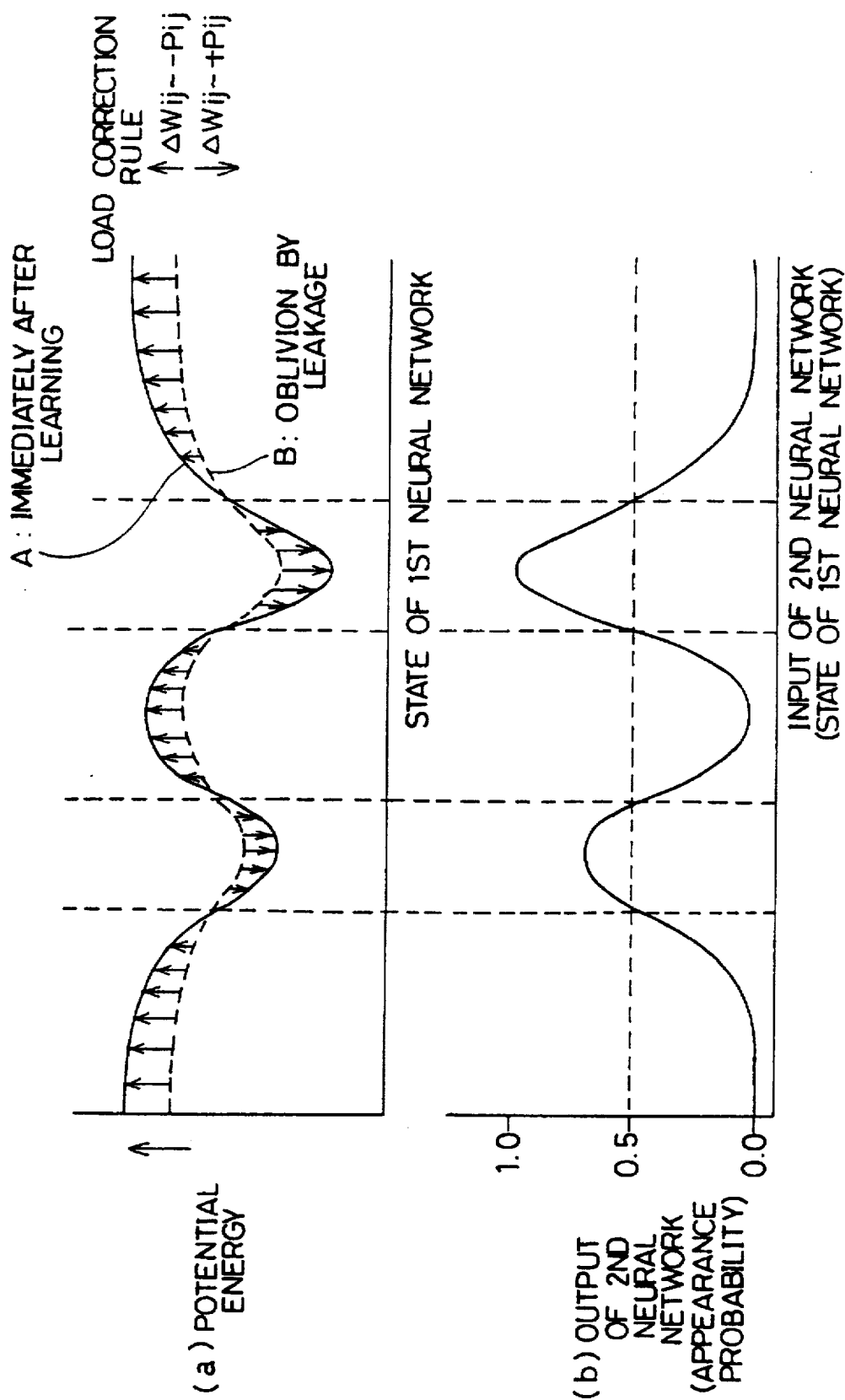
FIG. 26 illustrates a refresh operation according to a third aspect of the present invention.

FIG. 26 illustrates a refresh method according to a third aspect of the present invention. FIG. 26(a) shows relations between states of a first neural network and potential energy levels. A curve A indicates the potential energy immediately after learning, and a curve B indicates that in oblivion due to charge leakage. FIG. 26(b) shows relations between inputs of a second neural network (states of the first neural network) and outputs thereof. Referring to FIG. 26(b), the axis of ordinates represents an appearance probability of the output pattern of the second neural network. In the refresh method according to the third aspect of the present invention, a probability is introduced into the output of the second neural network.

Referring to FIGS. 26(a) and 26(b), the potential energy states of the first and second neural networks are shown being aligned with each other. Shallow states of the potential energy levels correspond to such states that a corresponding memory is not so strong. With respect to such valleys, the output value (appearance probability) of the second neural network is made less. On the other hand, the output value of the second neural network is made increased with respect to the states in which the valleys of the potential energy are deep. The output of the second neural network indicates the appearance probability of an output pattern with respect to the state of the first neural network, and eventually corresponds to a probability with which a match detection signal Ma from a match detection circuit 506 in a control unit 550 indicates a match.

The output of the second neural network indicating the appearance probability of the output pattern represents a probability in which the corresponding output pattern appears when a refresh operation is repeatedly executed. In each refresh cycle, synapse load values are corrected in accordance with $\Delta Wij$ nearly equal to $\pm Pij$ ($=\pm Si \cdot Sj$). A method of introducing the probability into the output of the second neural network is now described.

Figure 27:
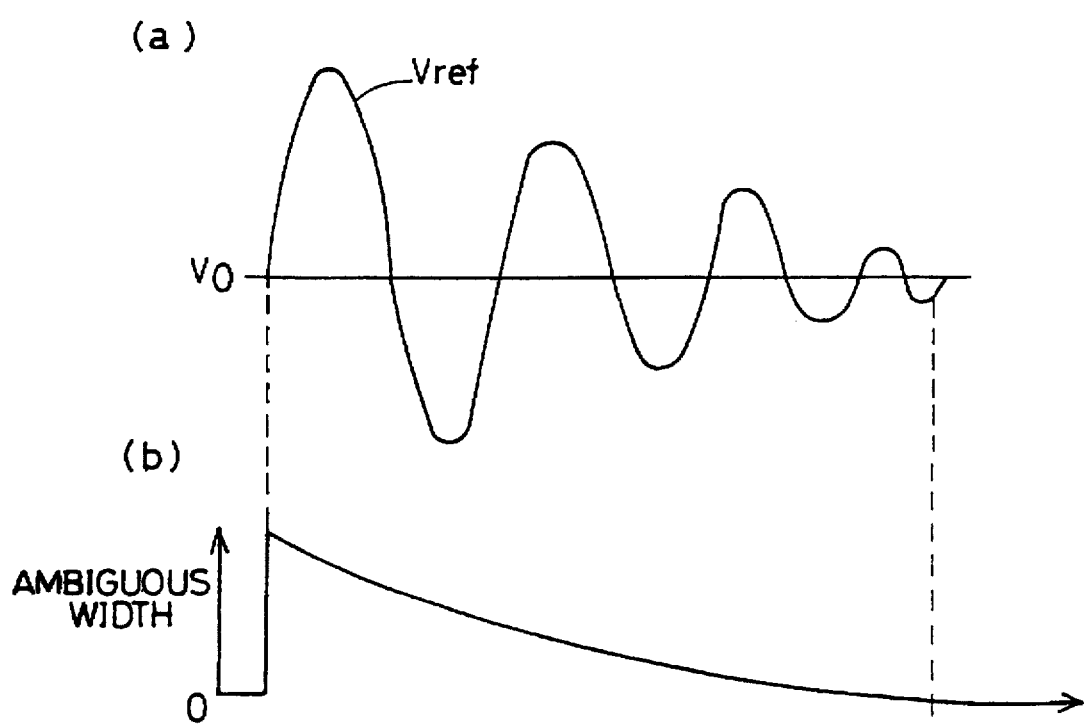
FIG. 27 illustrates a reference voltage which is supplied to the neuron unit of a second neural network expressing unit in a third embodiment.

FIG. 27 illustrates a refresh method according to a third embodiment of the present invention. FIG. 27(a) shows a reference voltage Vref (see FIG. 23) which is supplied to neuron units 1901, . . . , 1902 and 1801, . . . , 1803 included in a second neural network expressing unit 505 (see FIG. 13). As shown in FIG. 27(a), the reference voltage Vref which supplies threshold values of the neurons makes a damping oscillation with reference to a true value V0. In this case, the ambiguous width of the output of each neuron unit is reduced in response to the damping oscillation amplitude, and stochastic transition is caused in its output state, and the output state converges to a certain state. The "ambiguous width" indicates the width of a portion having an inclination in a probability function (Boltzman distribution) at a certain annealing temperature. When the annealing temperature is high, the probability distribution function is in the form of a sigmoid-like function having a large ambiguous width, while the distribution function substantially approaches a unit step function and the ambiguous width becomes zero.

When the reference voltage Vref makes a damping oscillation as described above, the period when a damping oscillation of the reference voltage is caused corresponds to a process that the annealing temperature is successively changed from a certain level to a lower level and the neural network finally reaches a thermal equilibrium state of the global minimum energy. The initial maximum amplitude of the reference voltage Vref provides an annealing start temperature. Due to the damping oscillation of reference voltage Vref, state transition of each neuron unit is stochastically expressed and the probability is introduced into the output of the second neural network expressing unit 505. In other words, the output distribution (appearance probability) shown in FIG. 26 is provided. Thus, introduction of the probability into the output of the second neural network also results in introduction of a probability into a decision as to whether or not a converged state of the first neural network is to be memorized, whereby it is possible to correctly and precisely reproduce the potential energy profile of the first neural network immediately after learning.

The damping-oscillated reference voltage Vref can be supplied to neuron units of both or one of hidden and output layers of the second neural network expressing unit. Alternatively, only the reference voltage Vref which is supplied to the neuron units of the output layer may be damping-oscillated.

The refresh operation itself of the neural network employing the damping-oscillated reference voltage Vref is identical to that shown in the operation flow shown in FIG. 24, and performed similarly to that of the second embodiment.

(D) Fourth Embodiment

Figure 28:
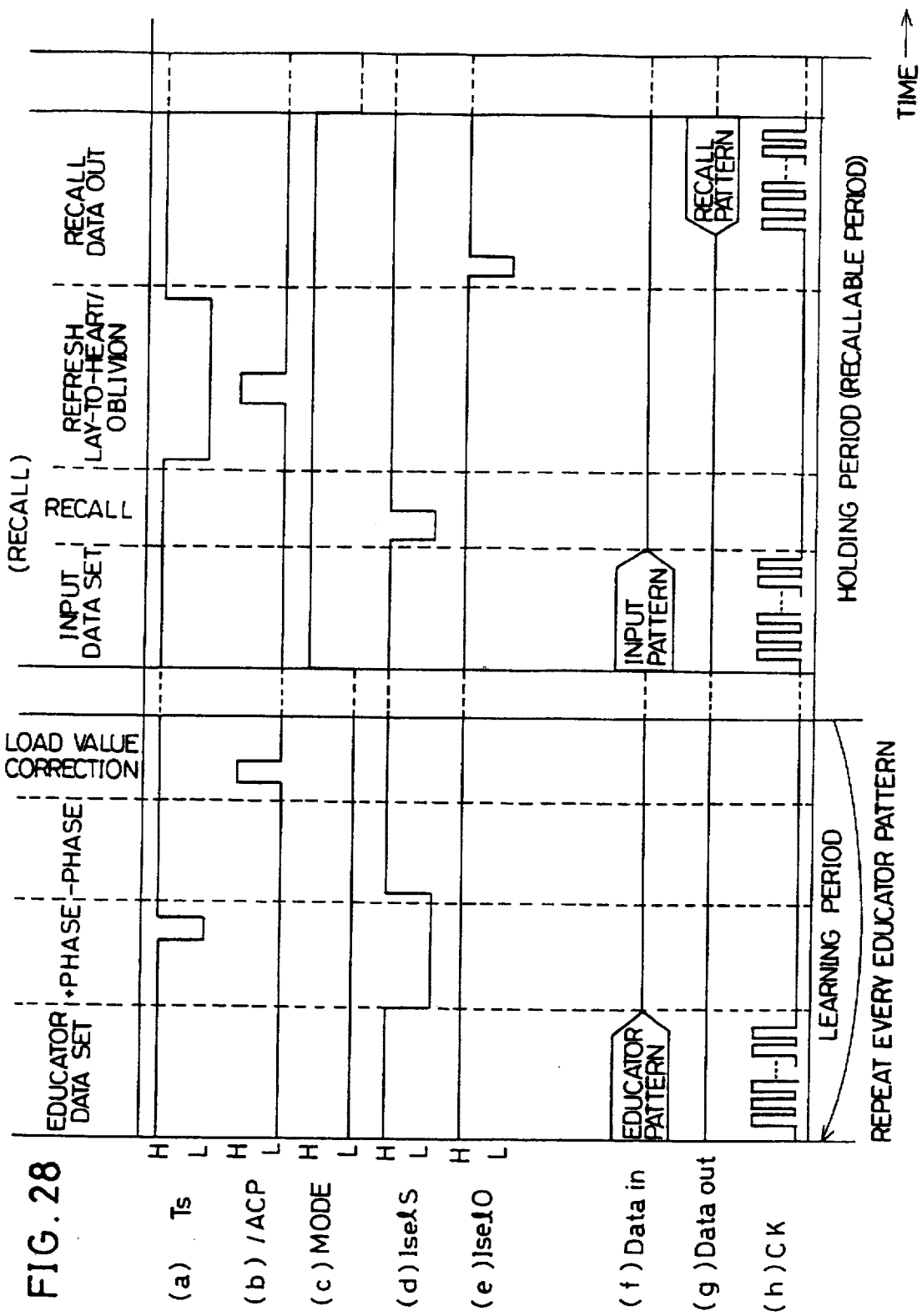
FIG. 28 is a signal waveform diagram showing a refresh operation in a fourth aspect of the present invention.

While the refresh period is periodically or cyclically executed after a lapse of a predetermined period from the learning period in each of the first to third embodiments, another refresh method is also employable. FIG. 28 shows the flow of a refresh operation according to a fourth embodiment of the present invention. In the refresh method shown in FIG. 28, the refresh operation is carried out every time a recall operation is performed. The operation in a learning period is similar to those of the first and second embodiments as described above. When a refresh operation period is independently provided, these may be a case where a recall operation can not be carried out during the refresh operation period and the usage efficiency of the neural network may be deteriorated. When the refresh operation is always executed following the recall operation as described above, it is not particularly necessary to provide a refresh period, and the usage efficiency of the neural network is improved.

In the refresh method according to the fourth embodiment of the present invention shown in FIG. 28, when the state of a first neural network is converged by recall in a recall operation, a signal Ts is brought to a low level under the state converged by the recall, to execute refreshing. In this state, refreshing is executed without employment of random patterns as refresh patterns. A second neural network may be or may not be employed at this time.

Referring to FIG. 28, a control signal /ACP is employed so that signals ACP+ and ACP− are simultaneously generated in a learning period. Further, a mode switching signal MODE is set at a high level during a recall period, so that operations of "lay-to-heart"/oblivion are carried out in accordance with a match detection signal which is obtained by driving the second neural network, so that data are laid to heart upon a match and forgotten upon a mismatch. The first neural network is in a converged state during this refresh period. After a lapse of the refresh period, a control signal IselO is generated so that state signals of respective neuron units are latched in a shift register SR(T) (see FIG. 4) and successively shifted out in response to a clock signal CK.

As hereinabove described, the refresh operation is executed every recall operation so that it is not necessary to periodically provide refresh periods, thereby obtaining a neural network expressing apparatus having excellent usage efficiency, which apparently or externally requires no refresh operation. In this case, it is preferable that memorized states recalled in the first neural network equally appear with respect to all memorized states.

According to the present invention, as hereinabove described, a refresh operation can be correctly and precisely carried out at a high speed with a simple structure and a simple operation, whereby it is possible to implement a high-speed integrated neural network expressing apparatus which can stably and reliably operates for a long time.

[Post Summarization]

The characteristic features of the invention can be summarized as follows.

(1) Respective synapse load values are corrected by macroscopic memory recovery, whereby it is possible to implement stable refreshing even with microscopic partial malfunctions of synapses, neurons and the like.

(2) A memory clarifying action in the refresh method according to the present invention has an effect of eliminating unnecessary minimum potential values (local minima), thereby accomplishing an effect of reducing entropy of information internally expressed by the neural network.

(3) It is possible to obtain a neural network expressing apparatus which can stably hold synapse load values for a long time with a simple structure.

(4) Since refreshing is executed with random number patterns, it is possible to generate the internal states of the neural network with equal probabilities, thereby correctly recovering potential energy distribution immediately after learning.

(5) The second neural network is adapted to decide states to be memorized and not to be memorized for correcting synapse load values in accordance with the results of the decision, whereby it is possible to carry out correct refreshing without reinforcing memorization of states providing unnecessary minimum energy values.

(6) A probability is introduced into the output of the second neural network, whereby it is possible to implement a refresh operation which can more correctly and precisely reproduce the potential energy profile of the first neural network.

(7) It is not particularly necessary to set a refresh period, and the usage efficiency of the neural network expressing apparatus is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A neural network representing apparatus constructed on a model of vital cells, comprising:

a plurality of first neuron units each simulating a function of a body of a vital cell;

a plurality of first synapse units each for coupling at least two first neuron units through a preset coupling strength, each of said plurality of first synapse unit including storage means for storing synapse load value information representative of said present coupling strength; and control means receiving a refresh instruction signal for refreshing said synapse load value information of each of said plurality of first synapse units using outputs of the associated neuron units when said refresh instruction signal instructs a refresh operation in which previously established synapse load value data is recovered, and wherein said storage means includes capacitance means for storing the synapse load value information in a form of electric charges, and wherein said control means includes learning control means corresponding to each of said plurality of first synapse units and coupled to receive the outputs of the associated first neuron units coupled by a corresponding synapse unit for correcting an amount of electric charges in an associated storage means through a charge pump operation in a learning mode of operation, the charge pump operation being activated to correct the amount of electric charges in response to activation of a control signal, and means responsive to said refresh instruction signal for modulating said control signal for application to said learning control means.

2. A neural network representing unit according to claim 1, wherein said control means includes;

random number generating means for generating random number data, selector means receiving said refresh instruction signal for supplying a pattern of a random number to selected first neuron units among said plurality of first neutron units when said refresh instructing signal instructs said refresh operation, and correction means corresponding to each of said plurality of synapse expressing unit and receiving outputs of corresponding first neuron units under operation with said pattern of the random number, for changing a synapse load value information of a corresponding first synapse unit.

3. A neural network representing unit according to claim 2, wherein said correction means includes a first means for increasing the associated synapse load value information when the associated first neuron units are in a firing state, and a second means for decreasing the associated synapse load value information when the associated first neuron units are in a firing state, and said control means includes means for alternatively enabling said first and second means.

4. A neural network representing unit according to claim 2, wherein said neural network representing unit is operable in a learning mode for learning an educator data to establish each respective synapse load value using educator data, and wherein said selector means includes means for passing the pattern of random number data in place of the educator data to said selected first neuron units when the refresh instruction signal, received by said selector means, instructs said refresh operation.

5. A neural network representing unit according claim 1, wherein said control means includes:

a second neural network representing unit for receiving outputs of preselected first neuron units of said plurality of first neuron units and supplying an output pattern corresponding to the outputs of the preselected first neuron units, and controller means receiving said output pattern from said second neural network representing unit for correcting each respective synapse load value information of said plurality of first synapse units.

6. A neural network representing unit according to claim 5, wherein said second neural network includes:

a plurality of second neuron units each simulating a function of a body of a vital cell, and a plurality of second synapse units each for coupling associated second neuron units through a preprogrammed synapse load value representative of coupling strength between associated second neuron units, each second synapse unit including static storage means for statically storing an associated synapse load value information without requiring refreshing thereon.

7. A neural network representing unit according to claim 6, wherein said static storage means includes means for storing the associated synapse load value information in a digital form.

8. A neural network representing unit according to claim 6, wherein said static storage means comprises a digital binary n bit counter, wherein n is an integer.

9. A neural network representing unit according to claim 5, wherein said controller means includes;

decision pattern storage means for storing a predetermined pattern of data, match detecting means for detecting matching of said predetermined pattern of data and an output of said second neural network representing unit, and refresh control means receiving an output of said match detecting means for determining whether or not a synapse load value of a first synapse representing unit having coupling two neuron units both in a firing state should be increased.

10. A neural network representing unit according to claim 9, wherein said refresh control means includes;

first determination means for determining that the synapse load value should be increased when said match detection means detects the matching, and second determination means for determining that the synapse load value should be decreased when said match detection means detects no matching.

11. A neural network representing unit according to claim 5, wherein said second neural network representing unit includes means for establishing each respective synapse load value of the plurality of second synapse units through learning with use of the outputs of the preselected first neuron units and the predetermined pattern of data as an educator data.

12. A neural network representing unit according to claim 5, wherein said second neural network representing unit includes a plurality of second neuron units each simulating a function of a body of a vital cell, and a plurality of second synapse units each for coupling second neuron units through a preprogrammed synapse load value, each second neuron unit including a comparator means for comparing a sum of outputs of related second synapse expressing units with a reference voltage which dampingly oscillates with reference to a predetermined voltage level.

13. A neural network representing unit according to claim 5, wherein said second neural network expressing unit comprises a feed-forward arrangement operable along a back propagation model.

14. A neural network representing unit according to claim 1, wherein said control means is activated each time said first neuron unit receives an input data to be processed and generates an output data corresponding to thus received input data.

15. A method of operating a neural network expressing unit including a plurality of neuron units simulating a function of a body of vital cell and a plurality of synapse units each for coupling at least two neuron units through a preprogrammed coupling strength which is represented by a synapse load value, comprising the steps of:

- supplying an input data to said neural network expressing unit,
- after a convergence of said neural network expressing unit, correcting synapse load values of the plurality of synapse units using outputs of the neuron units in such a manner that a synapse load value of a synapse unit is corrected using outputs of associated neuron units coupled by the synapse unit, and
- supplying externally an output data from the neural network expressing unit, said output data indicating a result of operation on said input data through said neural network expressing unit,
- said step of correcting including the step of correcting a synapse load value of a synapse unit using outputs of associated two neuron units in response to a control signal in a learning mode, the operation of correcting the synapse load values being activated in response to activation of a modulated control signal obtained by modulating the control signal in a recallable period.

16. A method according to claim 15, wherein said step of correcting includes the steps of

- determining whether synapse load values of the plurality of synapse units should be increased or decreased using outputs of at least a part of the neuron units, and
- increasing the synapse load value of each of the synapse expressing units having associated two neuron units both in a firing state when it is determined that the synapse load value should be increased.

* * * * *